(12) United States Patent
Glew

(10) Patent No.: US 7,202,418 B2
(45) Date of Patent: Apr. 10, 2007

(54) FLAME RETARDANT AND SMOKE SUPPRESSANT COMPOSITE HIGH PERFORMANCE SUPPORT-SEPARATORS AND CONDUIT TUBES

(75) Inventor: Charles A. Glew, Framingham, MA (US)

(73) Assignee: Cable Components Group, LLC, Framingham, MA (US)

( * ) Notice: Subject to any disclaimer, the term of this patent is extended or adjusted under 35 U.S.C. 154(b) by 0 days.

(21) Appl. No.: 11/030,436

(22) Filed: Jan. 6, 2005

(65) Prior Publication Data

US 2005/0199415 A1  Sep. 15, 2005

Related U.S. Application Data

(60) Provisional application No. 60/534,646, filed on Jan. 7, 2004.

(51) Int. Cl.
*H01B 7/00* (2006.01)
(52) U.S. Cl. .................................... 174/113 C
(58) Field of Classification Search ............ 174/113 R, 174/113 C, 131 A, 110 FC
See application file for complete search history.

(56) References Cited

U.S. PATENT DOCUMENTS

| | | | | |
|---|---|---|---|---|
| 3,947,525 | A * | 3/1976 | Robertson et al. | 524/146 |
| 4,605,818 | A | 8/1986 | Arroyo et al. | |
| 4,701,345 | A | 10/1987 | Giatras et al. | |
| 5,322,899 | A | 6/1994 | Grunewalder et al. | |
| 6,074,503 | A | 6/2000 | Clark et al. | |
| 6,410,140 | B1 | 6/2002 | Land et al. | |
| 6,411,403 | B1 * | 6/2002 | Siddhamalli | 385/109 |

(Continued)

FOREIGN PATENT DOCUMENTS

EP  0 554 174 B1  4/2000

*Primary Examiner*—Chau N. Nguyen
(74) *Attorney, Agent, or Firm*—Guerry L. Grune

(57) ABSTRACT

The present invention includes a high performance communications cable exhibiting reduced cross-talk of any form between transmission media that includes one or more core support-separators having various shaped profiles which define a clearance to maintain a spacing between transmission media or transmission media pairs. The core may be formed of a conductive or insulative material to further reduce cross-talk and improve other electrical properties as well as reduce flame and smoke spread. The cable and separators are comprised of principally polymer blends that include olefin and/or fluoropolymer and/or chlorofluoropolymer based resins with and without inorganic additive such as nano-clay composites. These unique blends offer both flame and smoke suppression while maintaining the characteristics necessary to improve electrical performance and allow for severe cost reduction over conventional separators. The specially shaped core support-separators can be either interior to the cable jacket or be employed singularly without the benefit of a jacket and extend along the longitudinal length of the communications cable. Alternatively, with no jacket for cable completion, a portion of the separator wherein a thin layer of material can act as a type of skin for future mechanical protection is provided. The specially shaped core support-separator has both a central region as well as a plurality of shaped sections that extend outward from the central region that are either solid or partially solid, foamed or foamed with a solid skin surface. In addition, the invention includes the optional incorporation of hollow ducts that can be used to provide optical or metal conductor media either before, during, or after installation of the cable primarily by gas driven means.

70 Claims, 78 Drawing Sheets

U.S. PATENT DOCUMENTS 6,553,749 B2    4/2003  Land et al.
6,596,944 B1    7/2003  Clark et al.
6,687,437 B1 *  2/2004  Starnes et al. .............. 385/101

2003/0068499 A1 *  4/2003  Abusleme et al. .......... 428/421
2004/0216914 A1 *  11/2004  Vexler et al. ........... 174/121 A

* cited by examiner

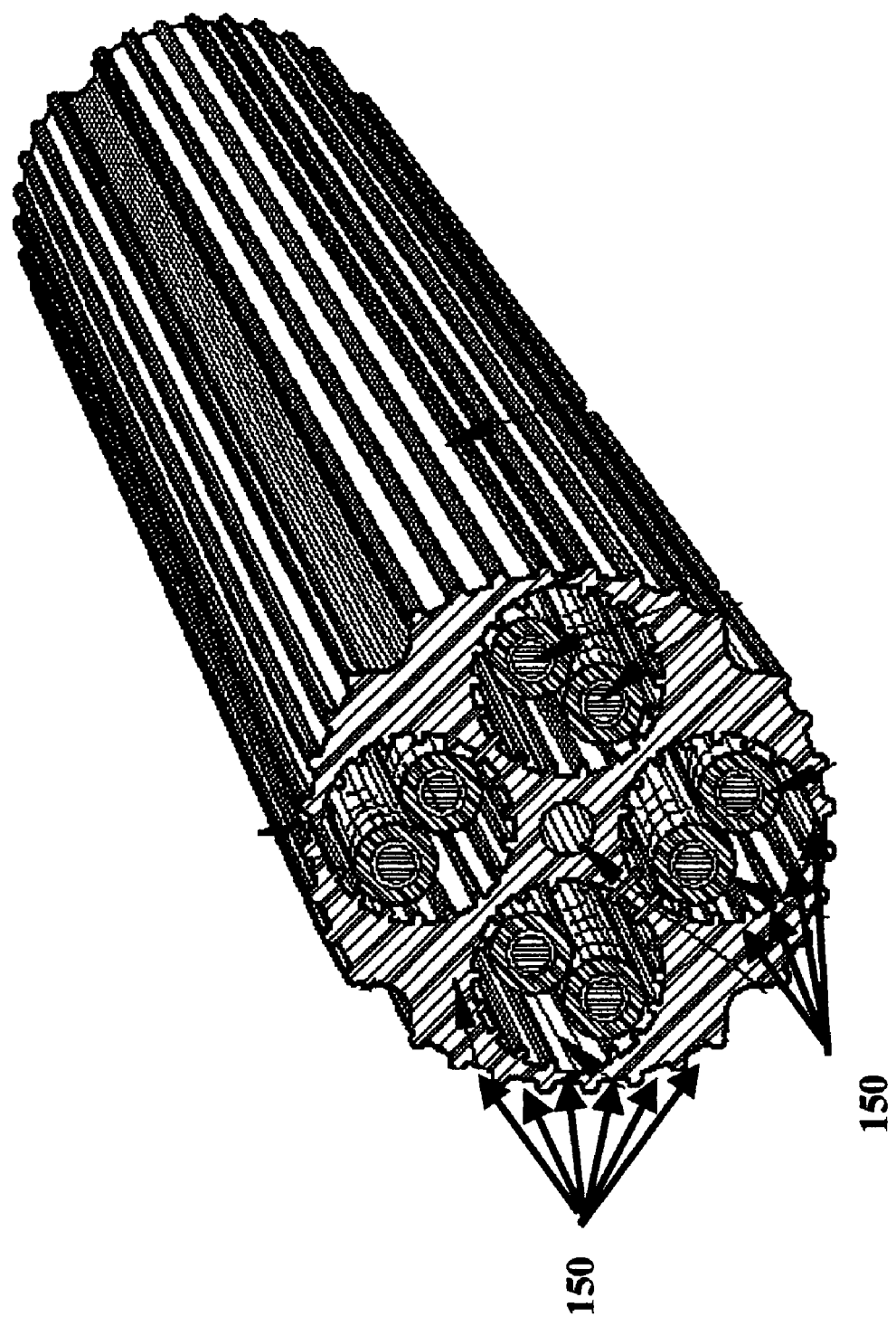

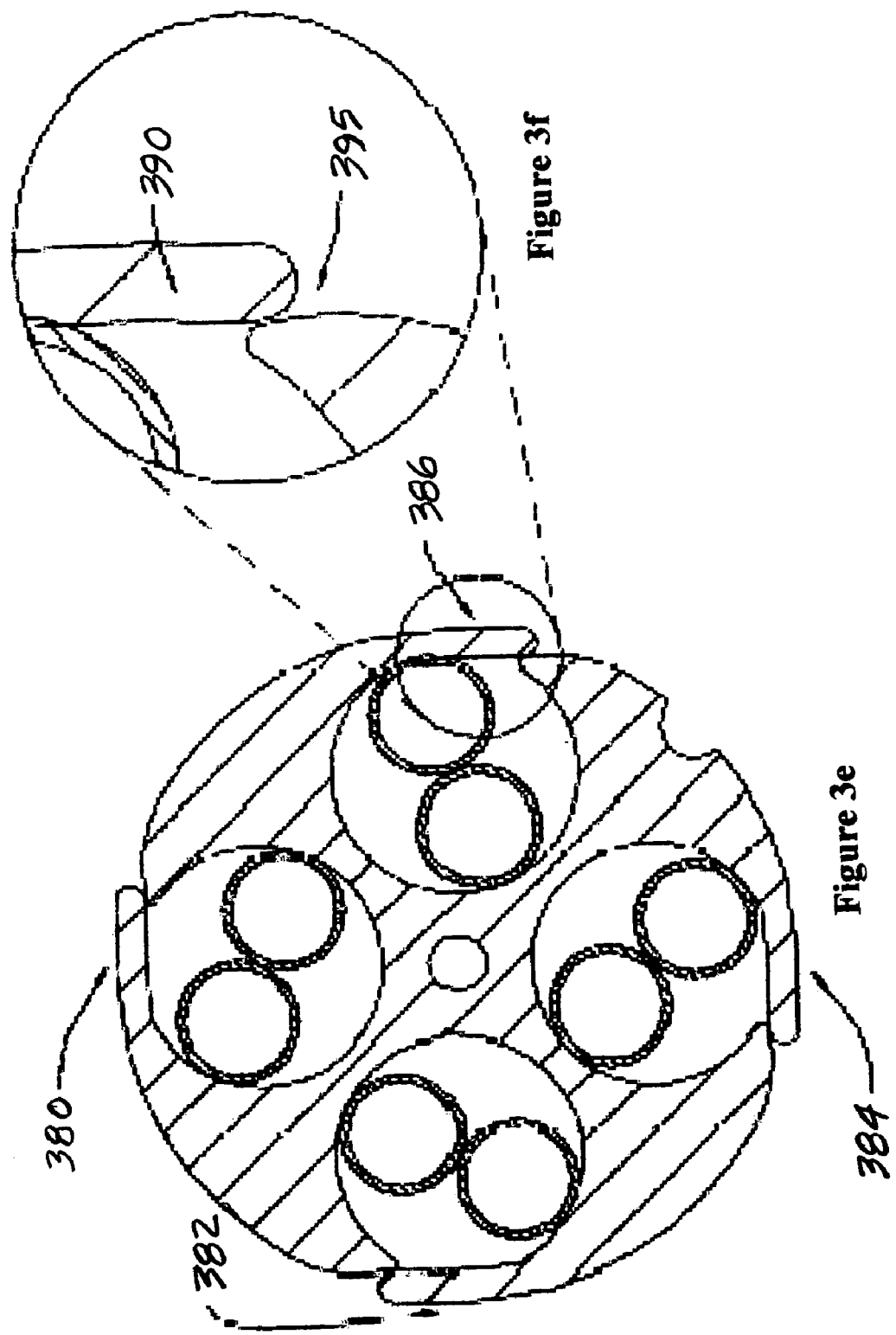

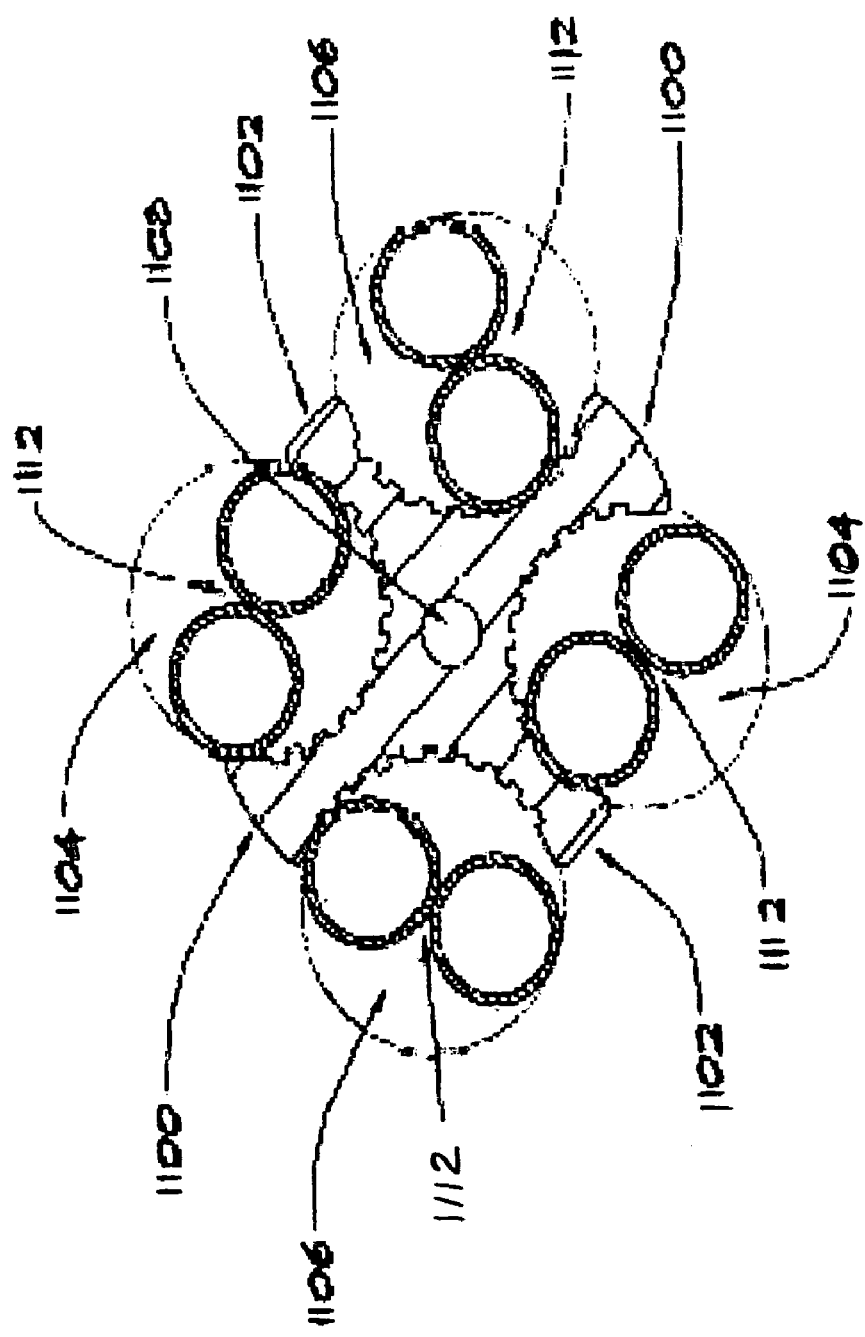

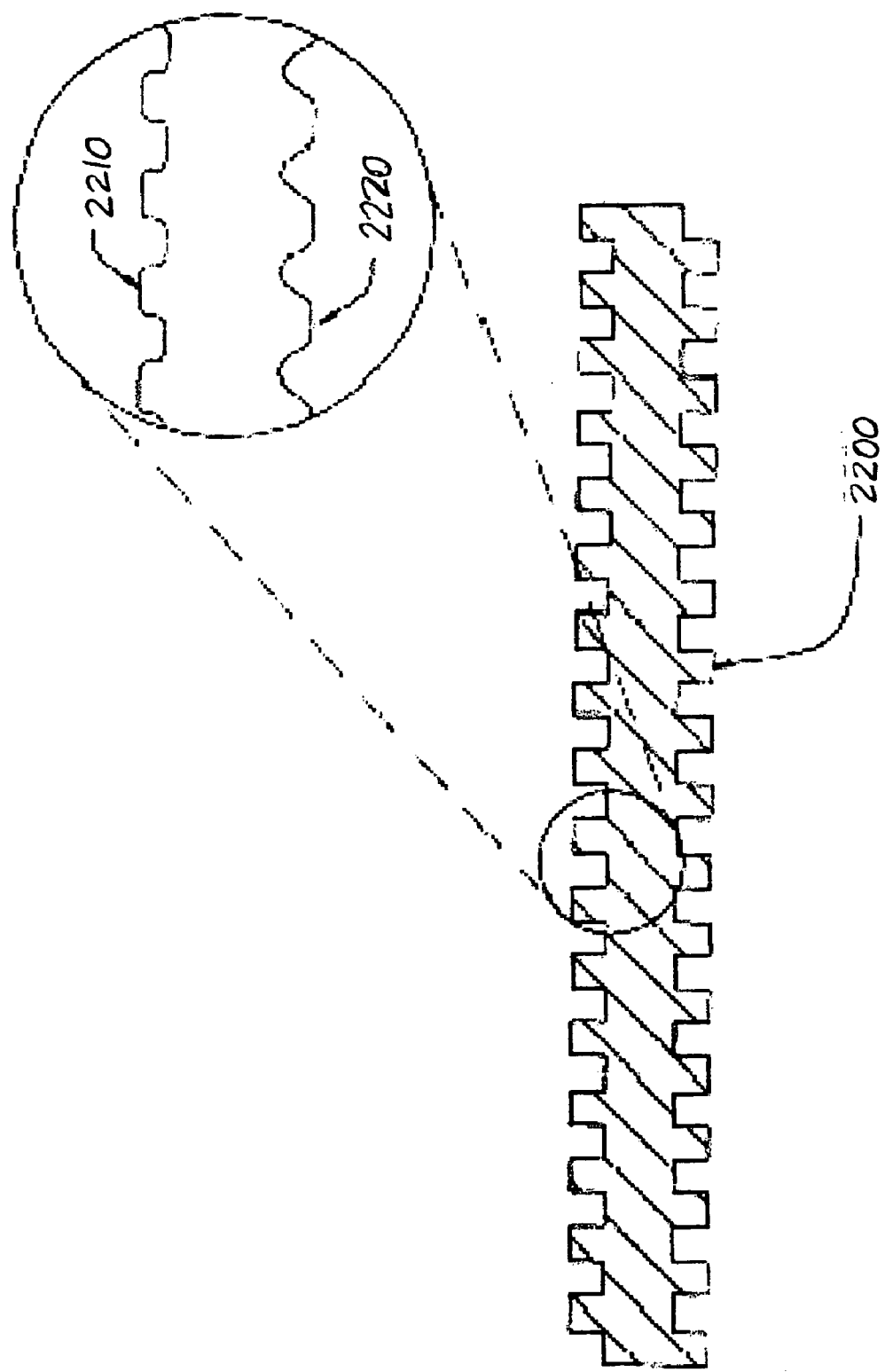

FLAME RETARDANT AND SMOKE SUPPRESSANT COMPOSITE HIGH PERFORMANCE SUPPORT-SEPARATORS AND CONDUIT TUBES

CLAIM TO PRIORITY

This utility application is based on provisional application No. 60/534,646 filed Jan. 7, 2004 entitled "FLAME RETARDANT AND SMOKE SUPPRESSANT COMPOSITE HIGH PERFORMANCE SUPPORT-SEPARATORS AND CONDUIT TUBES" the contents of which are expressly incorporated by reference.

FIELD OF INVENTION

This invention relates to high performance multi-media communications cables utilizing paired or unpaired electrical conductors or optical fibers that meet stringent flame and smoke suppressant requirements both in the United States under the National Electric Code (NEC) and internationally through the guidelines established by the International Electrotechnical Commission (IEC). More particularly, it relates to cables having a central core defining individual conductor pair channels. The communications cables have interior core support-separators that define a clearance through which conductors or optical fibers may be disposed and these separators are the subject of the present invention. The invention also pertains to conduit tubes that could be used in conjunction with or separately from the separators with the defined clearance channels. These conduit tubes may be round, square, rectangular, elliptical or in any feasible geometric shape that would allow for any communications media conductor to be placed or subsequently blown into place along the length of these tubes. Additionally and concurrently, the present invention relates to composite electrical insulation exhibiting reduced flame spread and reduced smoke evolution, while maintaining favorable electrical properties within the conductors and cables. The present invention also relates to insulated electrical conductors and jacketed plenum cable formed from the flame retardant and smoke suppressant composite insulation(s).

BACKGROUND OF THE INVENTION

Many communication systems utilize high performance cables normally having four pairs or more that typically consist of two twisted pairs transmitting data and two receiving data as well as the possibility of four or more pairs multiplexing in both directions. A twisted pair is a pair of conductors twisted about each other. A transmitting twisted pair and a receiving twisted pair often form a subgroup in a cable having four twisted pairs. High-speed data communications media in current usage includes pairs of wire twisted together to form a balanced transmission line. Optical fiber cables may include such twisted pairs or replace them altogether with optical transmission media (fiber optics).

When twisted pairs are closely placed, such as in a communications cable, electrical energy may be transferred from one pair of a cable to another. Energy transferred between conductor pairs is undesirable and referred to as crosstalk. The Telecommunications Industry Association and Electronics Industry Association have define standards for crosstalk, including TIA/EIA-568 A, B, and C including the most recent edition of the specification. The International Electrotechnical Commission has also defined standards for data communication cable crosstalk, including ISO/IEC 11801. One high-performance standard for 100 MHz cable is ISO/IEC 11801, Category 5. Additionally, more stringent standards are being implemented for higher frequency cables including Category 6 and Category 7, which includes frequencies of 200 and 600 MHz, respectively and the most recent proposed industrial standard raising the speeds to 10 Gbit over copper with Ethernet or other cable designs. Industry standards cable specifications and known commercially available products are listed in Table 1 and a set of updated standards for Category 6, including alien crosstalk proposals are included in Tables 2 A–G.

TABLE 1

| | INDUSTRY STANDARD CABLE SPECIFICATIONS | | | |
|---|---|---|---|---|
| ALL DATA AT 100 MHz | TIA CAT 5e | TIA CAT 6 DRAFT 10 Nov. 15, 2001 | ANIXTER XP6 R3.00XP 11/00 | ANIXTER XP7 R3.00XP 11/00 |
| MAX TEST FREQUENCY | 100 MHz | 250 MHz | 250 MHz | 350 MHz |
| ATTENTUATION | 22.0 db | 19.8 db | 21.7 db | 19.7 db |
| POWER SUM NEXT | 32.3 db | 42.3 db | 34.3 db | 44.3 db |
| ACR | 13.3 db | 24.5 db | | |
| POWER SUM ACR | 10.3 db | 22.5 db | 12.6 db | 23.6 db |
| POWER SUM ELFEXT | 20.8 db | 24.8 db | 23.8 db | 25.8 db |
| RETURN LOSS | 20.1 db | 20.1 db | 21.5 db | 22.5 db |

TABLE 2A

Return Loss Requirements for Category 6 Cable
Return loss @ 20° C. ± 3° C. (68° F. ± 5.5° F.),
worst pair for a length of 100 m (328 ft)

| Frequency MHz | Category 6 dB |
|---|---|
| 1 ≤ f ≤ 10 | 20 + 5 log (f) |
| 10 ≤ f ≤ 20 | 25 |
| 20 ≤ f ≤ 250 | 25 − 7 log (f/20) |

TABLE 2B

Insertion Loss Requirements for Category 6 Cable
Insertion loss @ 20° C. ± 3° C. (68° F. ± 5.5° F.),
worst pair for a length of 100 m (328 ft)

| Frequency MHz | Category 6 dB |
|---|---|
| .772 | 1.8 |
| 10.0 | 6.0 |
| 250.0 | 32.8 |

TABLE 2C

Near End Crosstalk Requirements
For Category 6 Cable
Horizontal cable NEXT loss @ 20° C. ± 3° C. (68° F. ± 5.5° F.),
worst pair-to-pair, for a length of 100 m (328 ft)

| Frequency MHz | Category 6 dB |
|---|---|
| 0.150 | 86.7 |
| 10.0 | 59.3 |
| 250.0 | 38.3 |

TABLE 2D

Power Sum Near End Crosstalk Requirements for Category 6 Cable
PSNEXT loss @ 20° C. ± 3° C. (68° F. ± 5.5° F.),
for a length of 100 m (328 ft)

| Frequency MHz | Category 6 dB |
|---|---|
| 0.150 | 84.7 |
| 10.0 | 57.3 |
| 250.0 | 36.3 |

TABLE 2E

Equal Level Near End Crosstalk Requirements for Category 6 Cable
ELNEXT loss @ 20° C. ± 3° C. (68° F. ± 5.5° F.),
worst pair-to-pair for a length of 100 m (328 ft)

| Frequency MHz | Category 6 dB |
|---|---|
| .772 | 70.0 |
| 10.0 | 47.8 |
| 250.0 | 19.8 |

TABLE 2F

Power Sum Equal Level Near End Crosstalk Requirements
for Category 6 Cable
PSELNEXT loss @ 20° C. ± 3° C. (68° F. ± 5.5° F.),
for a length of 100 m (328 ft)

| Frequency MHz | Category 6 dB |
|---|---|
| .772 | 67.0 |
| 10.0 | 44.8 |
| 250.0 | 16.8 |

TABLE 2G

Proposed Requirements for Alien Near-end Cross-talk for
Category 6 Cable
Proposed Requirement for Channel Power Sum Alien Near-End Cross-talk

| Frequency | Category 6 dB |
|---|---|
| PSANEXT ≥ 60 − 10log(f) | 1 ≤ f ≤ 100 MHz |
| PSANEXT ≥ 60 − 15log(f) | 100 ≤ f ≤ 625 MHz |

In conventional cable, each twisted pair of conductors for a cable has a specified distance between twists along the longitudinal direction. That distance is referred to as the pair lay. When adjacent twisted pairs have the same pair lay and/or twist direction, they tend to lie within a cable more closely spaced than when they have different pair lays and/or twist direction. Such close spacing increases the amount of undesirable cross-talk that occurs. Therefore, in many conventional cables, each twisted pair within the cable has a unique pair lay in order to increase the spacing between pairs and thereby to reduce the cross-talk between twisted pairs of a cable. Twist direction may also be varied. Along with varying pair lays and twist directions, individual solid metal or woven metal air shields can be used to electro-magnetically isolate pairs from each other or isolate the pairs from the cable jacket.

Shielded cable, although exhibiting better cross-talk isolation, is more difficult, time consuming and costly to manufacture, install, and terminate. Individually shielded pairs must generally be terminated using special tools, devices and techniques adapted for the job, also increasing cost and difficulty.

One popular cable type meeting the above specifications is Unshielded Twisted Pair (UTP) cable. Because it does not include shielded pairs, UTP is preferred by installers and others associated with wiring building premises, as it is easily installed and terminated. However, UTP fails to achieve superior cross-talk isolation such as required by the evolving higher frequency standards for data and other state of the art transmission cable systems, even when varying pair lays are used.

Some cables have used supports in connection with twisted pairs. These cables, however, suggest using a standard "X", or "+" shaped support, hereinafter both referred to as the "X" support. Protrusions may extend from the standard "X" support. The protrusions of these prior inventions have exhibited substantially parallel sides.

The document, U.S. Pat. No. 3,819,443, hereby incorporated by reference, describes a shielding member comprising laminated strips of metal and plastics material that are cut, bent, and assembled together to define radial branches on said member. It also describes a cable including a set of conductors arranged in pairs, said shielding member and an insulative outer sheath around the set of conductors. In this cable the shielding member with the radial branches compartmentalizes the interior of the cable. The various pairs of the cable are therefore separated from each other, but each is only partially shielded, which is not so effective as shielding around each pair and is not always satisfactory.

The solution to the problem of twisted pairs lying too closely together within a cable is embodied in three U.S. Pat. Nos. 6,150,612 to Prestolite, 5,952,615 to Filotex, and 5,969,295 to CommScope incorporated by reference herein, as well as an earlier similar design of a cable manufactured by Belden Wire & Cable Company as product number 1711A. The prongs or splines in the Belden cable provide superior crush resistance to the protrusions of the standard "X" support. The superior crush resistance better preserves the geometry of the pairs relatives to each other and of the pairs relative to the other parts of the cables such as the shield. In addition, the prongs or splines in this invention preferably have a pointed or slightly rounded apex top which easily accommodates an overall shield. These cables include four or more twisted pair media radially disposed about a "+"-shaped core. Each twisted pair nests between two fins of the "+"-shaped core, being separated from adjacent twisted pairs by the core. This helps reduce and stabilize crosstalk between the twisted pair media. U.S. Pat. No. 5,789,711 to Belden describes a "star" separator that accomplishes much of what has been described above and is also herein incorporated by reference.

However, these core types can add substantial cost to the cable, as well as excess material mass which forms a potential fire hazard, as explained below, while achieving a crosstalk reduction of typically 3 dB or more. This crosstalk value is based on a cable comprised of a fluorinated ethylene-propylene (FEP) conductors with PVC jackets as well as cables constructed of FEP jackets with FEP insulated conductors. Cables where no separation between pairs exist will exhibit smaller cross-talk values. When pairs are allowed to shift based on "free space" within the confines of the cable jacket, the fact that the pairs may "float" within a free space can reduce overall attenuation values due to the ability to use a larger conductor to maintain 100 ohm impedance. The trade-off with allowing the pairs to float is that the pair of conductors tend to separate slightly and randomly. This undesirable separation contributes to increased structural return loss (SRL) and more variation in impedance. One method to overcome this undesirable trait is to twist the conductor pairs with a very tight lay. This method has been proven impractical because such tight lays are expensive and greatly limits the cable manufacturer's throughput and overall production yield. An improvement included by the present invention to structural return loss and improved attenuation is to provide grooves within channels for conductor pairs such that the pairs are fixedly adhered to the walls of these grooves or at least forced within a confined space to prevent floating simply by geometric configuration. This configuration is both described here within and referenced in U.S. Pat. No. 6,639,152 filed Aug. 25, 2001 as well as PCT/US02/13831 filed at the United States Patent and Trademark Office on May 1, 2002.

A "rifling" or "ladder-like" separator design also contributes to improved attenuation, power sum NEXT (near end cross talk), power sum ACR (attenuation cross-talk ratio) and ELFEXT (equal level far end cross-talk) by providing for better control of spacing of the pairs, adding more air-space, and allowing for "pair-twinning" at different lengths. Additional benefits include reduction of the overall material mass required for conventional spacers, which contributes to flame and smoke reduction.

In building designs, many precautions are taken to resist the spread of flame and the generation of and spread of smoke throughout a building in case of an outbreak of fire. Clearly, the cable is designed to protect against loss of life and also minimize the costs of a fire due to the destruction of electrical and other equipment. Therefore, wires and cables for building installations are required to comply with the various flammability requirements of the National Electrical Code (NEC) in the U.S. as well as International Electrotechnical Commission (EIC) and/or the Canadian Electrical Code (CEC).

A broad range of electrical conductors and electrical cables are installed in modern buildings for a wide variety of uses. Such uses include data transmission between computers, voice communications, as well as control signal transmission for building security, fire alarm, and temperature control systems. These cable networks extend throughout modern office and industrial buildings, and frequently extend through the space between the dropped ceiling and the floor above. Ventilation system components are also frequently extended through this space for directing heated and chilled air to the space below the ceiling and also to direct return air exchange. The space between the dropped ceiling and the floor above is commonly referred to as the plenum area. Electrical conductors and cables extending through plenum areas are governed by special provisions of the National Electric Code ("NEC").

Cables intended for installation in the air handling spaces (i.e. plenums, ducts, etc.) of buildings are specifically required by NEC/CEC/IEC to pass the flame test specified by Underwriters Laboratories Inc. (UL), UL-910, or its Canadian Standards Association (CSA) equivalent, the FT6. The UL-910, FT-6, and the NFPA 262 represent the top of the fire rating hierarchy established by the NEC and CEC respectively. Also important are the UL 1666 Riser test and the IEC 60332-3C and D flammability criteria. Cables possessing these ratings, generically known as "plenum" or "plenum rated" or "riser" or "riser rated", may be substituted for cables having a lower rating (i.e. CMR, CM, CMX, FT4, FTI or their equivalents), while lower rated cables may not be used where plenum or riser rated cables are required.

In 1975, the NFPA recognized the potential flame and smoke hazards created by burning cables in plenum areas, and adopted in the NEC a standard for flame retardant and smoke suppressant cables. This standard, commonly referred to as "the Plenum Cable Standard", permits the use of cable without conduit, so long as the cable exhibits low smoke and flame retardant characteristics. The test method for measuring these characteristics is commonly referred to as the Steiner Tunnel Test. The Steiner Tunnel Test has been adapted for the burning of cables according to the following test protocols: NFPA 262, Underwriters Laboratories (U.L.) 910, or Canadian Standards Association (CSA) FT-6. The test conditions for each of the U.L. 910 Steiner Tunnel Test, CSA FT-6, and NFPA 262 are as follows: a 300,000 BTU/ hour flame is applied for 20 minutes to ten 24-foot lengths of test cables mounted on a horizontal tray within a tunnel. The criteria for passing the Steiner Tunnel Test are as follows:

A. Flame spread—flame travel less than 5.0 feet.

B. Smoke Generation:
1. Maximum optical density of smoke less than 0.5.
2. Average optical density of smoke less than 0.15.

Because of concerns that flame and smoke could travel along the extent of a plenum area in the event the electrical conductors and cable were involved in a fire, the National Fire Protection Association ("NFPA") has developed a standard to reduce the amount of flammable material incorporated into insulated electrical conductors and jacketed cables. Reducing the amount of flammable material would, according to the NFPA, diminish the potential of the insulating and jacket materials from spreading flames and evolving smoke to adjacent plenum areas and potentially to more distant and widespread areas throughout a building.

The products of the present invention have also been developed to support the evolving NFPA standard referenced as NFPA 255 entitled "Limited Combustible Cables" with less than 50 as a maximum smoke index and/or NFPA 259 entitled "Heat of Combustion" which includes the use of an oxygen bomb calorimeter that allows for materials with less than 3500 BTU/lb. for incorporation into the newer cable (and conductors and separators within these cables) designs. The proposed materials of the present invention are for inclusion with high performance support separators and conduit tubes designed to meet the new and evolving standards proposed for National Electrical Code (NEC) adoption in 2005. Table 4 below provides the specific requirements for each of the Cables conforming to NEC/CEC/IEC requirements are characterized as possessing superior resistance to ignitability, greater resistant to contribute to flame spread and generate lower levels of smoke during fires than cables having lower fire ratings. Often these properties can be anticipated by the use of measuring a Limiting Oxygen Index (LOI) for specific materials used to construct the cable. Conventional designs of data grade telecommunication cable for installations in plenum chambers have a low smoke generating jacket material, e.g. of a specially filled PVC formulation or a fluoropolymer material, surrounding a core of twisted conductor pairs, each conductor individually insulated with a fluorinated insulation layer. Cable produced as described above satisfies recognized plenum test requirements such as the "peak smoke" and "average smoke" requirements of the Underwriters Laboratories, Inc., UL910 Steiner tunnel test and/or Canadian Standards Association CSA-FT6 (Plenum Flame Test) while also achieving desired electrical performance in accordance with EIA/TIA-568 A, B, and C for high frequency signal transmission.

The newer standards are forcing industrial "norms" to change and therefore require a new and unique set of materials that will be required to achieve new standards. These materials are the subject of the present invention and include nano-composites of clay and other inorganics such as ZnO and $TiO_2$ both also as nano-sized particles. In addition, the use of insulative or semi-conductive Buckminster fullerenes and doped fullerenes of the $C_{60}$ family and the like are part of the present invention and offer unique properties that allow for maintaining electrical integrity as well as providing the necessary reduction in flame retardance and smoke suppression.

While the above described conventional cable, due in part to their use of fluorinated polymers, meets all of the above design criteria, the use of fluorinated polymers is extremely expensive and may account for up to 60% of the cost of a cable designed for plenum usage. A solid core of these communications cables contributes a large volume of fuel to a potential cable fire. Forming the core of a fire resistant material, such as with FEP (fluorinated ethylene-propylene), is very costly due to the volume of material used in the core, but it should help reduce flame spread over the 20 minute test period. Reducing the mass of material by redesigning the core and separators within the core is another method of reducing fuel and thereby reducing smoke generation and flame spread. For the commercial market in Europe, low smoke fire retardant polyolefin materials have been developed that will pass the EN (European Norm) 502666-Z-X Class B relative to flame spread, total heat release, related heat release, and fire growth rate. Prior to this inventive development, standard cable constructions requiring the use of the aforementioned expensive fluorinated polymers, such as FEP, would be needed to pass this rigorous test. Using low smoke fire retardant polyolefins for specially designed separators used in cables that meet the more stringent electrical requirements for Categories 6 and 7 and also pass the new norm for flammability and smoke generation is a further subject of this invention. Tables 3A, 3B, and 4 indicates categories for flame and smoke characteristics and associated test methods as discussed above.

TABLE 3A

International Classification and Flame Test Methodology for Communications Cable

| Class | Test Methods | Classification Criteria | Additional Classification |
|---|---|---|---|
| $A_{ca}$ | EN ISO 1716 | PCS $\leq$ 2.0 MJ/kg (1) and PCS $\leq$ 2.0 MJ/kg (2) | |
| $B_{1ca}$ | $FIPEC_{20}$ Scenario 2 (6) and | FS $\leq$ 1.75 m and $THR_{1200} \leq$ 10 MJ and Peak HRR $\leq$ 20 kW and FIGRA $\leq$ 120 $Ws^{-1}$ | Smoke production (3, 7) and Flaming droplets/particles (4) and Acidity (5) |
| | EN 50285-2-1 | H $\leq$ 425 mm | |
| $B_{2ca}$ | $FIPEC_{20}$ Scenario 1 (6) and | FS $\leq$ 1.5 m and $THR_{1200} \leq$ 15 MJ and Peak HRR $\leq$ 30 kW and FIGRA $\leq$ 150 $Ws^{-1}$ | Smoke production (3, 8) and Flaming droplets/particles (4) and Acidity (5) |
| | EN 50285-2-1 | H $\leq$ 425 mm | |
| $C_{ca}$ | $FIPEC_{20}$ Scenario 1 (6) and | FS $\leq$ 2.0 m and $THR_{1200} \leq$ 30 MJ and Peak HRR $\leq$ 60 kW and FIGRA $\leq$ 300 $Ws^{-1}$ | Smoke production (3, 8) and Flaming droplets/particles (4) and Acidity (5) |
| | EN 50285-2-1 | H $\leq$ 425 mm | |
| $D_{ca}$ | $FIPEC_{20}$ Scenario 1 (6) and | $THR_{1200} \leq$ 70 MJ and Peak HRR $\leq$ 400 kW and FIGRA $\leq$ 1300 $Ws^{-1}$ | Smoke production (3, 8) and Flaming droplets/particles (4) and Acidity (5) |
| | EN 50285-2-1 | H $\leq$ 425 mm | |

TABLE 3A-continued

International Classification and Flame Test Methodology for Communications Cable

| Class | Test Methods | Classification Criteria | Additional Classification |
|---|---|---|---|
| Eca | EN 50285-2-1 | H ≦ 425 mm | Acidity (5) |
| Fca | | No Performance Determined | |

(1) For the product as a whole, excluding metallic materials.
(2) For any external component (ie. Sheath) of the product.
(3) S1 = $TSP_{1200}$ ≦ 50 $M^2$ and peak SPR ≦ 0.25 $m^2/s$ S2 = $TSP_{1200}$ ≦ 400 $M^2$ and peak SPR ≦ 1.5 $m^2/s$ S3 = Not S1 or S2
(4) For $FIPEC_{20}$ Scenarios 1 and 2: d0 = No flaming droplets/particles within 1200 s d1 = No flaming droplets/particles persisting longer than 10 s within 1200 s d3 = not d0 or d1
(5) EN 50285-2-1: (?) A1 = conductivity < 2.5 μS/mm and pH > 4.3 A2 = conductivity < 10 μS/mm and pH > 4.3 A3 = not A1 or A2 No declaration = No Performance Determined
(6) Airflow into chamber shall be set to 8000 +/− 800 l/min. $FIPEC_{20}$ Scen.1 = prEN50399-2-1 with mounting and fixing according to Annex 2 $FIPEC_{20}$ Scen.2 = prEN50399-2-2 with mounting and fixing according to Annex 2
(7) The smoke class declared in class B1ca cables must originate from the $FIPEC_{20}$ Scen.2 test
(8) The smoke class declared in class B2ca cables must originate from the $FIPEC_{20}$ Scen.1 test

TABLE 3B

International Classification and Test Methodology for Communications Cable

Pending CPD Euro-Classes for Cables

| | |
|---|---|
| PCS = gross calorific potential | FIGRA = fire growth rate |
| FS = flame spread (damaged length) | TSP = total smoke production |
| THR = total heat release | SPR = smoke production rate |
| HRR = heat release rate | H = flame spread |

TABLE 3B-continued

International Classification and Test Methodology for Communications Cable

Pending CPD Euro-Classes for Communications & Energy Cables

| | | |
|---|---|---|
| [A1] | EN ISO 1716 | Mineral Filled Circuit Integrity Cables |
| [B1] | FIPEC Sc.2/EN 50265-2-1 | LCC/HIFT - type LAN Comm. Cables |
| [B2] | FIPEC Sc.1/EN 50265-2-1 | Energy Cables |
| [C] | FIPEC Sc.1/EN 50265-2-1 | High FR/Riser-type Cables |
| [D] | FIPEC Sc.1/EN 50265-2-1 | IEC 332.3C type Cables |
| [E] | EN 50265-2-1 | IEC 332.1/VW1 type Cables |
| [F] | | No Requirement |

TABLE 4

Flammability Test Methods and Level of Severity for Wire and Cable

| Test Method | Ignition Source Output | Airflow | Duration |
|---|---|---|---|
| UL2424/NFPA 259/255/UL723 | 8 MJ/kg (35,000 BTU/lb.) | — | — |
| Steiner Tunnel UL 910/NFPA 262 | 88 kW (300 k BTU/hr.) | 73 m/min. (240 ft/min.) forced | 20 min. |
| RISER UL2424/NFPA 259 | 154 kW (527 K BTU/hr.) | Draft | 30 min. |
| Single Burning Item | 30 kW (102 k BTU/hr.) | 36 $m^3$/min. | 30 min. (20 min burner) |
| Modified IEC 60332-3 | 30 kW (102 k BTU/hr.) (Backboard behind ladder (heat impact)) | 8 $m^3$/min. | 20 min. |
| IEC 60332-3 | 20.5 kW (70 k BTU/hr.) | 5 $m^3$/min. | 20 min |
| Vertical Tray | 20.5 kW (70 k BTU/hr.) | Draft | 20 min |
| IEC 60332-1/ULVW-1 | Bunsen Burner | — | 1 min (15 sec. Flame) |

Evolution of Fire Performance (Severity Levels)
VW 1/IEC 60332-1/FT-1/CPD Class E   (least severe)
UL 1581 Tray/IEC 60332-3/FT-2/CPD Class D   ↓
UL 1666 Riser/FT-4/CPD Class C & B2   ↓
NFPA 262/EN 50289/FT-6/CPD Class B1/UL 910   ↓
NFPA 255 & NFPA 259/LC/CPD Class B1+/UL 2424   (most severe)

Table 5 indicates requirements for wire and cable that can meet some of the test method criteria as provided in Table 4. "Low smoke and flame compound A" is a fluoropolymer based blend that includes inorganics known to provide proper material properties such that NFPA 255 and NFPA 259 test protocols may be met.

addition, they also exhibit inferior resistance to burning and generally produce more smoke than FEP under burning conditions. A combination of the two different polymer types can reduce costs while minimally sacrificing physio-chemical properties. An additional method that has been used to improve both electrical and flammability properties includes

TABLE 5

Material Requirements and Properties for Plenum, Riser, and Halogen Free Cables

| Properties | Low Smoke and Flame Compound A NFPA 255/259 LC | LSFR PVC HIFT/NFPA 262 Euro Class B1 | (Halogen Free) IEC 332.2C Class C/D | (Halogen Free) IEC 332.1 Euro Class E |
|---|---|---|---|---|
| Specific Gravity | 2.77 g/cc | 1.65 g/cc | 1.61 g/cc | 1.53 g/cc |
| Durometer D Aged, Inst/15 sec. | 69/61 | 72/63 | 59/49 | 53/47 |
| Tensile Strength, 20"/min. | 2,250 psi/15.5 Mpa | 2,500 psi/17.2 Mpa | 1,750 psi/12.1 Mpa | 1,750 psi/12.1 Mpa |
| Elongation, 20"/min. | 250% | 180% | 180% | 170% |
| Oxygen Index, (0.125") | 100+% | 53% | 53% | 35% |
| Brittle point, deg. C. | −46 | −5 | −22 | −15 |
| Flexural Modulus, 0.03"/min. | 202000 psi/1400 Mpa | 56000 psi/390 Mpa | 41000 psi/280 Mpa | 49000 psi/340 MPa |
| UL Temp Rating, deg C. | 125+ | 60 | 90 | 75 |
| Dielectric Constant, 100 MHz | 2.92 | 3.25 | 3.87 | 3.57 |
| Dissipation Factor, 100 MHz | 0.012 | 0.014 | 0.015 | 0.014 |
| 4pr UTP Jkt Thickness | 9–11 mils/.23–.28 mm | 15–17 mils/.38–.43 mm | 30–40 mils/.76–1.02 mm | 20–24 mils/.50–.60 mm |

Table 6 is provided as an indicator of low acid gas generation performance for various materials currently available for producing wire and cable and cross-web designs of the present invention. The present invention includes special polymer blends that are designed to significantly reduce these values to levels to those shown for low smoke and flame Compound A listed above in Table 5.

TABLE 6

Acid Generation Values for Wire and Cable Insulation Materials

| Material | % Acid | PH |
|---|---|---|
| FEP | 27.18 | 1.72 |
| ECTFE | 23.890 | 1.64 |
| PVDF | 21.48 | 2.03 |
| LSFR PVC | 13.78 | 1.90 |
| Low Smoke and Flame Compound A | 1.54 | 3.01 |
| 48% LOI HFFR | 0.35 | 3.42 |
| 34% LOI HFFR | .024 | 3.94 |

Solid flame retardant/smoke suppressed polyolefins may also be used in connection with fluorinated polymers. Commercially available solid flame retardant/smoke suppressed polyolefin compounds all possess dielectric properties inferior to that of FEP and similar fluorinated polymers. In the irradiation of certain polymers that lend themselves to crosslinking. Certain polyolefins are currently in development that have proven capable of replacing fluoropolymers for passing these same stringent smoke and flammability tests for cable separators, also known as "cross-webs". Additional advantages with the polyolefins are reduction in cost and toxicity effects as measured during and after combustion. The present invention utilizes blends of fluoropolymers with primarily polyolefins as well as the use of "additives" that include $C_{60}$ fullerenes and compounds that incorporate the fullerenes and substituted fullerenes as well as inorganic clays and metal oxides as required for insulative or semi-conductive properties in addition to the flame and smoke suppression requirements. The use of fluoropolymer blends with other than polyolefins is also a part of the present invention and the incorporation of these other "additives" will be included as the new compounds are created. Reduction of acid gas generation is another key feature provided by the use of these blends as shown in Table 6 and another important advantage presented in the use of the cables and separators of the present invention. Price and performance characteristics for the separators and conduit tubes will determine the exact blend ratios necessary for these compounds.

A high performance communications data cable utilizing twisted pair technology must meet exacting specification with regard to data speed, electrical, as well as flammability and smoke characteristics. The electrical characteristics include specifically the ability to control impedance, near-end cross-talk (NEXT), ACR (attenuation cross-talk ratio) and shield transfer impedance. A method used for twisted pair data cables that has been tried to meet the electrical characteristics, such as controlled NEXT, is by utilizing individually shielded twisted pairs (ISTP). These shields insulate each pair from NEXT. Data cables have also used very complex lay techniques to cancel E and B (electric and magnetic fields) to control NEXT. In addition, previously manufactured data cables have been designed to meet ACR requirements by utilizing very low dielectric constant insulation materials. Use of the above techniques to control electrical characteristics have inherent problems that have lead to various cable methods and designs to overcome these problems. The blends of the present invention are designed such that these key parameters can be met.

Recently, as indicated in Tables 1, 2A and 2B, the development of "high-end" electrical properties for Category 6 and 7 cables has increased the need to determine and include power sum NEXT (near end crosstalk) and power sum ELFEXT (equal level far end crosstalk) considerations along with attenuation, impedance, and ACR values. These developments have necessitated the development of more highly evolved separators that can provide offsetting of the electrical conductor pairs so that the lesser performing electrical pairs can be further separated from other pairs within the overall cable construction.

Recent and proposed cable standards are increasing cable maximum frequencies from 100–200 MHz to 250–700 Mhz. Recently, 10 Gbit over copper high speed standards have been proposed. The maximum upper frequency of a cable is that frequency at which the ACR (attenuation/cross-talk ratio) is essentially equal to 1. Since attenuation increases with frequency and cross-talk decreases with frequency, the cable designer must be innovative in designing a cable with sufficiently high cross-talk. This is especially true since many conventional design concepts, fillers, and spacers may not provide sufficient cross-talk at the higher frequencies. Proposed limits for alien crosstalk have also been added to the present standards as shown in Table 2G. Such limits in many cases can only be met using the separators of the present invention.

Current separator designs must also meet the UL 910 flame and smoke criteria using both fluorinated and non-fluorinated jackets as well as fluorinated and non-fluorinated insulation materials for the conductors of these cable constructions. In Europe, the trend continues to be use of halogen free insulation for all components, which also must meet stringent flammability regulations. The use of the blends of the present invention for both separators and tube conduits will allow for meeting these requirements.

In plenum applications for voice and data transmission, electrical conductors and cables should exhibit low smoke evolution, low flame spread, and favorable electrical properties. Materials are generally selected for plenum applications such that they exhibit a balance of favorable and unfavorable properties. In this regard, each commonly employed material has a unique combination of desirable characteristics and practical limitations. Without regard to flame retardancy and smoke suppressant characteristics, olefin polymers, such as polyethylene and polypropylene, are melt extrudable thermoplastic materials having favorable electrical properties as manifested by their very low dielectric constant and low dissipation factor.

Dielectric constant is the property of an insulation material which determines the amount of electrostatic energy stored per unit potential gradient. Dielectric constant is normally expressed as a ratio. The dielectric constant of air is 1.0, while the dielectric constant for polyethylene is 2.2. Thus, the capacitance of polyethylene is 2.2 times that of air. Dielectric constant is also referred to as the Specific Inductive Capacity or Permittivity.

Dissipation factor refers to the energy lost when voltage is applied across an insulation material, and is the contangent of the phase angle between the voltage and current in a reactive component. Dissipation factor is quite sensitive to contamination of an insulation material. Dissipation factor is also referred to as the Power Factor (of dielectrics).

Fluorinated ethylene/propylene polymers exhibit electrical performance comparable to non-halogenated to olefin polymers, such as polyethylene, but are over 15 times more expensive per pound. Polyethylene also has favorable mechanical properties as a cable jacket as manifested by its tensile strength and elongation to break. However, polyethylene exhibits unfavorable flame and smoke characteristics.

Limiting Oxygen Index (ASTM D-2863) ("LOI") is a test method for determining the percent concentration of oxygen that will support flaming combustion of a test material. The greater the LOI, the less susceptible a material is to burning. In the atmosphere, there is approximately 21% oxygen, and therefore a material exhibiting an LOI of 22% or more cannot burn under ambient conditions. As pure polymers without flame retardant additives, members of the olefin family, namely, polyethylene and polypropylene, have an LOI of approximately 19. Because their LOI is less than 21, these olefins exhibit disadvantageous properties relative to flame retardancy in that they do not self-extinguish flame, but propagate flame with a high rate of heat release. Moreover, the burning melt drips on the surrounding areas, thereby further propagating the flame.

In the U.S. and Canada, the standards for flame retardancy for voice communication and data communication cables are stringent. The plenum cable test (U.L. 910/CSA FT-6) and riser cable test U.L. 1666 are significantly more stringent than the predominantly used International fire test IEC 332-3, which is similar to the IEEE 383/U.L. 1581 test. Table 4 already summarizes the standards required for various U.L. (Underwriters Laboratories and CSA (Canadian Standards Authority) cable designations.

As indicated above, current separator designs must also meet the UL 910 flame and smoke criteria using both fluorinated and non-fluorinated jackets as well as fluorinated and non-fluorinated insulation materials for the conductors of these cable constructions. The UL 910 criteria has been included in the recently adopted NFPA 262 criteria and extended with more severity in the NFPA 255 and 259 test criteria. To ensure that the test criteria is met, the use of the separators of the current invention is not only useful but often necessary. For meeting the NFPA 72 test criteria for circuit integrity cable, the support-separators and the materials from which they will be produced is an integral part of the present invention. The reduction in material loading (lbs/MFT) as shown in Table 7 can be an essential aspect in meeting this demand. Substantial reduction of this load by the use of separators can be achieved. The use of the polymer blends of the present invention for both separators and conduit tubes will allow for meeting the requirements for not only current circuit integrity cables but also for cables that must meet the newer more stringent requirements in the future.

TABLE 7

Insulation Material Criteria For Circuit Integrity Cable

| Number of Conductors | AWG size | Insulation Thickness (mils) | Jacket Thickness (mils) | Cable Diameter (in) | Approximate Weight (lbs/MFT) | Nominal Cable Lay (in./twist) |
|---|---|---|---|---|---|---|
| 2 | 16 | 35 | 40 | .34 | 59 | 3.7 |
| 2 | 14 | 35 | 40 | .36 | 75 | 4.0 |
| 2 | 12 | 35 | 50 | .42 | 106 | 4.4 |

Principal electrical criteria can be satisfied based upon the dielectric constant and dissipation factor of an insulation or jacketing material. Secondarily, the electrical criteria can be satisfied by certain aspects of the cable design such as, for example, the insulated twisted pair lay lengths. Lay length, as it pertains to wire and cable, is the axial distance required for one cabled conductor or conductor strand to complete one revolution about the axis of the cable. Tighter and/or shorter lay lengths generally improve electrical properties.

Individual shielding is costly and complex to process. Individual shielding is highly susceptible to geometric instability during processing and use. In addition, the ground plane of individual shields, 360° in ISTP's—individually shielded twisted pairs is also an expensive process. Lay techniques and the associated multi-shaped anvils of the present invention to achieve such lay geometries are also complex, costly and susceptible to instability during processing and use. Another problem with many data cables is their susceptibility to deformation during manufacture and use. Deformation of the cable geometry, such as the shield, also potentially severely reduces the electrical and optical consistency.

Optical fiber cables exhibits a separate set of needs that include weight reduction (of the overall cable), optical functionality without change in optical properties and mechanical integrity to prevent damage to glass fibers. For multi-media cable, i.e. cable that contains both metal conductors and optical fibers, the set of criteria is often incompatible. The use of the present invention, however, renders these often divergent set of criteria compatible. Specifically, optical fibers must have sufficient volume in which the buffering and jacketing plenum materials (FEP and the like) covering the inner glass fibers can expand and contract over a broad temperature range without restrictions, for example −40 C to 80 C experienced during shipping. It has been shown by Grune, et. al., among others, that cyclical compression and expansion directly contacting the buffered glass fiber causes excess attenuation light loss (as measured in dB) in the glass fiber. The design of the present invention allows for designation and placement of optical fibers in clearance channels provided by the support-separator having multiple shaped profiles. It would also be possible to place both glass fiber and metal conductors in the same designated clearance channel if such a design is required. In either case the forced spacing and separation from the cable jacket (or absence of a cable jacket) would eliminate the undesirable set of cyclical forces that cause excess attenuation light loss. In addition, fragile optical fibers are susceptible to mechanical damage without crush resistant members (in addition to conventional jacketing). The present invention addresses this problem by including the use of both organic and inorganic polymers as well as inorganic compounds blended with fluoropolymers to achieve the necessary properties.

The need to improve the cable and cable separator design, reduce costs, and improve both flammability and electrical properties continues to exist.

OBJECTIVE OF THE INVENTION

An objective is to provide a high performance communications cable where an interior support, a central region, and outwardly extended portions and optional conduit tubes are capable of shielding conductors that transmit data at 10 Gbit while substantially mitigating or eliminating alien crosstalk.

An objective of the invention is a high performance communications cable with an interior support, a central region, and outwardly extended portions and optional conduit tubes that are comprised of organic blends including homo and copolymers of ethylene or polyvinyl chloride with fluorinated ethylene propylene, fluorinated ethylene, chlorinated ethylene propylene, fluorochlorinated ethylene, perfluoroalkoxy, fluorochlorinated propylene, a copolymer of tetrafluoroethylene and perfluoromethylvinylether (MFE), a copolymer of ethylene and chlorotrifluoroethylene (ECTFE), as well as homo and copolymers of ethylene and/or propylene with fluorinated ethylene propylene, fluorinated ethylene, chlorinated ethylene propylene, fluorochlorinated ethylene, perfluoroalkoxy, fluorochlorinated propylene, as well as blends of polyvinyl chloride, polyvinylidene chloride, unsubstituted or substituted fullerenes primarily comprised of $C_{60}$ molecules, nylons, polyesters, polyurethanes; and nano-composites of clay including; and nano-sized particles of ZnO or TiO and the like.

Another objective is the high performance communications cable separator or conduit tube where the interior support, the central region, and outwardly extended portions and optional conduit tubes are comprised of compounds such as acid gas scavengers that scavenge gasses such as hydrogen chloride and hydrogen fluoride and other halogenated gasses.

Additionally, the high performance communications cable separator or conduit tube where the interior support, central region, and outwardly extended portions and optional conduit tubes are comprised of a foamed polymer blend ratio of halogenated polymers or copolymers to ethylene or vinyl chloride polymers or copolymers of from 0.1% to up to 99.9% of the halogenated polymers to ethylene or vinyl chloride polymers or copolymers and where the foam polymer blend includes a nucleating agent of polytetrafluoroethylene, carbon black, color concentrate or boron nitride or other acceptable nucleating or blowing agent.

Another objective is a high performance communications cable separator or conduit tube comprising an interior support with an external radial and axial surface, extending along a longitudinal length of a communications cable the interior support also having a central region, the central region also extending along a longitudinal length of the interior support of the communications cable; the interior support comprising one or more outwardly extended shaped portions and optional conduit tubes extended from the central region wherein the central region and outwardly extended portions are comprised of organic polymer blends.

Additionally, anvil-shaped core support-separator sections comprise channel walls defining one or more clearance channels and where the clearance channels are defined by a semi-circular geometry such that there remains a 180 degree opening along the external radial and axial surface of the interior support.

In addition, each anvil-shaped core support-separator sections comprises clearance walls defined by a semi-closed semi-circular geometry such that there remains less than a 160 degree opening along the exterior radial and axial surface, but more than a 10 degree opening along the external surface of the interior support of the clearance channels.

In another objective the flap-top is comprised of a press-fit arrangement that is hinged allowing for opening and closing the exterior radial and axial surfaces of the channel walls of the clearance channels.

Additionally the flap-top is sealed by use of heat, tape, interlocking, or by skin extrusion of the hinged press-fit arrangement.

An additional objective is anvil-shaped core support-separator sections comprising clearance walls defined by a fully closed circular geometry that remain closed but optionally includes an interlocking double flap-top, where the double flap-top is adhered to or adjoined with a surface on each side of the clearance walls for opening or closing the exterior radial and axial surfaces of the channel walls of the clearance channels.

Another objective is that the channel walls comprise interior surfaces that are corrugated including internal axial grooves separated by a sufficient distance such that individual conductors or conductor pairs maintain required electrical integrity and such that the conductor or conductor pairs are forced against an edge of the grooves or sections of the channel walls.

In addition, the metal conductors are copper with or without metallic shielding or aluminum with or without metallic shielding.

Additionally, at least one anvil shaped support-separator section comprises rounded edges at an outer radial end of the anvil shaped sections sufficient to reduce overall weight and size of the support-separator and subsequently the cable.

An additional objective is at least one anvil shaped support-separator sections comprising minimized dual lobes at an outer radial end of the multi-anvil shaped sections sufficient to minimize and reduce overall weight and size of the support-separator and subsequently the cable.

Additionally the anvil shaped core support-separator sections themselves are twisted to a specified lay length.

An additional objective is an interior support-separator for a communications cable extending along a longitudinal length of a communications cable comprising along the support-separator's cross-section a pendulum shaped configuration with two ends with a pendant shaped section comprising triangular shaped pendants with apexes that face in opposite directions along a horizontal plane in a central region of the pendulum shaped separator comprising a diamond-like shape and an optional hollow orifice in a center region of the central portion of the interior support-separator.

Additionally the triangular shaped pendants may be nearer either end of the central region of the pendulum shaped separator than near the central region.

Another objective of the present disclosure is an interior support-separator for a communications cable extending along a longitudinal length of a communications cable, comprising, along its cross-section, a dual-lobed shaped pendulum-like configuration with curved elongated lobed end portions along a top portion and a bottom portion of the pendulum-like separator creating at least two clearance channels for conductors or conductor pairs and an optional hollow orifice in a center region of the central portion of the interior support-separator.

In addition is an interior support-separator for a communications cable extending along a longitudinal length of a communications cable, comprising at least two symmetrical or asymmetrical intersecting arms that intersect in a cross-like manner along an essentially horizontal and vertical axis; the intersecting arms provided with ladder-like steps evenly spaced along each arm and along a complete length of the arm whereby each arm with the ladder-like steps forms a rifle-like pattern along the horizontal and vertical axes the intersecting arms providing four or more separate clearance channels and the arms are comprised of solid or foamed material.

Another objective is an interior support-separator for a communications cable extending along a longitudinal length of a communications cable, comprising at least two intersecting arms that intersect in a cross-like manner along an essentially horizontal and vertical axis with the intersecting arms optionally providing ladder-like steps evenly spaced along each arm and along a complete length of the arm whereby each arm with the ladder-like steps forms a rifle-like saw-tooth pattern along the horizontal and vertical axes and a central portion of the intersection of the arms, with the central portion comprising a solid predetermined shaped member that includes step-like portions cut away from the central solid member and an optional hollow orifice in a center region of the central portion of the interior support-separator where the central region is void of a saw-tooth member along at least one or more of the horizontal and vertical axes.

Additionally is an interior support-separator for a communications cable extending along a longitudinal length of a communications cable comprising at least two spatial quadrants defined by a horizontal arm member of a support including a two sided drill-bit-like shaped central member with geometrically symmetric sections in opposite quadrants and; each drill-bit-like shape a mirror image of the other drill-bit-like shape in the other quadrant and the support in sum appears to be shaped as a mirrored battleship and an optional hollow orifice in a center region of the central portion of the interior support-separator.

Another objective is an interior support-separator for a communications cable extending along a longitudinal length of a communications cable, comprising at least two intersecting arms that intersect in a cross-like manner comprising a cross-like support separator along an essentially horizontal and vertical axis; the intersecting arms optionally provided with ladder-like steps evenly spaced along each arm and along a complete length of the arm whereby each arm with the ladder-like steps forms a rifle-like saw-tooth pattern along the horizontal and vertical axes and a central portion of the intersection of the arms, with the central portion comprising an optional hollow center wherein the vertical and horizontal intersecting arms are initially wide or narrow along a horizontal or vertical axis and become finally narrow or wide along the horizontal or vertical axis such that the cross-like support separator comprises an asymmetric pattern.

Additionally an objective is an interior support-separator for a communications cable extending along a longitudinal length of a communications cable comprising at least two spatial quadrants defined by two horizontal members with two sides of the support connected by a vertical member with two sides such that the complete support appears as a symmetric or skewed angle iron with a z-like shape and where each of the members may be longer, shorter or the same length as each of the other two members.

An additional objective of this disclosure is an interior support providing a specified lay length by implementing a twisting of the clearance channels thereby providing a lay length twist into the support-separator during manufacturing of the final communications cable assembly.

Additionally an objective is a high performance communications cable comprising an interior support-separator with an external radial axial surface extending along a longitudinal length of the communications cable with the interior support also having a central region and the central region also extending along a longitudinal length of the interior support and the communications cable. The cable comprises 24 pair of electrical conductors and a twenty fifth pair of electrical conductors where the twenty fifth pair is placed within an orifice within the central region of the interior support-separator.

An objective also is a high performance communications cable where the interior support, the central region, and the outwardly extended sections and optional conduit tubes comprise solid, partially solid, or foamed organic or inorganic dielectric materials either solid or partially solid, foamed or foamed with a solid skin surface.

An objective also is a high performance communications cable separator or conduit tube where the interior support, the central region, and the outwardly extended sections and optional conduit tubes comprise solid, partially solid, or foamed organic or inorganic dielectric materials either solid or partially solid, foamed or foamed with a solid skin surface.

Additionally, there is an objective of a the high performance communications cable where the interior support, the central region and the anvil shaped core support-separator sections comprises solid, partially solid, or foamed thermoplastic or thermosetting dielectric materials.

In addition an objective is to provide a high performance communications cable where each of the anvil shaped core-support sections are optionally singularly filled with individual or paired metal or optionally coaxial electrical transmitting conductors or optical fiber light transmitting conductors, or filled with a combination of the individually or paired metal or optical conductors along the longitudinal length of the support and the cable.

Another objective is a high performance communications cable where the cable comprises one or more axial strength members and the axial strength members optionally lie parallel to the interior support inside the communications cable jacket or within the hollow portion of the interior support along the longitudinal direction of the support and the cable.

An additional objective is a high performance communications cable comprising an interior support with an external radial and axial surface extending along a longitudinal length of the communications cable, where the interior support also has a central region and the central region also extends along a longitudinal length of the interior support and the communications cable. The interior support comprises a hollow four-petal daisy shaped arrangement with a central core that may or may not be hollow with each of the hollow petals separated by 90 degrees along an axial plane that extends along a complete length of the communications cable allowing for individual or paired conductors to be placed within the hollow petals.

Additionally an objective is an interior support-separator for a communications cable comprising an interior support with an external radial and axial surface extending along a longitudinal length of the communications cable with the interior support also having a central region also extending along a longitudinal length of the interior support and the communications cable. The interior support comprises a hollow four-petal daisy shaped arrangement with a central core that may or may not be hollow with each of the hollow petals separated by 90 degrees along an axial plane that extends along a complete length of the communications cable allowing for individual or paired conductors to be placed within the hollow petals or within hollow sections of otherwise solid petals.

An additional objective is a high performance communications cable comprising an interior support with an external radial and axial surface extending along a longitudinal length of the communications cable with the interior support also having a central region also extending along a longitudinal length of the interior support and the communications cable. The interior support comprises an inner cross-like separator section with rifled sections extending outward into four quadrants away from the central region with the quadrants defined by 90 degree right angles formed by an intersection of the extended cross-like rifled separator sections encased within an outer insulated layer which is itself shaped in an identical cross-like pattern as the cross-like separator section so that dimensions of the outer insulated layer forms a cross-like pattern larger than the rifled inner cross and functions as a skin for the inner cross-like pattern.

An additional objective is a high performance communications cable comprising an interior support with an external radial and axial surface extending along a longitudinal length of the communications cable with the interior support also having a central region also extending along a longitudinal length of the interior support and the communications cable. The interior support comprises a cross-like separator section with zig-zag sections extending outward into four quadrants away from the central region, the quadrants defined by 90 degree right angles formed by an intersection of the extended cross-like zig-zag separator sections.

Additionally an objective is a high performance communications cable comprising an interior support with an external radial and axial surface extending along a longitudinal length of the communications cable with the interior support also having a central region also extending along a longitudinal length of the interior support and the communications cable. The interior support comprises a cross-like separator section with zig-zag sections that have sickle-like ends at each of the sections zig-zag sections and extend outward into four quadrants away from the central region, the quadrants defined by 90 degree right angles formed by an intersection of the extended cross-like zig-zag separator sections with the sickle-like ends.

Another objective is an interior support-separator for a communications cable extending along a longitudinal length of a communications cable comprising, along its cross-section, a maltese-cross shaped configuration with two arm members such that the maltese-cross shape is optionally skewed along one arm member with an axis along the arm member providing a length along one axis of the arm member that is longer than along any other axis and providing larger blunt tipped ends at both ends of the arm member. Blunt tipped ends at both ends of an arm member with a length shorter are smaller than the other longer arm member and have an optional hollow orifice in a center region of the central portion of the interior support-separator.

Additionally an objective is an interior support-separator for a communications cable where the maltese-cross shaped cross-sectional configuration along the cross-section includes step-like sections along a perimeter of the support-separator providing small interstitial sectional grooves along an inner circumferential portion of clearance channels provided by the support-separator and an optional hollow orifice in a center region of the central portion of the interior support-separator.

Another objective is an interior support-separator comprising within a cross-section, two hollow triangular orifices in the central region of the interior support-separator, where the hollow triangular orifices are shaped as equilateral triangles, one of the triangular orifice facing upright and the other triangular orifice facing downward such that that a peak of each triangular orifice is facing opposite directions.

Additionally an objective is an interior support-separator comprising within the cross-section, a diamond shaped orifice in the central region of the interior support-separator.

Another object is an interior support-separator comprising within the cross-section, a center slit orifice in the central region of the interior support-separator.

Additionally an objective is a method for producing a high performance communications cable by introducing an interior support-separator section or sections with a longitudinal length and the external radial and axial surfaces having a central region extending along a longitudinal length of the interior support with the one or more clearance channels into a jacket of the cable. This is accomplished by passing a plurality of transmission conductors within the clearance channels of the interior support-separator through a first die that aligns the plurality of transmission conductors with surface features of the internal support allowing for intentional twisting of the conductors. Each of the plurality of conductors are forced into a proper clearance channel of the interior support-separator where the clearance channels are optionally closed by single or double flap-tops maintaining a spatial relationship between each of the transmission conductors. Heating a second die allows for closing of the exterior surface of the channels. Additionally, taping and twisting of the interior support allows for closing of the exterior surface of the channels and allows for jacketing the interior support containing each of the conductors within the clearance channels.

Additionally an objective is a method for producing a high performance communications cable by introducing an interior support-separator section or sections with a longitudinal length and the external radial and axial surfaces having a central region extending along a longitudinal length of the interior support with one or more hollow central ring portions optionally jacketed to complete the cable. Another step is passing a plurality of transmission conductors within the hollow central ring portions of the interior support-separator through a first die that aligns the plurality of transmission conductors with the surface features of the internal support allowing for intentional twisting of the conductors, forcing each of the plurality of conductors into the hollow central ring portions of the interior support-separator where the hollow central ring portions maintain a spatial relationship between each of the transmission conductors by optionally shielding and jacketing the interior support containing each of the conductors within the hollow central ring portions and optionally pulling each of the transmission conductors through the hollow central ring portion(s) or the support-separators either before, during or after initial installation.

An additional objective is a high performance communications cable comprising an interior support-separator with an external radial and axial surface extending along a longitudinal length of the communications cable with the interior support also having a central region also extending along a longitudinal length of the interior support and the communications cable. The support is comprised of a polyolefin based material capable of meeting specific flammability and smoke generation requirements as defined by UL 910, NAPA 262, and EN 50266-2-x, class B test specifications.

An additional objective is a high performance communications cable comprising an interior support-separator with an external radial and axial surface extending along a longitudinal length of the communications cable with the interior support also having a central region also extending along a longitudinal length of the interior support and the communications cable. The support is comprised of a thermoplastic based material capable of meeting specific flammability and smoke generation requirements as defined by UL 910, NAPA 262, and EN 50266-2-x, class B test specifications.

SUMMARY OF THE INVENTION

This invention provides a lower cost communications cable, conductor separator, and in some cases a conduit tube exhibiting improved electrical, flammability, and optionally, optical properties. The cable has an interior support and in some cases a conduit tube extending along the longitudinal length of the communications cable. The interior support has a central region extending along the longitudinal length of the interior support. In the preferred configuration, the cable includes a geometrically symmetrical core support-separator with a plurality of either solid or foamed multi-shaped, rifled and ladder sections that extend radially outward from the central region along the longitudinal or axial length of the cable's central region. The core support-separator is optionally foamed and has an optional hollow center. These various shaped sections of the core support-separator may be helixed as the core extends along the length of the communications cable. Each of the adjacent shaped sections defines a clearance which extends along the longitudinal length of the multi-shaped core support-separators. The clearance provides a channel for each of the conductors/optical fibers or conductor pairs used within the cable as well as for the optional conduit tubes that may be initially empty so that conductors can be later placed there within. The clearance channels formed by the various shaped core support-separators extend along the same length of the central portion. The channels are either semi-circular, fully circular, or stepped in a circular-like manner shaped cross-section with completely closed surfaces in the radial direction toward the center portion of the core and optionally opened or closed surfaces at the outer radial portion of the same core. Adjacent channels are separated from each other to provide a chamber for at least a pair of conductors or an optical fiber or optical fibers. Conduit channels of various shapes may be used in addition to or in lieu of the adjacent channels.

The various shaped core support-separators of this invention provides a superior crush resistance to the protrusions of the standard "X" or other similar supports. A superior crush resistance is obtained by the arch-like design for the anvil-shaped separators that provide clearance channels for additional support to the outer section of the cable. The various shaped cores better preserves the geometry of the pairs relative to each other and of the pairs relative to the other parts of the cables, such as the possible use of a shield or optical fibers. The anvil-shape provides an exterior surface that essentially establishes the desired roundness for cable manufacturers. The exterior roundness ensures ease of die development and eventual extrusion. The rounded surface of the core also allows for easy accommodation of an overall external shield.

The rifled shape separators with ladder-like sections provide similar crush resistance to the standard "X" supports with the additional feature that the center portion of the separator may have solid sections that can be adjusted in step-like increments such that conductor spacing can be controlled with a degree of precision. Specifically, the conductors can be set apart so that individual or sets of pairs can be spaced closer or farther from one another, allowing for better power sum values of equal level far end and near end crosstalk. This "offsetting" between conductor pairs in a logical, methodological pattern to optimize electrical properties is an additional benefit associated with the rifled shaped separators with ladder-like sections.

According to one embodiment, the cable includes a plurality of transmission media with metal and/or optical conductors that are individually disposed; and an optional outer jacket maintaining the plurality of data transmission media in proper position with respect to the core. The core is comprised of a support-separator having a multi-anvil shaped profile that defines a clearance to maintain a spacing between transmission media or transmission media pairs in the finished cable. The core may be formed or a conductive or insulative material to further reduce cross-talk, impedance, and attenuation. It may be solid, foamed, foamed with a solid skin, and composed of a blend of non-halogenated as well as halogenated polymers that also include inorganic fillers as described above.

Accordingly, the present invention provides for a communications cable, conductor separator and in some cases a conduit tube, with a multi-shaped support-separator, that meets the exacting specifications of high performance data cables and/or fiber optics or the possibility of including both transmission media in one cable, has a superior resistance to deformation during manufacturing and use, allows for control of near-end cross-talk, controls electrical instability due to shielding, is capable of 200 and 1 Ghz (categories 6 and 7 and beyond) transmission with a positive attenuation to cross-talk ratio (ACR ratio) of typically 3 to 10 dB.

Moreover, U.S. Pat. No. 6,639,152 provides a separator so that jacket material (which normally has inferior electrical properties as compared with the conductor material) is actually pushed away from the electrical conductor, thus acting to again improve electrical performance (ACR, etc.) over the life of the use of the cable. The anvil-shaped separator, by simple geometric considerations is also superior to the "X" type separator in that it increases the physical distance between the conductor pairs within the same cable configuration, as shown in FIGS. 2 and 3.

Additionally, it has been known that the conductor pair may actually have physical or chemical bonds that allow for the pair to remain intimately bound along the length of the cavity in which they lie. U.S. Pat. No. 6,639,152 describes a means by which the conductor pairs are adhered to or forced along the cavity walls by the use of grooves. This again increases the distance, thereby increasing the volume of air or other dielectrically superior medium between conductors in separate cavities. As discussed above, spacing between pairs, spacing away from jackets, and balanced spacing all have an effect on final electrical cable performance.

It is an object of the present invention to provide a data/multi-media cable that has a specially designed interior support that accommodates conductors with a variety of AWG's, impedances, improved crush resistance, controlled NEXT, controlled electrical instability due to shielding, increased breaking strength, and allows the conductors, such as twisted pairs, to be spaced in a manner to achieve positive ACR ratios using non-conventional composite compound blends that include halogenated and non-halogenated polymers together with optional inorganic and organic additives that include inorganic salts, metallic oxides, silica and silicon oxides as well as any number of substitute and unsubstantiated fullerenes.

It is still another object of the invention to provide a cable that does not require individual shielding and that allows for the precise spacing of conductors such as twisted pairs and/or fiber optics with relative ease. In the present invention, the cable would include individual glass fibers as well as conventional metal conductors as the transmission medium that would be either together or separated in clearance channel chambers provided by the anvil-shaped sections of the core support-separator or could be placed either immediately or at a later time into conduit tubes.

Another embodiment of the invention includes having a multi-shaped core support-separator with a central region that is either solid or partially solid. Again this support-separator and any conduit tube would be comprised of the special composite compound blends described in detail above. This again includes the use of a foamed core and/or the use of a hollow center of the core, which in both cases significantly reduces the material required along the length of the finished cable. The effect of foaming and/or producing a support-separator with a hollow center portion should result in improved flammability of the overall cable by reducing the amount of material available as fuel for the UL 910 test, improved electrical properties for the individual non-optical conductors, and reduction of weight of the overall cable.

A further embodiment includes the fully opened surface sections defining the core clearance channels which extend along the longitudinal length of the multi-anvil shaped core support-separator as provided in U.S. Pat. No. 6,639,152. This clearance provides half-circular channel walls for each of the conductors/optical fibers or conductor pairs used within the cable. A second version of this embodiment includes a semi-closed or semi-opened surface section defining the same core clearance channel walls. These channel walls would be semi-circular to the point that at least 200 degrees of the potential 360 degree wall enclosure exists. Typically, these channels walls would include and opening of 0.005 inches to 0.011 inches wide. A third version of this embodiment includes either a fully closed channel or an almost fully closed channel of the anvil-shaped core support-separator such that this version could include the use of a "flap-top" initially providing an opening for insertion of conductors or fibers and thereafter providing a covering for these same conductors or fibers in the same channel. The flap-top closure can be accomplished by a number of manufacturing methods including heat sealing during extrusion of the finished cable product. Other methods include a press-fit design, taping of the full assembly, or even a thin skin extrusion that would cover a portion of the multi-anvil shaped separator. All such designs could be substituted either in-lieu of a separate cable jacket or with a cable jacket, depending on the final property requirements. All such designs of the present invention would incorporate the use if the special composite compound blends as previously described.

Yet another embodiment provided in U.S. Pat. No. 6,639, 152 that is included in the present invention allows for interior corrugated clearance channels provided by the multi-shaped sections of the core support-separator. This corrugated internal section has internal axial grooves that allow for separation of conductor pairs from each other or even separation of single conductors from each other as well as separation of optical conductors from conventional metal conductors. Alternatively, the edges of said grooves may allow for separation thus providing a method for uniformly locating or spacing the conductor pairs with respect to the channel walls instead of allowing for random floating of the conductor pairs.

Each groove can accommodate at least one twisted pair. In some instances, it may be beneficial to keep the two conductors in intimate contact with each other by providing grooves that ensure that the pairs are forced to contact a portion of the wall of the clearance channels. The interior support provides needed structural stability during manufacture and use. The grooves also improve NEXT control by allowing for the easy spacing of the twisted pairs. The easy spacing lessens the need for complex and hard to control lay procedures and individual shielding. Other significant advantageous results such as: improved impedance determination because of the ability to precisely place twisted pairs: the ability to meet a positive ACR value from twisted pair to twisted pair with a cable that is no larger than an ISTP cable; and an interior support which allows for a variety of twisted pair and optical fiber dimensions.

Still another related embodiment includes the use of an exterior corrugated or convoluted design such that the outer surface of the support-separator has external radial grooves along the longitudinal length of the cable. This exterior surface can itself function as a jacket if the fully closed anvil-shaped version of the invention as described above is utilized. Additionally, the jacket may have a corrugated, smooth or ribbed surface depending on the nature of the installation requirements. In raceways or plenum areas that are new and no previous wire or cable has been installed, the use of corrugated surfaces can enhance flex and bending mechanical strength. For other installations, a smooth surface reduces the possibility of high friction when pulling cable into areas where it may contact surfaces other than the raceway or plenum. Mechanical integrity using an outer jacket such as depicted in FIG. 2a, 2b, or 2c may be essential for installation purposes.

Alternatively, depending on manufacturing capabilities, the use of a tape or polymeric binding sheet may be necessary in lieu of extruded thermoplastic jacketing. Taping or other means may provide special properties of the cable construction such as reduced halogen content or cost and such a construction is found in FIG. 2c.

Yet another related embodiment includes the use of a strength member together with, but outside of the multi-anvil shaped core support-separator running parallel in the longitudinal direction along the length of the communications cable. In a related embodiment, the strength member could be the core support-separator itself, or in an additional related embodiment, the strength member could be inserted in the hollow center-portion of the core.

According to another embodiment of the invention, the multi-anvil shaped core support-separator optionally includes a slotted section allowing for insertion of an earthing wire to ensure proper and sufficient electrical grounding preventing electrical draft.

It is possible to leave the multi-anvil shaped separator cavities empty in that the separator itself or within a jacket would be pulled into place and left for future "blown fiber" or other conductors along the length using compressed air or similar techniques such as use of a pulling tape or the like Additional embodiments to the invention include the use of rifled shape separators with ladder-like sections to provide similar crush resistance to the standard "X" supports. These rifled sections, however, have the additional feature that the center portion of the separator may include solid sections that can be adjusted in step-like increments such that conductor spacing can be controlled with a degree of precision. Specifically, the conductors can be set apart so that individual pairs or sets of pairs can be spaced closer or farther from one another, allowing for better power sum values of equal level far end and near end cross-talk. This "offsetting" between conductor pairs in a logical, methodological pattern to optimize electrical properties, is an additional benefit associated with the rifled shaped separators with ladder-like sections.

It is to be understood that each of the embodiments above could include a flame-retarded, smoke suppressant version and that each could include the use of recycled or reground thermoplastics in an amount up to 100%.

A method of producing the communications cable, introducing any of the multi-shaped core separators as described above, into the cable assembly, is described as first passing a plurality of transmission media and a core through a first die which aligns the plurality of transmission media with surface features of the core and prevents or intentionally allows twisting motion of the core. Next, the method bunches the aligned plurality of transmission media and core using a second die which forces each of the plurality of the transmission media into contact with the surface features of the core which maintain a spatial relationship between each of plurality of transmission media. Finally, the bunched plurality of transmission media and core are optionally twisted to close the cable, and the closed cable optionally jacketed.

Other desired embodiments, results, and novel features of the present invention will become more apparent from the following drawings and detailed description and the accompanying claims.

BRIEF DESCRIPTION OF THE DRAWINGS

FIG. 1b is a top-right view of one embodiment of the cable and separator that includes solid or foamed polymeric grooved internal and external surfaces.

FIG. 3e is a cross-section end view of the single flap, flap-top embodiment of the interior support or anvil-shaped separator taken along the horizontal plane of the interior support anvil-shaped separator when the flap is closed.

FIG. 3f is an enlarged detailed version of the closed single-flap, flap-top embodiment of the anvil-shaped separator.

FIG. 11 is a cross-section end view of a skewed maltese-cross type separator for "worst" pair spacing.

FIG. 22 is a cross-sectional view of a saw-blade horizontal member-type separator.

FIG. 29a has no inner ring. FIG. 29b has a smooth inner ring with optionally different material than the outer ring, and FIG. 29c has a an inner ring with rifled sections. Each can optionally be used for coax or twisted pair as well as for fiber optic conductors in advance, during or after installation.

FIGS. 33a and 33b include view of optionally filled inner hollow regions such that each can optionally be used for coax or twisted pair as well as for fiber optic conductors (in advance, during or after installation).

DETAILED DESCRIPTION OF THE DRAWINGS

The following description will further help to explain the inventive features of the cable and the interior support portion of the cable.

Figure 1A:
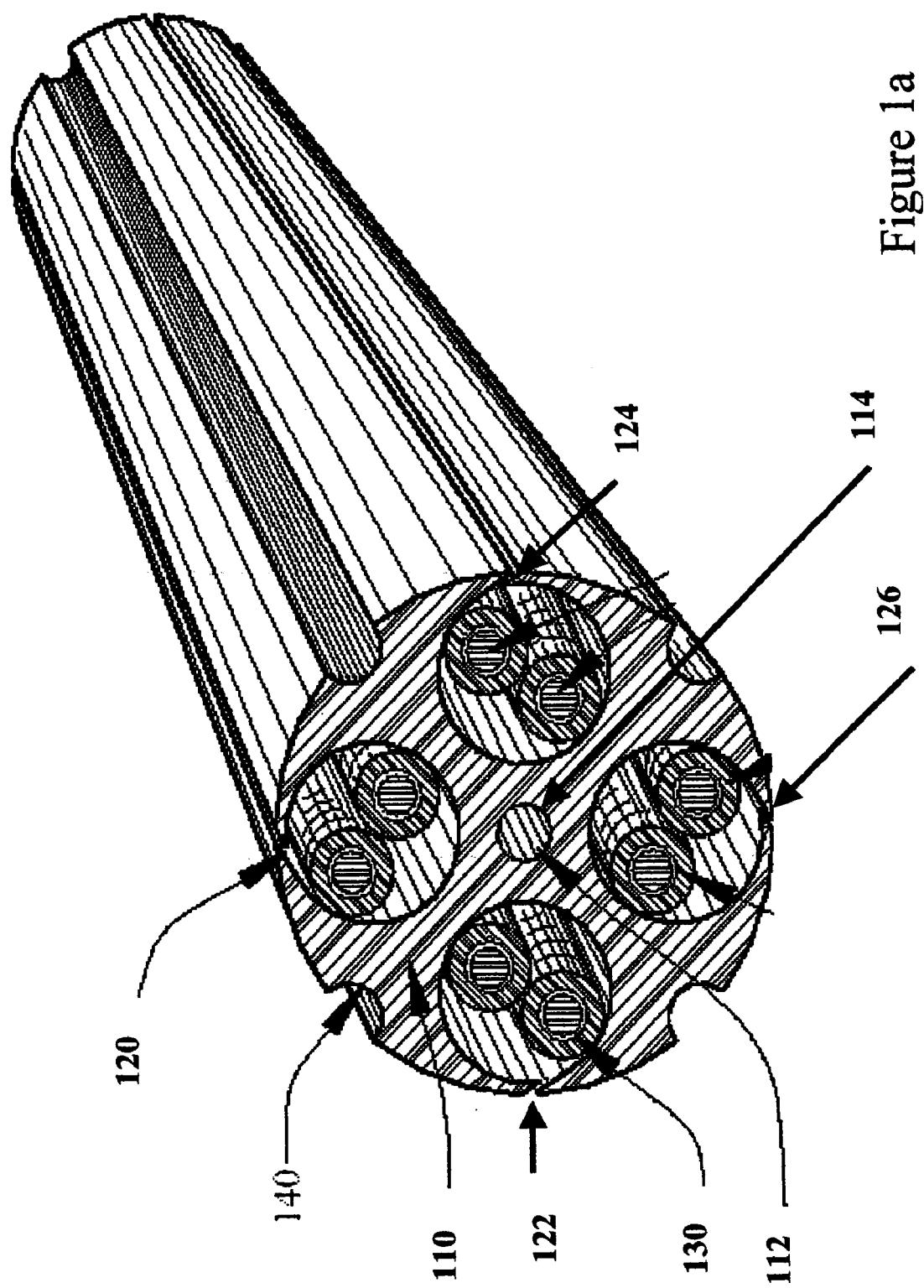
FIG. 1a is a top-right view of one embodiment of the cable and separator that includes solid or foamed polymeric smooth internal and external surfaces.

FIG. 1a is a top-right view of one embodiment of this invention. The shown embodiment has an interior support shown as an anvil-shaped separator (110). The interior support anvil-shaped separator, shown in more detail in FIGS. 3 and 4, runs along the longitudinal length on the cable. The interior support anvil-shaped separator, hereinafter, in the detailed description, referred to as the "anvil-shaped separator", has a central region (112) extending along the longitudinal length of the cable. The center region includes a cavity that runs the length of the separator in which a strength member (114) may be inserted.

Channels 120, 122, 124, and 126 extend along the length of the anvil-shaped separator and provide compartments for conductors (130).

A strength member may be added to the cable. The strength member (114) in the shown embodiment is located in the central region of the anvil-shaped separator. The strength member runs the longitudinal length of the anvil-shaped separator. The strength member is a solid polyethylene or other suitable plastic, textile (nylon, aramid, etc.), fiberglass flexible or rigid (FGE rod), or metallic material.

Conductors, such as the shown insulated twisted pairs, (130) are disposed in each channel. The pairs run the longitudinal length of the anvil-shaped separator. While this embodiment depicts one twisted pair per channel, there may be more than one pair per channel. The twisted pairs are insulated with a suitable polymer, copolymer, or dual extruded foamed insulation with solid skin surface. The conductors are those normally used for optical or conventional data transmission. The twisted pairs may be bonded such that the insulation of each conductor is physically or chemically bound in an adhesive fashion, or an external film could be wrapped around each conductor pair to provide the same effect. Although the embodiment utilizes twisted pairs, one could utilize various types of insulated conductors within the anvil-shaped separator channels or cavities.

A metal drain wire may be inserted into a specially designated slot (140). The drain wire functions as a ground or earthing wire. It also serves to reduce material content and maybe applicable to each anvil-type separator.

FIG. 1b is another embodiment that includes grooves (150) on either the exterior surface of the separator or within the channels of the separator or both. The interior grooves within the channels of this embodiment are specifically designed so that at least a single conductor of a conductor pair can be forced along the inner wall of the groove, thereby allowing for specific spacing that improves electrical properties associated with the conductor or conductor pair. A cross section of this separator with channeled grooves is shown and discussed in a later figure.

Figure 1C:
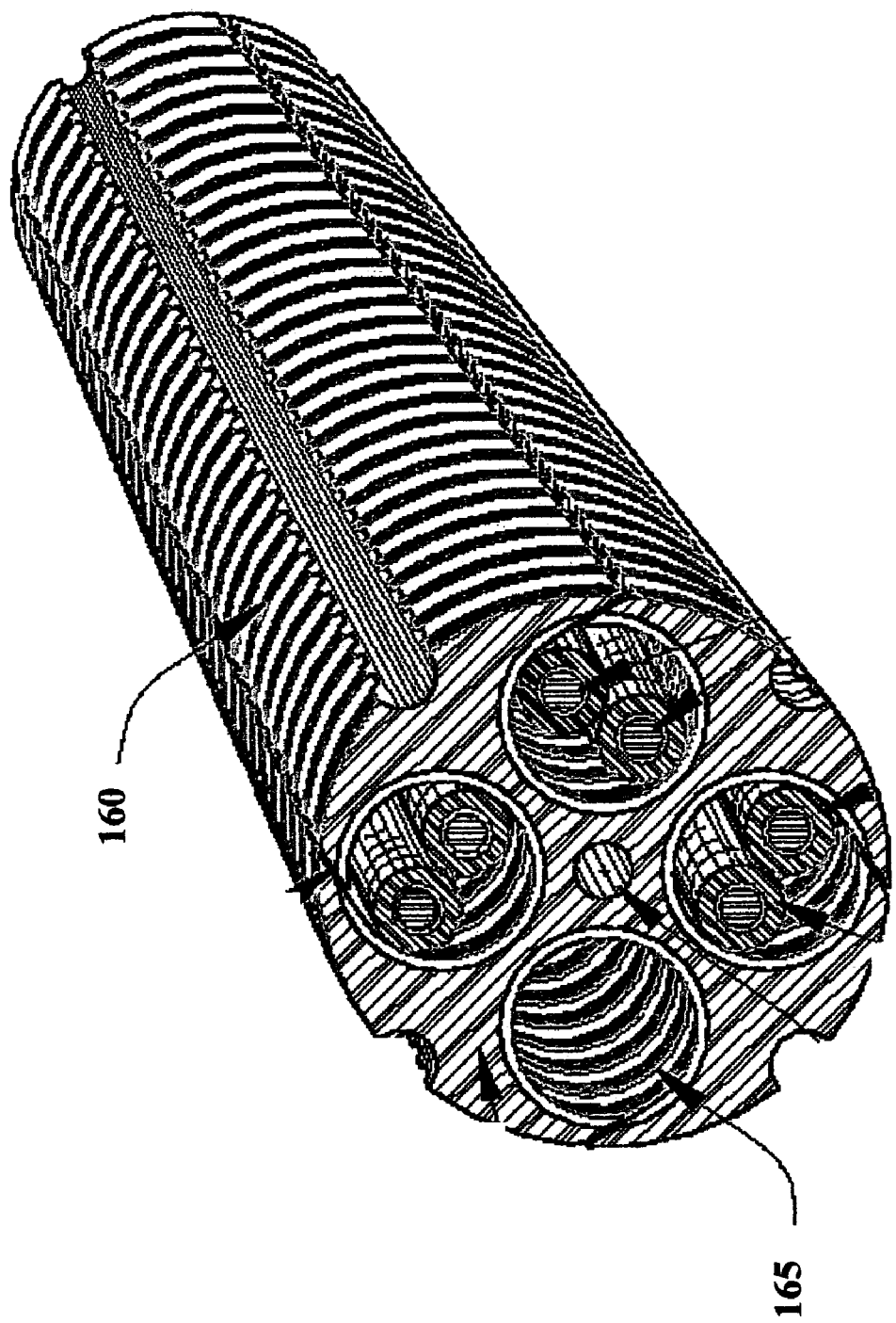
FIG. 1c is a top-right view of one embodiment of the cable and separator that includes solid or foamed polymeric corrugated internal and external surfaces.

FIG. 1c is yet another related embodiment that includes the use of an exterior corrugated design (160) such that the outer surface of the support-separator has external radial grooves along the longitudinal length of the cable. This exterior surface can itself function as a jacket if the fully closed anvil-shaped version of the invention as described above is utilized. Optionally, this corrugated version of FIG. 1c may also include the channeled grooves shown in FIG. 1b.

The anvil-shaped separator may be cabled with a helixed configuration. The helically twisted portions (165) in turn define helically twisted conductor receiving grooves within the channels that accommodate the twisted pairs or individual optical fibers.

Figure 2A:
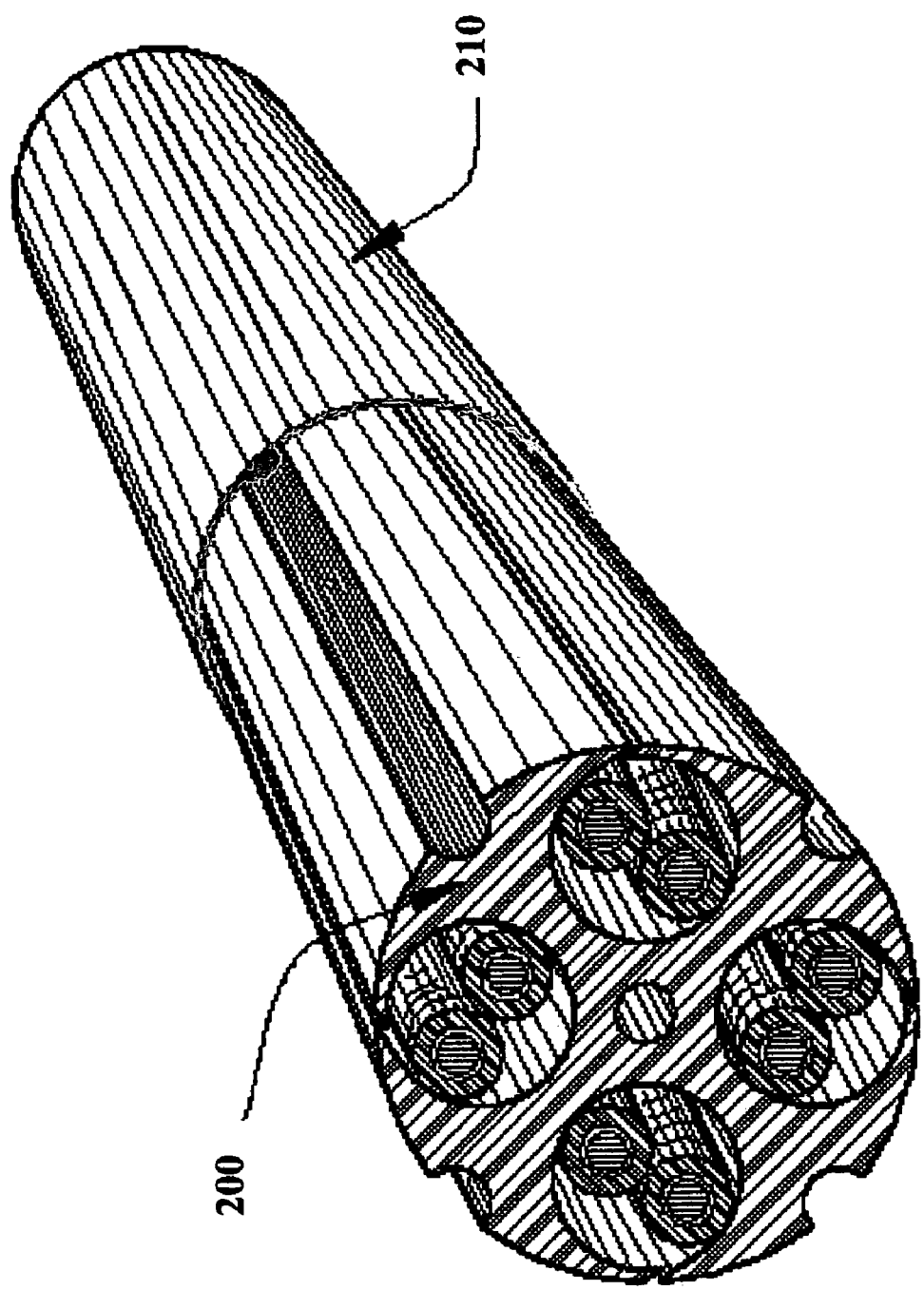
FIG. 2a is a top-right view of one embodiment of the cable and separator that includes an anvil-shaped separator and a smooth/ribbed jacket.

The cable (200), as shown in FIG. 2a is a high performance cable capable of greater than 600 MHz and easily reaching 2 Ghz or greater. The cable has an optional outer jacket (210) that can be a thermoplastic, polyvinyl chloride, a fluoropolymer or a polyolefin, or a thermoset, with or without halogen free material as required by flammability, smoke generation, corrosivity, or toxicity, and electrical specifications as detailed above. Additionally, the jacket may be either corrugated (220) as in FIG. 2b or smooth/ribbed (210) depending on the nature of the installation requirements. Mechanical integrity using an outer jacket such as depicted in FIGS. 2a and 2b, may be essential for installation purposes.

Figure 2B:
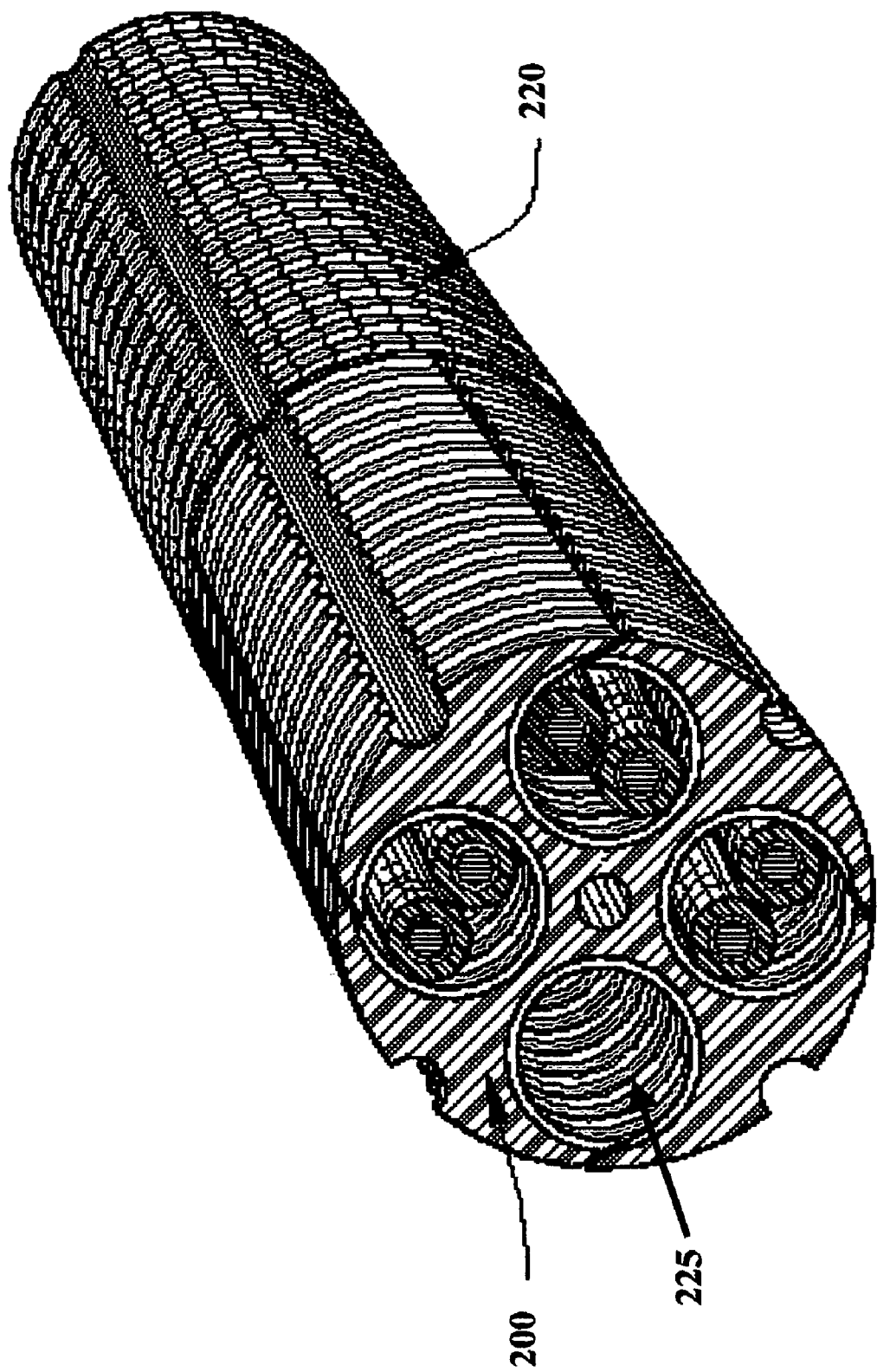
FIG. 2b is a top-right view of another embodiment of the cable and separator that includes a ribbed, corrugated jacket.

FIG. 2b is another embodiment that includes grooves along the interior channels of the separator. The interior grooves (225) within the channels of this embodiment are also specifically designed so that at least a single conductor of a conductor pair can be forced along the inner wall of the groove, thereby allowing for specific spacing that improves electrical properties associated with the conductor or conductor pair.

Figure 2C:
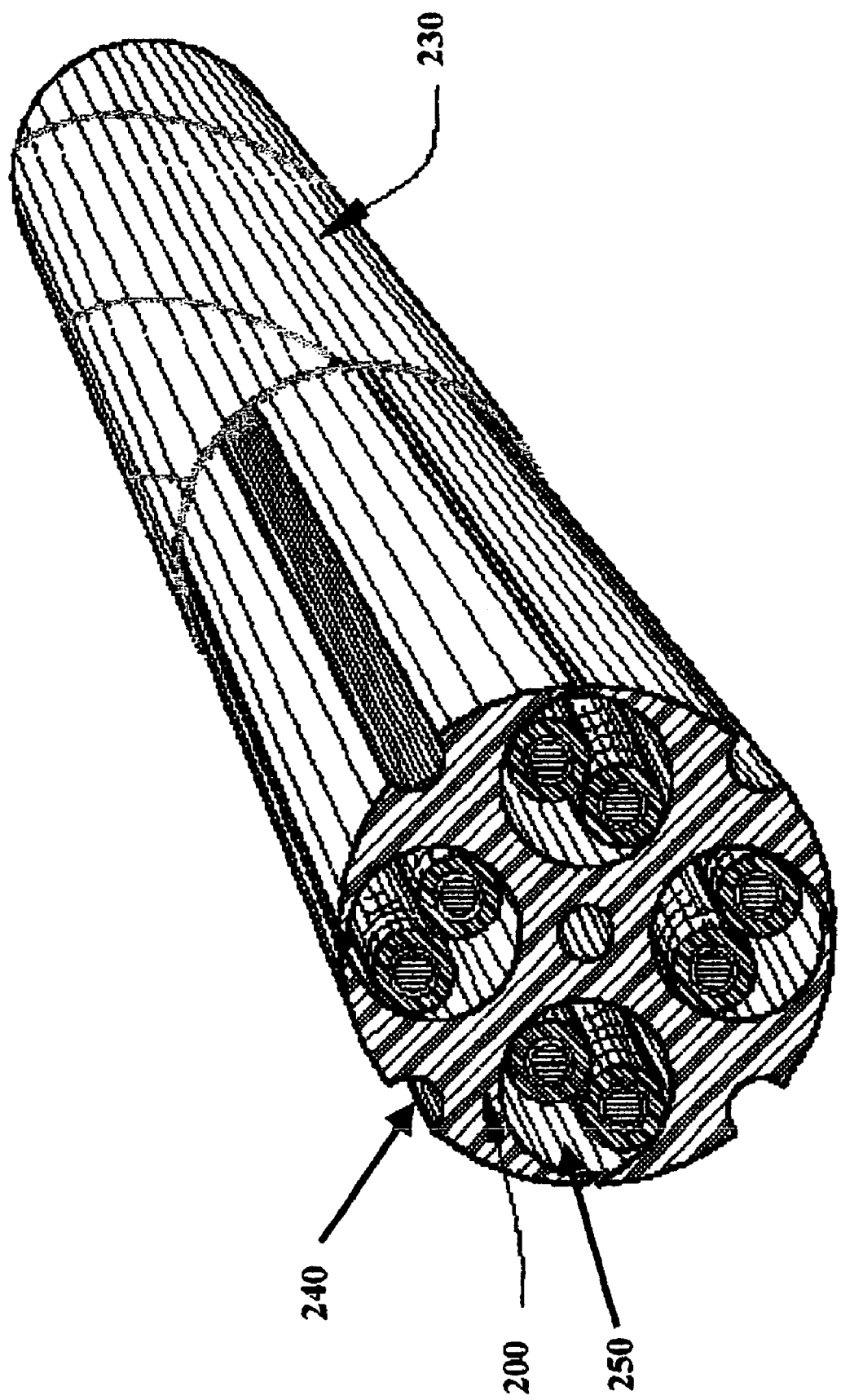
FIG. 2c is a top-right view of another embodiment of the cable and separator that includes a taped or polymer binder sheet jacketing configuration.

Over the anvil shaped separator optional polymer binder sheet or tape or sheets or tapes (230) that may be nonwovens such as polyimide, polyether-imide, mica, or other fire retardant inorganic tapes may be used as shown in FIG. 2c for circuit integrity cable. The binder is wrapped around the anvil shaped separator (200) to enclose the twisted pairs or optical fiber bundles. The binder or tape itself maybe a laminated aluminum shield or the aluminum shield may also be included under the polymer binder sheet. The electromagnetic interference and radio frequency (EMI-RFI) shield is a tape with a foil or metal surface facing towards the interior of the jacket that protects the signals carried by the twisted pairs or fiber cables from electromagnetic or radio frequency distortion. The shield may be composed of a foil and has a belt-like shield that can be forced into a round, smooth shape during manufacture. This taped embodiment with shield may be utilized to control electrical properties with extreme precision. This shielded version is capable of at least 1 Ghz or higher frequency signal propagation. Each of the individual conductor pairs may themselves be individually shielded. A metal drain wire may be inserted into a specially designated slot (240) that then can be subsequently wrapped around the shield. The drain wire within the slot runs the length of the cable. The drain wire functions as a ground or earthing wire.

Use of the term "cable covering" refers to a means to insulate and protect the cable. The cable covering being exterior to said anvil member and insulated conductors disposed in grooves provided within the clearance channels. These grooves within clearance channels allow for proper insertion of conductors. Recent developments in communications cabling has shown that improvements in electrical properties can be accomplished if "worst" pair conductors are spaced such that they are physically further removed from other "worst pair" conductors. "Worst pair" refers to two conductors that are physically matched and can be helically twisted around each other such that electrical properties such as attenuation, crosstalk, and impedance properties are least favorable in comparison with other similarly paired conductors. Inevitably, during cable manufacture, at least one set of paired conductors exhibit these "worst pair" parameters and a major attribute of this invention is to space these "worst pairs" far from the better electrical transmission performing pairs. Parallel pair conductors with individual shielding can also be used to achieve the present invention.

The outer jacket, shield, drain spiral and binder described in the shown embodiment provide an example of an acceptable cable covering. The cable covering, however, may simply include an outer jacket or may include just the exterior surface (corrugated or convoluted with ribbed or smooth surfaces) of the anvil shaped interior support member.

The cable covering may also include a gel filler to fill the void space (250) between the interior support, twisted pairs and a portion of the cable covering, The clearance channels formed by the anvil shaped interior support member of the present inventive cable design allows for precise support and placement of the twisted pairs, individual conductors, and optical fibers. The anvil shaped separator will accommodate twisted pairs of varying AWG's and therefore of varying electrical impedance. The unique circular shape of the separator provides a geometry that does not easily crush and allows for maintenance of a cable appearing round in final construction.

The crush resistance of the inventive separator helps preserve the spacing of the twisted pairs, and control twisted pair geometry relative to other cable components. Further, adding a helical twist allows for improving overall electrical performance design capability while preserving the desired geometry.

The optional strength member located in the central region of the anvil shaped separator allows for the displacement of stress loads away from the pairs.

Figure 3A:
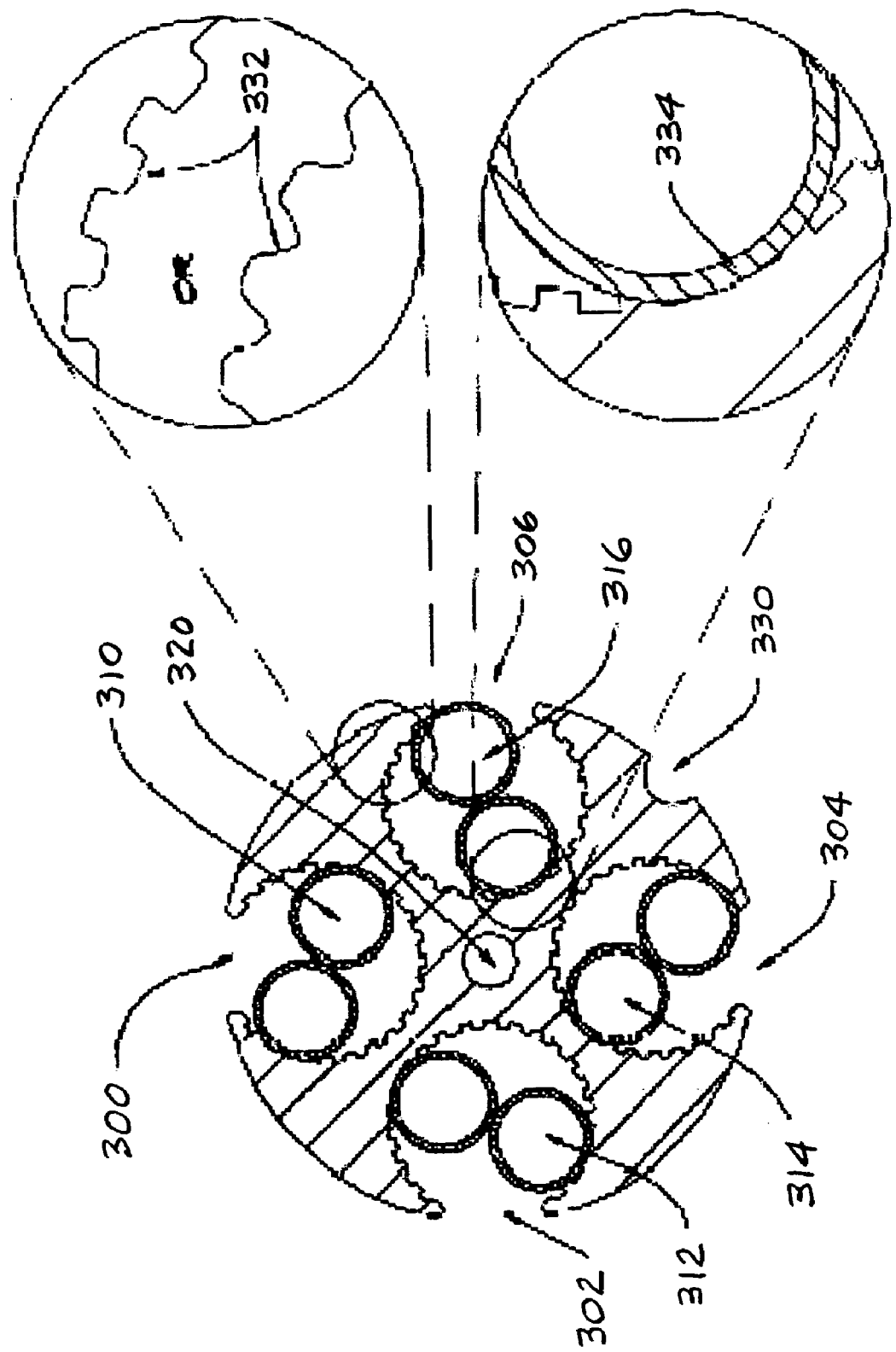
FIG. 3a is a cross-section end view of the interior support or anvil-shaped separator taken along the horizontal plane of the interior support anvil-shaped separator.

FIG. 3a is a horizontal cross-section of a preferred embodiment of the anvil-shaped separator. The anvil-shaped separator can be typically approximately 0.210 inches in diameter. It includes four channels (300, 302, 304, and 306) that are typically approximately 0.0638 to 0.0828 inches in diameter. The channel centers are 90 degrees apart relative to the center of the separator. Each channel is typically approximately 0.005 inches from the channel across from it, and each channel is approximately 0.005–0.011 inches apart form its two nearest-neighboring channels at their closest proximity. Inserted in the channels is one set of twisted pairs (310, 312, 314, and 316) with the option for adding twisted pairs to each channel denoted by dashed circles. In a preferred embodiment, each channel has typically a 0.037-inch opening along its radial edge that allow for the insertion of the twisted pairs. This embodiment also includes a cavity in the center of the anvil-shaped separator for a strength member (320). Additionally, there is a slot for a drain or earthing wire (330). The exploded view of FIG. 3a also indicates the use of an interior slotted rifled section or sections (332) that allows for less bulk material based on overall depth of the slots of the rifled section, improves electrical characteristics as described above regarding worst pair conductors (allowing for more air around each insulated conductor or pair), and physically binds the pairs together so that each pair has semi-permanently fixed position. As shown in the other exploded view (334), the individual conductor may compress against the solid or foamed slotted rifled surface to ensure the semi-permanently fixed position.

Figure 3B:
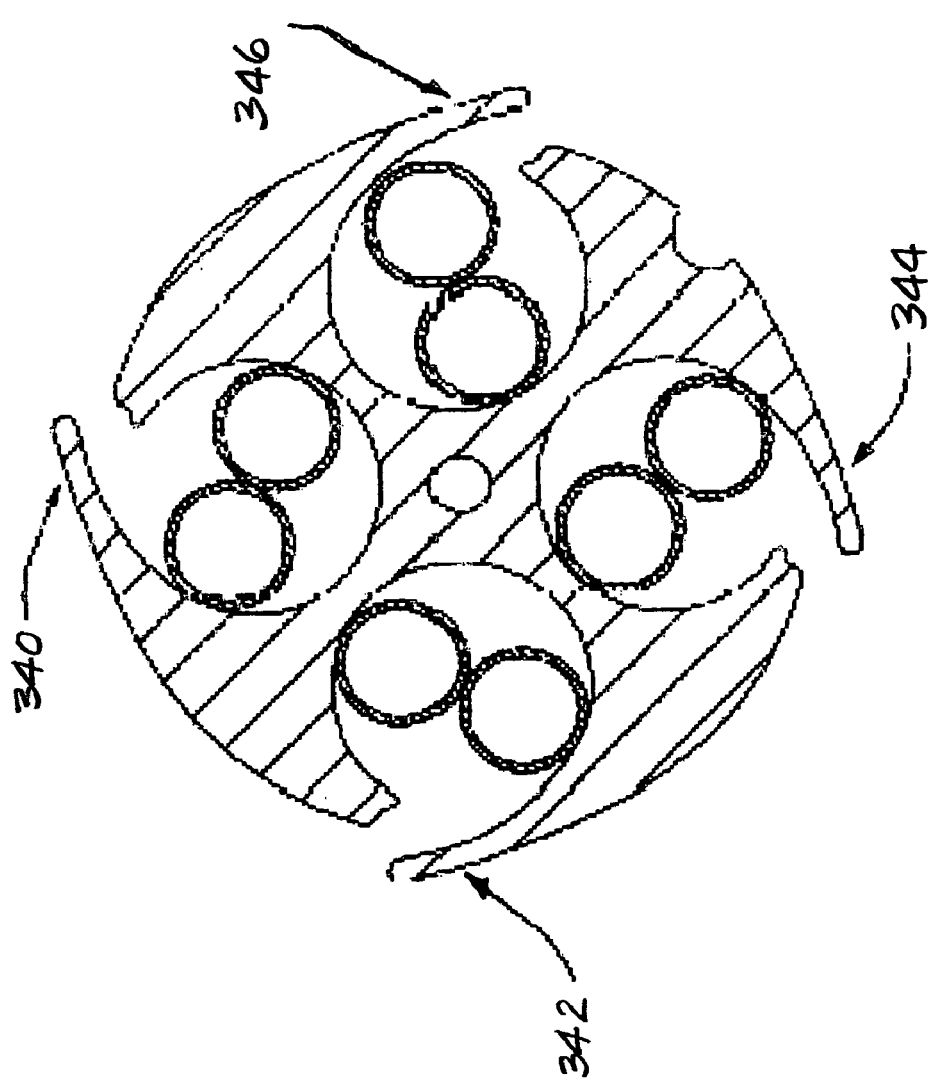
FIG. 3b is a cross-section end view of the single flap, flap-top embodiment of the interior support or anvil-shaped separator taken along the horizontal plane of the interior support anvil-shaped separator when the flap is open.
Figures 3C, 3D:
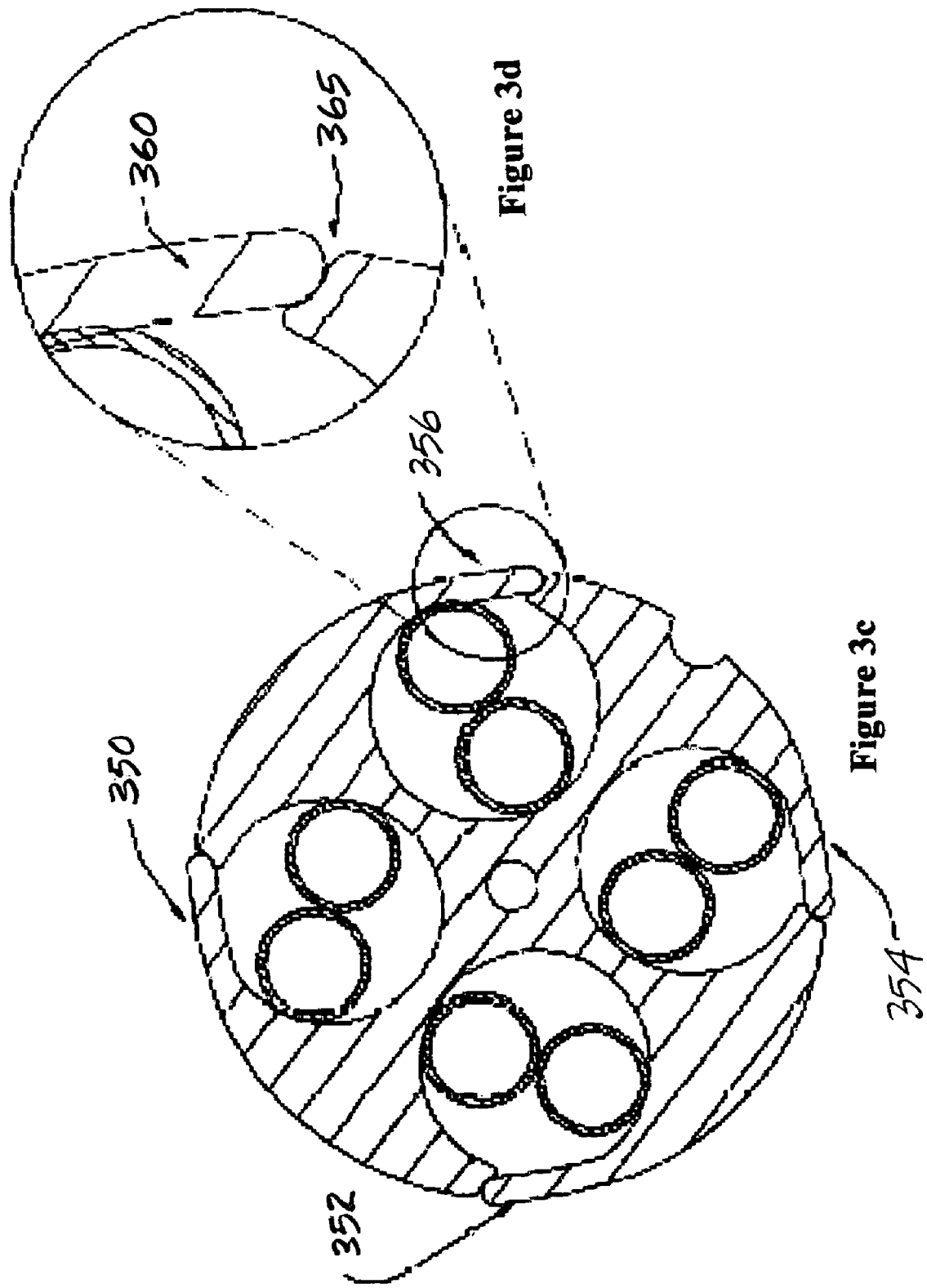
FIG. 3c is a cross-section end view of the single flap, flap-top embodiment of the interior support or anvil-shaped separator taken along the horizontal plane of the interior support anvil-shaped separator when the flap is closed.
FIG. 3d is an enlarged detailed version of the closed single-flap, flap-top embodiment of the anvil-shaped separator.

FIG. 3b is another embodiment of the anvil-shaped separator. The anvil-shaped separator includes a single flap-top (340, 342, 344, and 346) that is initially in an open position to allow the twisted pairs to be inserted into the channels. In FIG. 3c the flap-tops are in the closed position (350, 352, 354, and 356) where the flap-top (360) fits into a recessed portion of the separator (365) for closure. The flap-tops (360) are self-sealing when heat and/or pressure is applied, such that elements within the channels can no longer be removed from the separator and such that the channels containing the twisted pairs are enclosed. The flap-top (360) is shown in more detail in FIG. 3d.

FIG 3e is another embodiment of the anvil-shaped separator. The anvil-shaped separator includes a single flap-top (380, 382, 384, and 386) that is depicted in the closed position. When in the closed position, the flap-top (390) overlaps the outer portion (395) of the separator. The amount of overlap required will depend on several design and manufacturing factors and the shown embodiment is only intended as one example of the overlap required. The flap-tops (390) are self-sealing when heat and/or pressure is applied, such that the elements within the channels can no longer be removed or displaced from the separator and such that the channels containing twisted pairs are enclosed. The flap-top (390) is shown in more detail in FIG. 3f.

Another embodiment of FIGS. 3a, 3b and 3c includes all of the aforementioned features without the drain wire or drain wire slot (330), but may include the center hole (320) for strength members. Use of a center hole (320) is also important in that it reduces the mass required for the spacing. It has been shown and reported in prior art journals and publications that the total mass of the organic components of the cable is directly proportional to flame spread and smoke generation. As mass is reduced, the probability that the cable will pass more stringent flame testing (such as U.L. 910/NFPA 262/IEC 60332-3B$_1$/IEC 60332-3B$_2$ as previously described) significantly increases.

A further embodiment of FIGS. 3a, 3b and 3c includes all the aforementioned features without the center hole (320) for strength members and without the drain wire or drain wire slot (330).

Figure 4A:
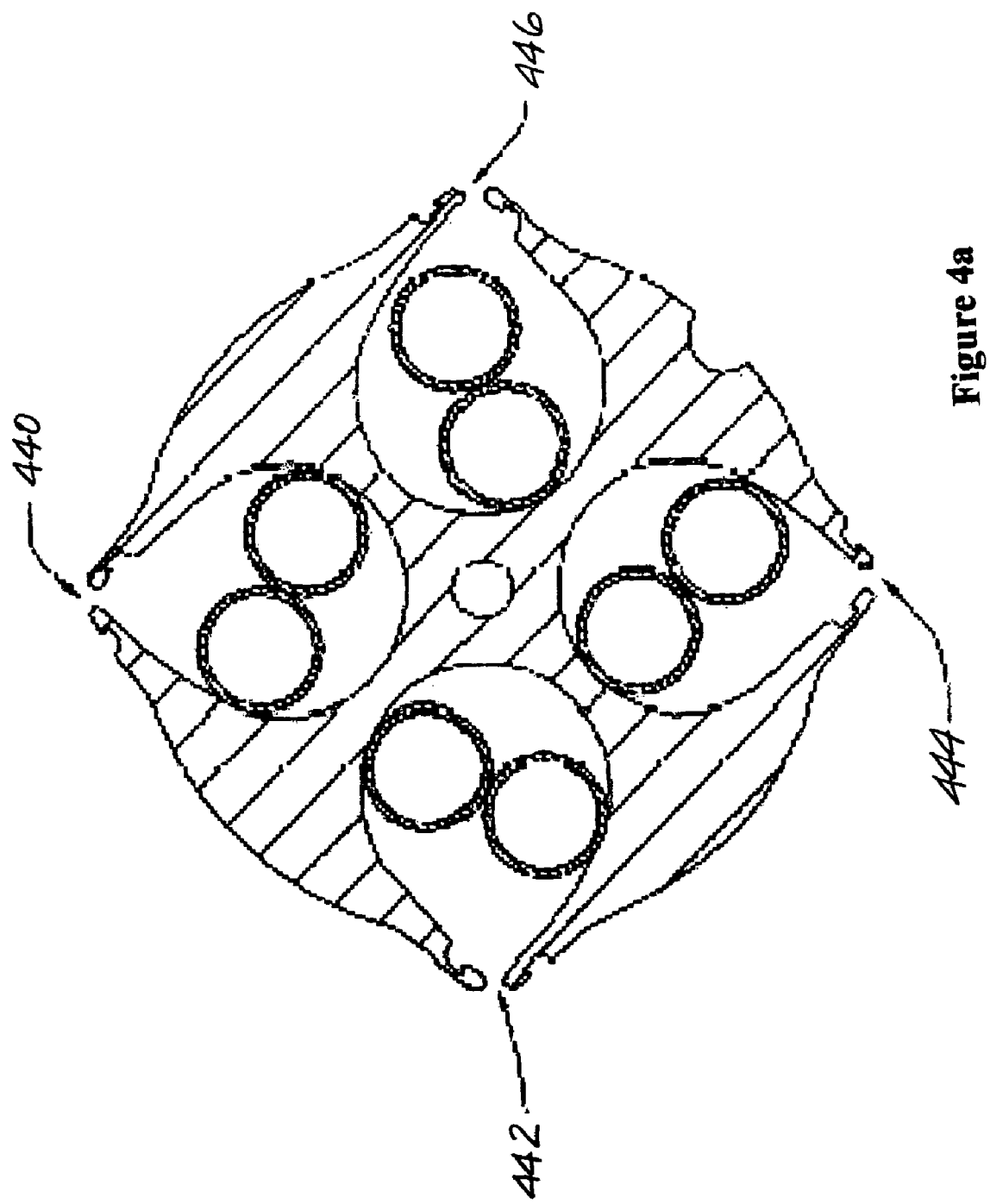
FIG. 4a is a cross-section end view of the double flap, flap-top embodiment of the interior support or anvil-shaped separator taken along the horizontal plane of the interior support or anvil-shaped separator when the flaps are open.
Figures 4B, 4C:
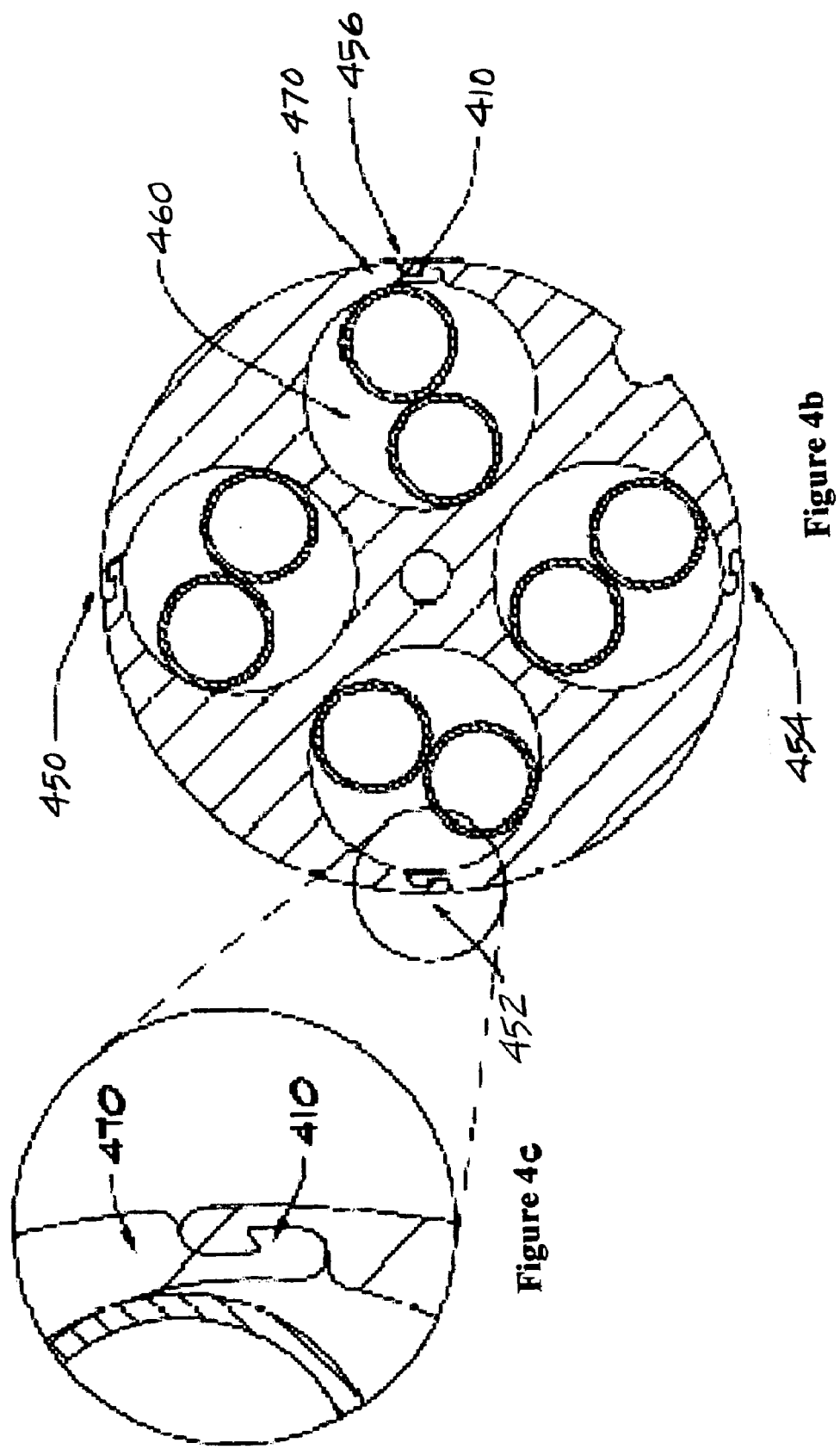
FIG. 4b is a cross-section end view of the double flap, flap-top embodiment of the interior support or anvil-shaped separator taken along the horizontal plane of the interior support or anvil-shaped separator when the flaps are closed.
FIG. 4c is an enlarged detailed version of the closed double-flap, flap-top embodiment of the anvil-shaped separator.

FIG. 4a is a horizontal cross-section of a preferred embodiment of the anvil-shaped separator that is identical to FIG. 3b but has a pair of overlapping section instead of the single overlapping section of FIG. 3b and may include optional "stepped" or "rifled" grooves that exist along the inner circumference of the clearance channels. These grooves can be larger in diameter than pictured and used to improve spacing of the "worst pair" conductors as described earlier. These rifled clearance channels can be used to "squeeze" the conductors or conductor pairs into the interstitial openings creating a more permanent positioning that will enhance the electrical characteristics of the final cable assembly. If properly positioned during the "twinning" and subsequent forming of the cable, the forced positioning of the conductors in the rifled sections will improve signal performance. The anvil-shaped separator includes double flap-tops (440, 442, 444, and 446) that are initially in an open position to allow the twisted pairs to be inserted into the channels. In FIG. 4b (exploded view of FIG. 4c) the flap-tops are in the closed position (450, 452, 454, and 456). The flap-tops are against self-sealing in the presence of heat and/or pressure and the channels containing the twisted pairs are subsequently enclosed. The flap top is shown in more detail in FIG. 4c. Another embodiment of FIGS. 4a, and 4b include all of the aforementioned features without the drain wire or drain wire slot, but includes the center hole for strength members. A further embodiment of FIGS. 4a, and 4b includes all the aforementioned features without the center hole for strength members and without the drain wire or drain wire slot.

FIGS. 3d and FIG. 3f depict the single flap-top in enlarged detail, and FIG. 4c depicts the double flap-top in enlarged detail. The single flap-tops (360 and 390) and the double flap-top (410) enclose the wires or cables within channels created by the separator. During manufacturing, the flap-top is in the opened position and closes as either pressure or heat or both are applied (normally through a circular cavity during extrusion). Optionally, a second heating die may be used to ensure closure of the flap-top after initial extrusion of the separator or cable during manufacture. Another possibility is the use of a simple metal ring placed in a proper location that forces the flap-top down during final separator or cable assembly once the conductors have been properly inserted into the channels. The metal ring may be heated to induce proper closure. Other techniques may also be employed as the manufacturing process will vary based on separator and cable requirements (i.e. no. of conductors required, use of grounding wire, alignment within the channels, etc.). In one embodiment the single flap-top (360) is secured to a recessed portion of one side of an opening of the cavity of the separator (365), and closure occurs when the unsecured, physically free end is adjoined to and adhered with the other end of the outer surface of the channel wall. In another embodiment the single flap-top (390) is secured by overlapping and adhering the unsecured end to the outer surface of the separator (395), thereby, enclosing the channel. The double-flap top arrangement requires that both flap-top ends physically meet and eventually touch to secure enclosure of the existing cavity (460) formed by the separator (470).

Figure 5:
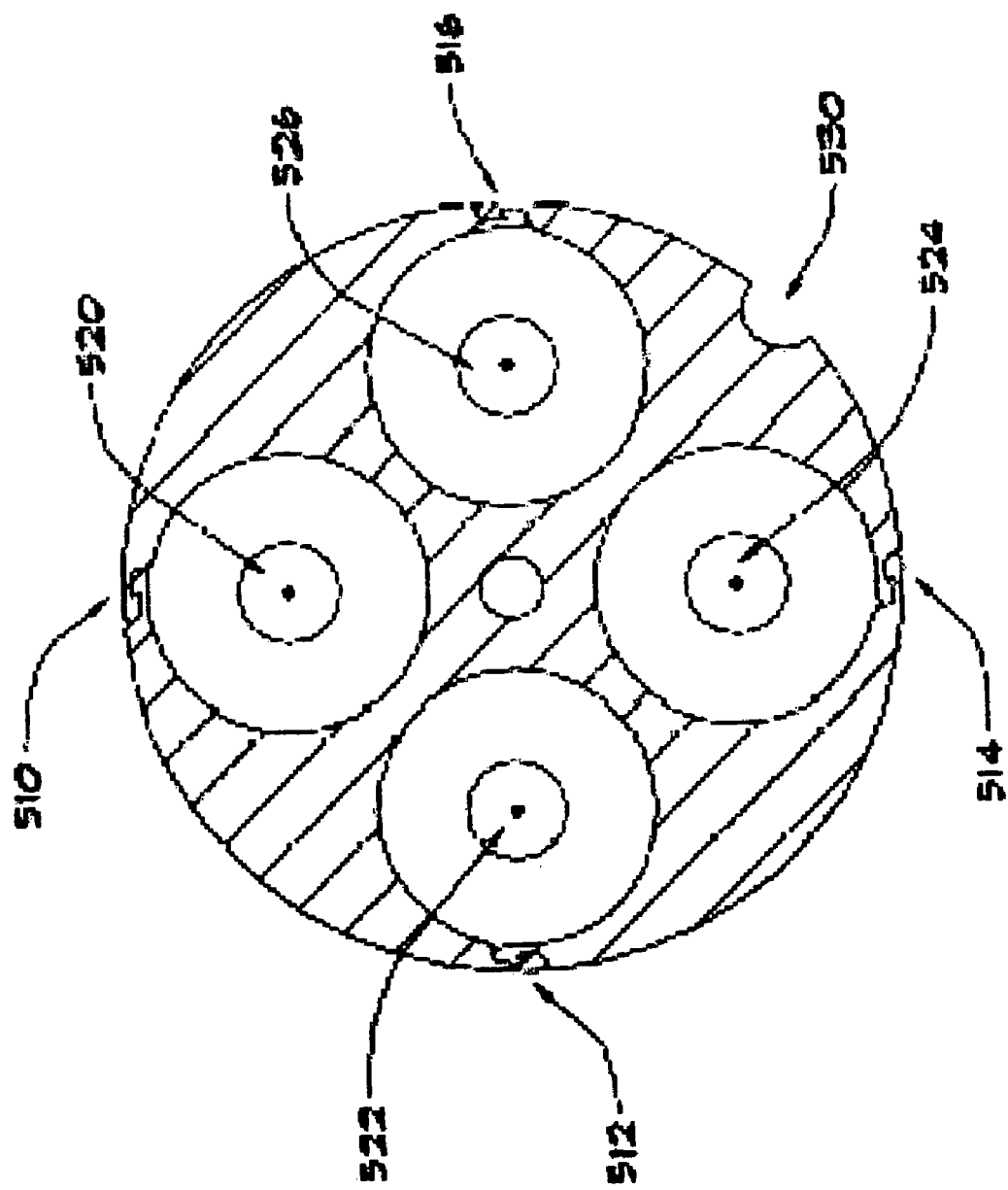
FIG. 5 is a cross-section end view of a flap-top embodiment of the interior support anvil-shaped separator taken along the horizontal plane of the interior support anvil-shaped separator where the separator may contain one or more optical fibers in each of four channels.

FIG. 5 is a cross-section of another embodiment of the flap-top anvil-shaped separator. Each channel is enclosed by double flaps that can be sealed via heat and/or pressure (510, 512, 514, and 515). Each channel contains at least one fiber (520, 522, 524, and 526) that runs the length of the cable. More than one fiber may be included in each channel if necessary. The separator also includes a slot for a drain or earthing wire (530). For applications such as multimedia cables, the application may have one or more twisted pair, one or more fiber optic conductors, or coaxial cables within the clearance channels of the anvil separators.

Figure 6:
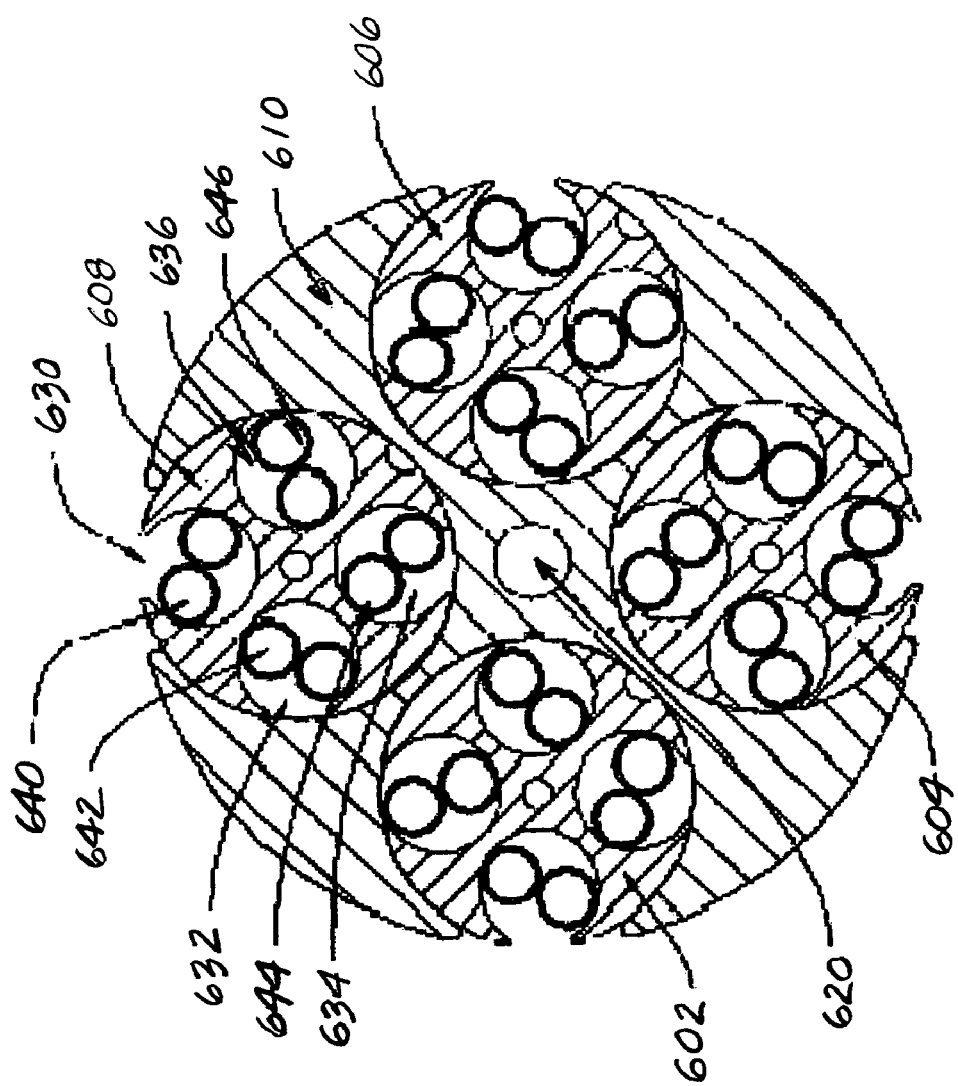
FIG. 6 is a cross-section end view of a cable containing an anvil shaped separator and four smaller anvil-shaped separators taken along the horizontal plane of the cable.

FIG. 6 is a cross-section of a cable that contains four anvil-shaped separators (602, 604, 606, and 608) within a larger anvil-shaped separator (610). The larger separator contains a cavity in the center of the separator for a strength member (620). Each of the smaller separators contained within the larger anvil-shaped separator has four channels (630, 632, 634, and 636). As shown, each of these channels contains a twisted pair within this embodiment (640, 642, 644, and 646). This embodiment allows for a total of sixteen twisted pairs to be included in one cable.

Figure 7A:
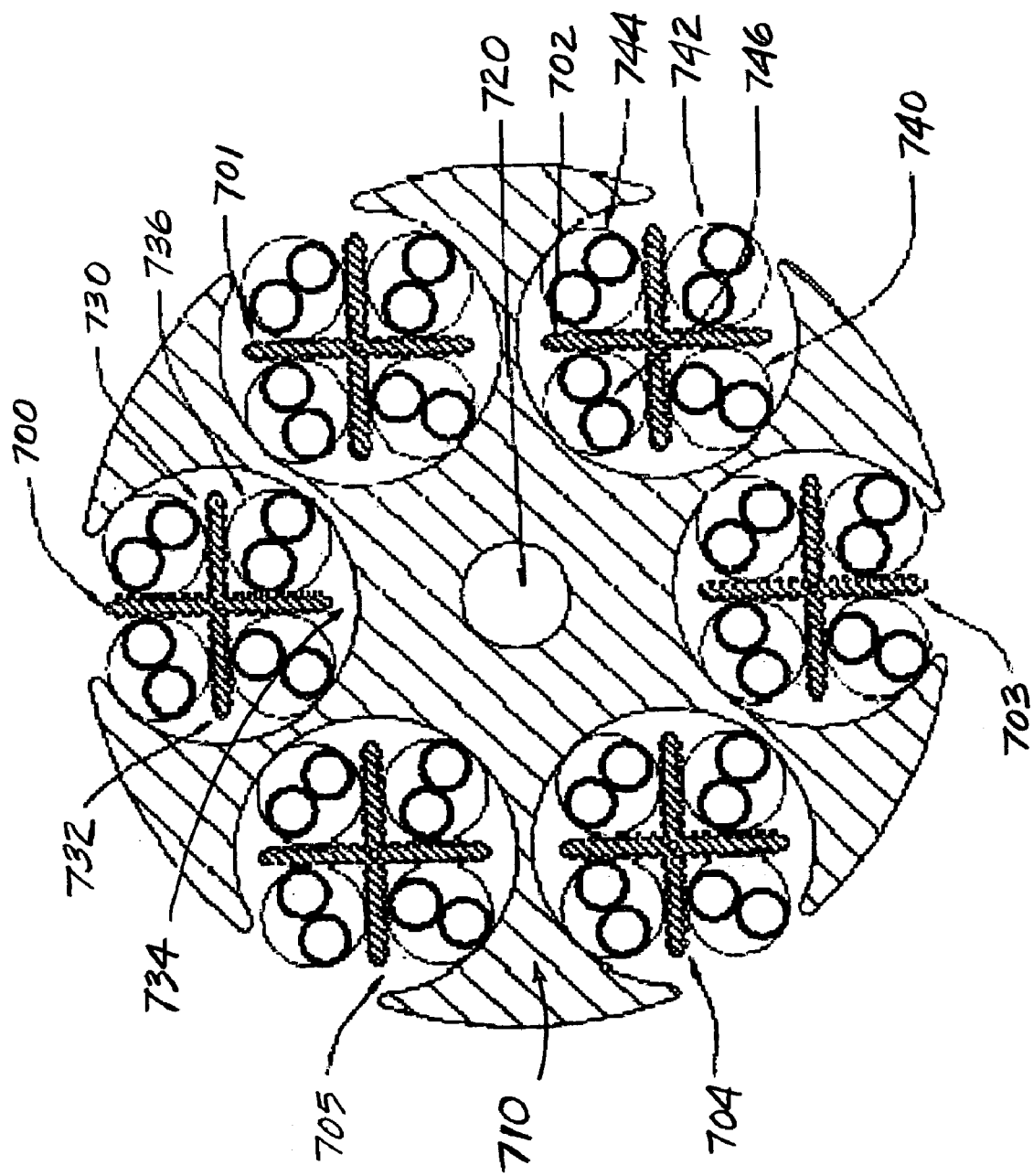
FIG. 7a is a cross-section end view of a cable containing six anvil-shaped separators taken along the horizontal plane of the cable with six rifled cross, symmetrically-even shaped separators (as shown in FIG. 18) with a hollow core feature.

FIG. 7*a* is a cross-section of a cable that contains six symmetrical rifled cross separators (700, 701, 702, 703, 704, 705) within a larger anvil shaped separator (710). The larger separator contains a optional hollow cavity in the center of the separator for an optional strength member (720). Each of the smaller separators contained within the larger anvil-shaped separator has four channels (730, 732, 734, and 736). Within each of these channels in one twisted pair (740, 742, 744, and 746). This embodiment allows twenty four twisted pairs to be included in one cable.

Figure 7B:
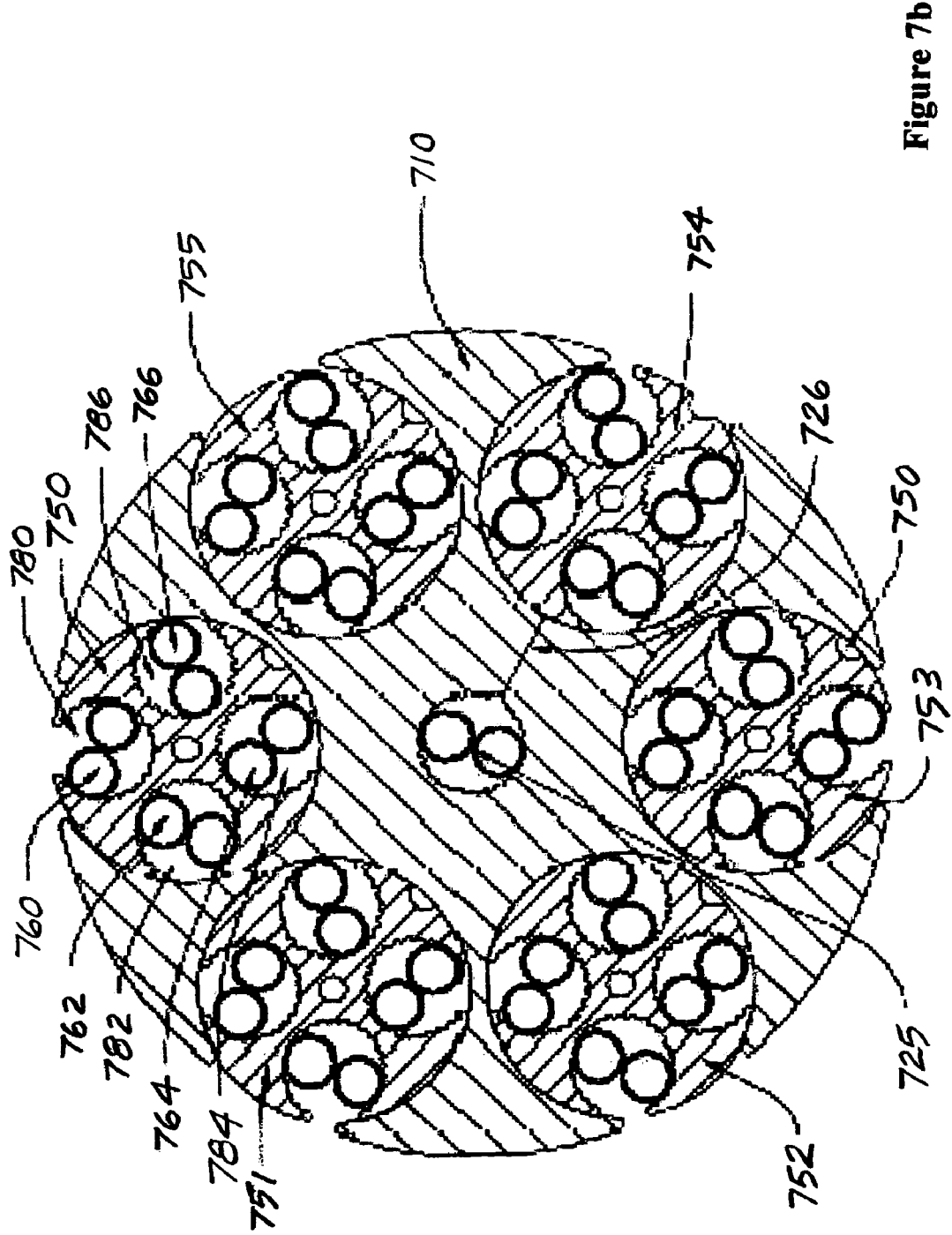
FIG. 7b is a cross-section end view of a cable containing six anvil-shaped separators taken along the horizontal plane of the cable with six anvil-shaped separators with a center core with conductive wires.

FIG. 7*b* are cross-sections of a cable that contains rifled six anvil-shaped separators (750, 751, 752, 753, 754, and 755) within a larger anvil-shaped separator (710). The larger separator contains an optional hollow cavity in the center of the separator for a either a strength member or an additional conductor pair (725) which is accessed via a slit (726) which can be forced opened during manufacture. Each of the smaller separators contained within the larger anvil-shaped separator has four smooth or rifled channels (780, 782, 784, and 786). Within each of these channels is one twisted pair (760, 762, 764, and 766). This embodiment allows twenty four twisted pairs to be included in one cable. Feature (750) is an optional wired slot for a drain wire with or without a shield.

Figure 8A:
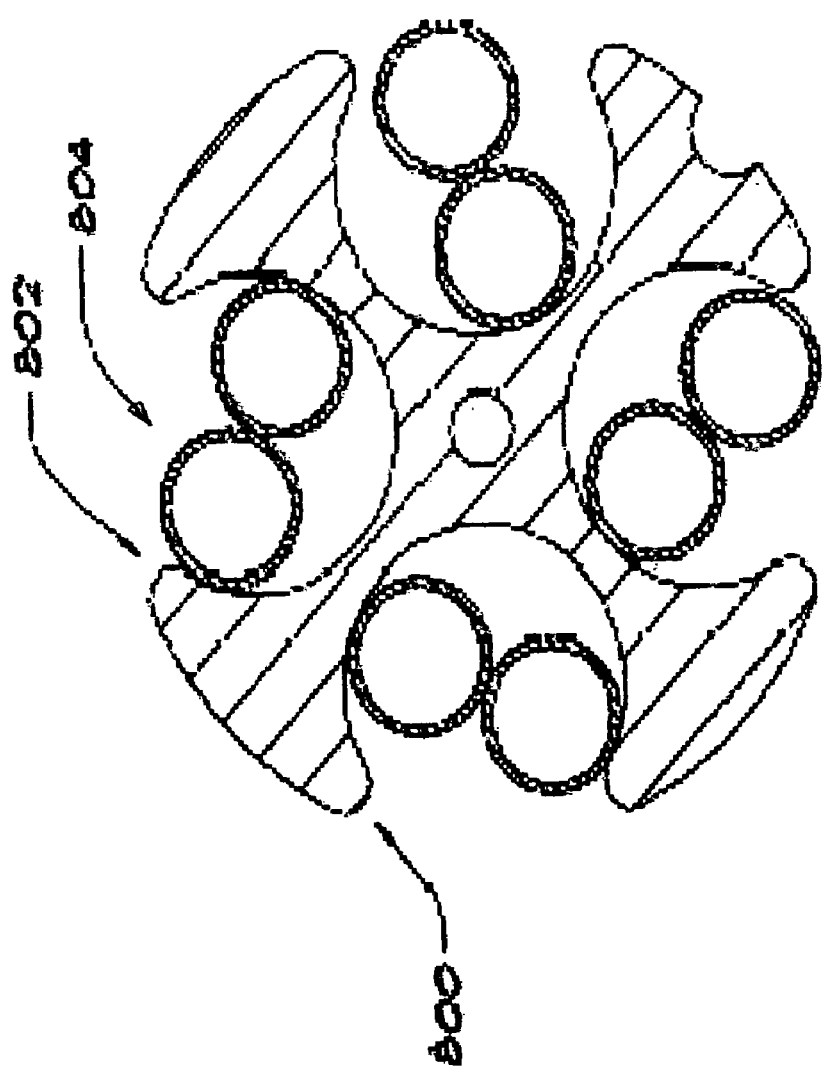
FIG. 8a is a cross-section end view of an anvil-shaped separator where both outer sharp edged ends of the anvil have been replaced with rounded regions to reduce weight and provide a larger opening for each channel defined by the anvil-shaped separator.
Figure 8B:
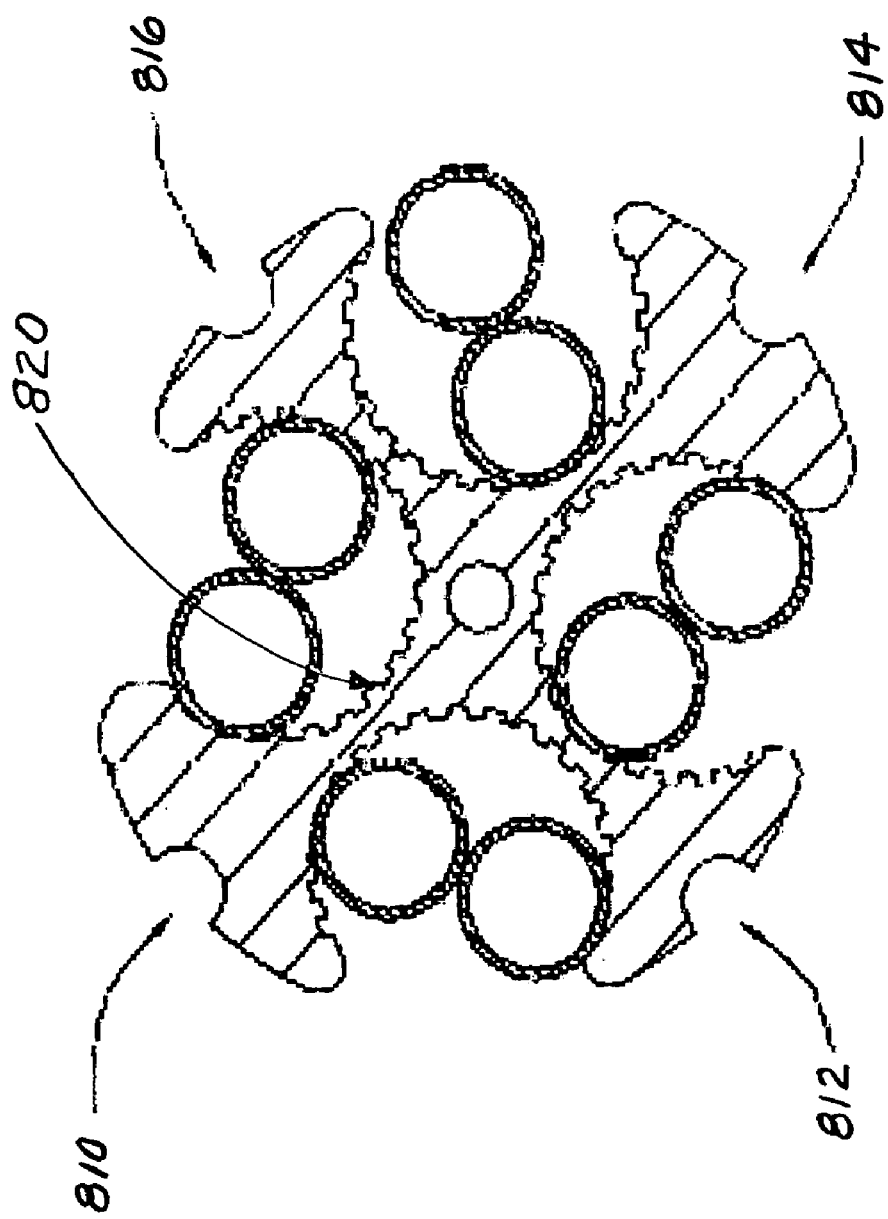
FIG. 8b is also a cross-section end view of an anvil-shaped separator where both outer sharp edged ends of each anvil section are replaced with rounded regions and each anvil section includes a channel for a drain wire.

FIGS. 8*a* and 8*b* depict a cross-section and additional embodiment of an anvil-shaped separator which has been substantially trimmed such that the each edged end of each anvil is removed (800 and 802) to reduce weight resulting in enlarged channel openings (804). FIG. 8*b* depicts the cross-section with optional drain wires within each solid and trimmed anvil section (810, 812, 814, and 816) as well as optional rifled slots (820) within each clearance channel and optional asymmetric conductor pair offset due to the skewed elongated axis.

Figure 9:
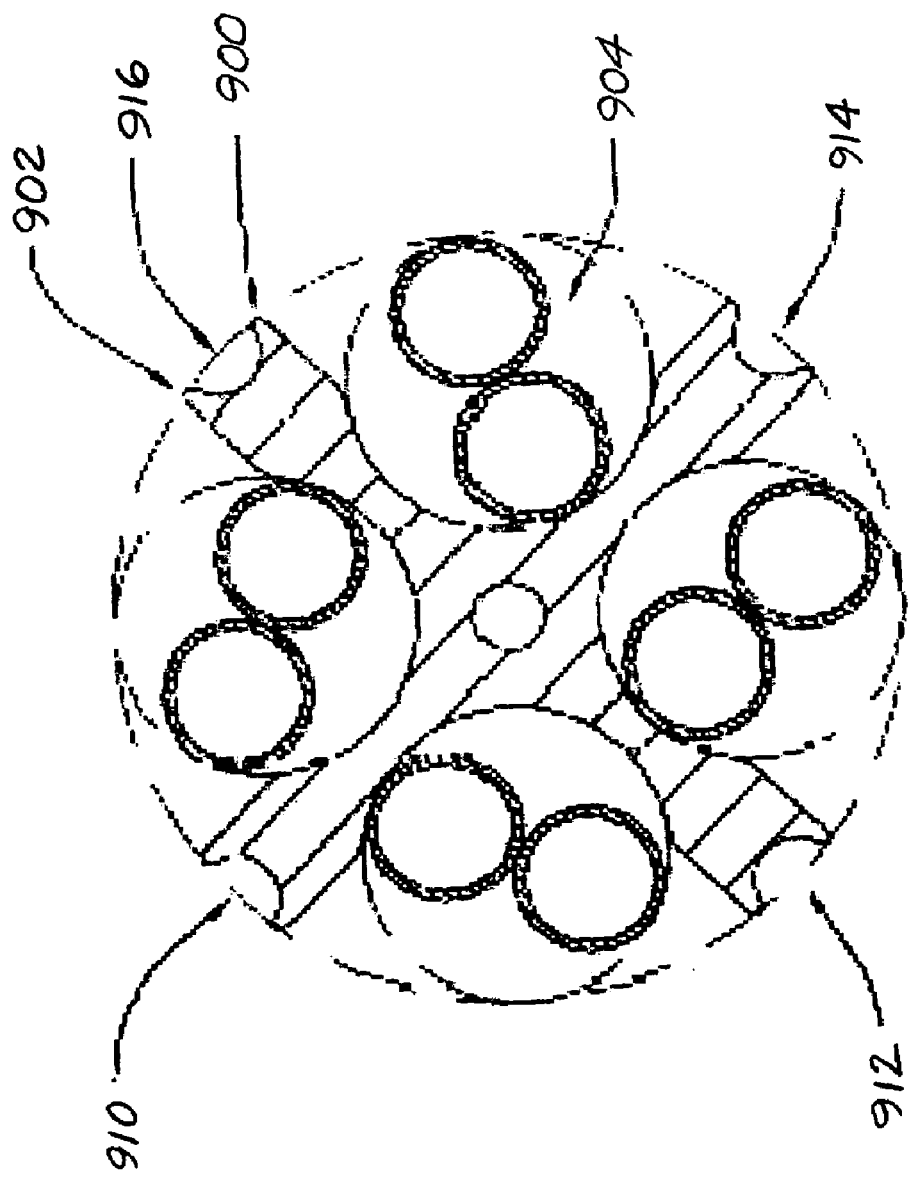
FIG. 9 is a cross-section end view of an anvil-shaped separator where dual lobed anvil sections are minimized in size to provide the greatest possible channel girth and opening while still maintaining an anvil-like shape and each dual lobed section includes a channel for a drain wire.

FIG. 9 is a cross-section and additional embodiments of a separator where the dual lobed ends of the anvil are minimized (900 and 902) such that an even further reduction in weight, enlarged channel openings (904) and enlarged channel girth are provided. FIG. 9 also includes earthing or drain wire slots (910, 912, 914, and 916).

Figure 10:
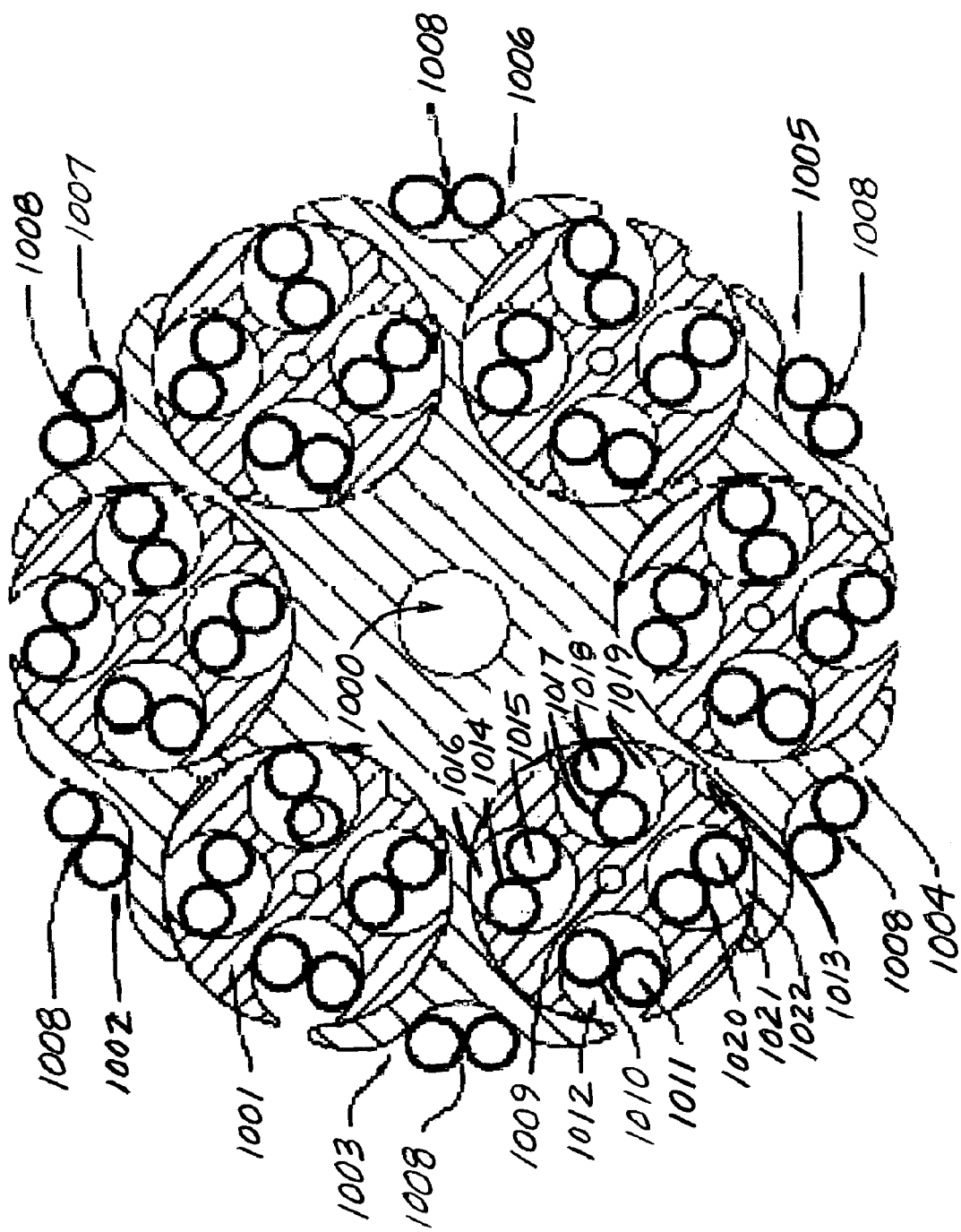
FIG. 10 is a cross-section end view of a relatively large cable for conductor separation with six (6) anvil shaped sections and an adjacent section for a fifth conductor pair.

FIG. 10 is a cross-sectional end view of a large cable space separator that itself separates six (6) anvil shaped separators as described in detail and shown in FIGS. 1 and 2 and very similar to the design shown as FIGS. 7*a* and 7*b*. This separator has an optional center (1000) orifice that allows for reduction of mass and thereby reduction of flame spread and smoke generation in, for example UL 910/NFPA 262/IEC 60332-3B$_1$/IEC 60332-3B$_2$ and associated flame testing as previously described. The entire center section (with the center (1000) orifice or without it) could be either solid or foamed or a combination using a skimmed solid surface over a foamed core. This design allows for six solid anvil shaped cores (1001) with four clearance channels for conductor pairs. In addition, the large cable spacer separator includes six special "Y" shaped channel spacings (1002–1007) at the outer edges that allow for a fifth conductor pair within these channels. The fifth conductor pairs (1008) are optional in that some or none of the "Y" shaped channel spacings (1002–1007) may be filled. Each of the solid anvil cores (1001) also may optionally contain a center orifice (1009). Each of the conductors consist of an inner solid metal portion (1011, 1015, 1018, and 1021) and an outer insulation (1010, 1014, 1017, and 1020) covering the solid and metal portion of the conductors or conductor pairs that are held within each of the four clearance channels (1012, 1016, 1019, and 1022) formed by the six anvil shaped separators cores (1001). In addition to the clearance channels (1012) provided for the conductors or conductor pairs, there all exists an optional specially designed slot (1013) for a metal drain wire that provides proper grounding or earthing of the conductors within the cable for instances where an aluminum mylar shield may be used.

FIG. 11 is a cross-sectional view of a optionally skewed or asymmetrical "maltese cross-type" cable spacer separator. It is skewed in the sense that along one axis of symmetry in a two-dimensional plane, the tip-to-tip length is longer than along the other. This spacer provides two relatively larger width blunt tipped ends (1100) and two relatively smaller width tipped blunt ends (1102). The distance between a larger width blunt end tip and a smaller width blunt end tip along the longer axis of symmetry provides two skewed channels (1106) for "worst" pair conductors. These pairs are the ones determined to have the least desirable electrical properties and thus are intentionally spaced further apart form each other. The better performing electrical pairs are contained in two skewed channels (1104) formed between a larger width blunt end tip (1100) and a smaller width blunt end tip (1102) along the shorter axis of symmetry. In this manner the "worst pair" channels (1106) are adjacent to the "better pair" channels (1104) so that the influence of the poorest electrical performing conductors or conductor pairs (1110) are insulated from another poorest or poorer performing electrical pair (1110). Best or better conductor pairs (1112) would be provided in the better pair channels. As previously alluded to, distance, and the presence of air are the two controllable parameters used in the present invention to reduce electrical property deterioration due to "worst pair"—"worst pair" interaction. A center (optional) orifice (1108) is also provided which would allow for reduction of weight of material and better flammability and smoke generation properties as previously described.

Figure 12B:
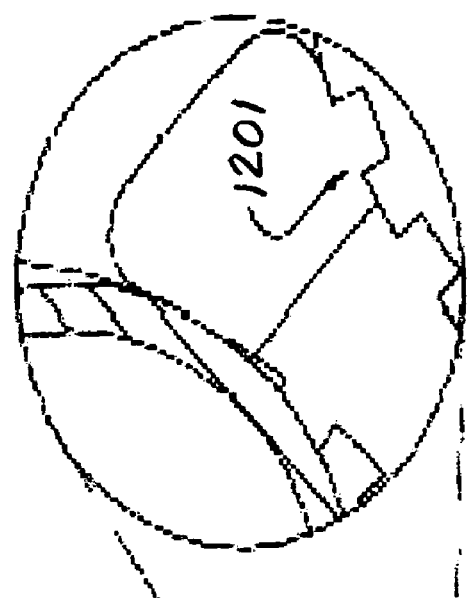
FIG. 12b is an enlarged detailed version of the cross-section end view of a rifled and (optionally) skewed maltese-cross type separator.
Figure 12A:
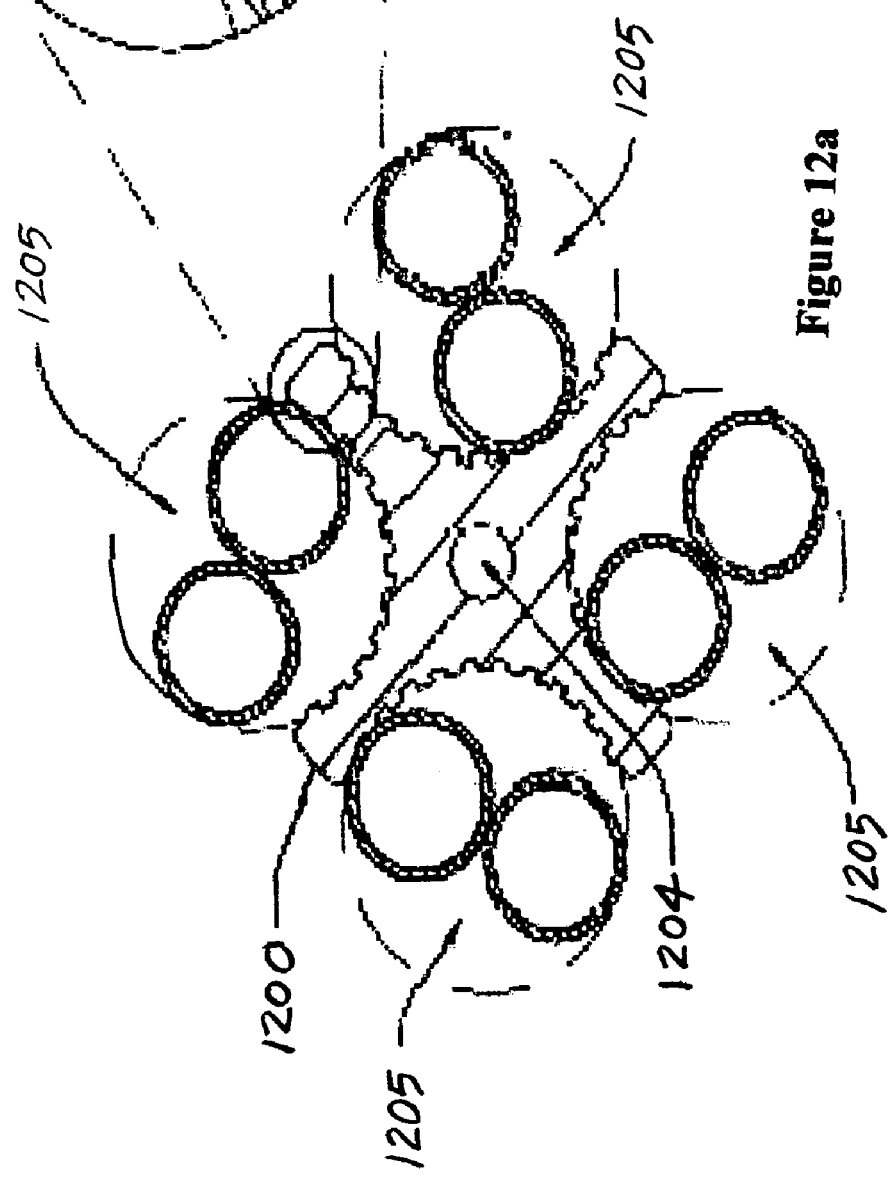
FIG. 12a is a cross-section end view of a rifled and (optionally) skewed maltese-cross type separator.

FIG. 12a is a cross-sectional view of an optionally skewed "maltese cross-type" cable spacer separator with "rifled" sections along the outer perimeter of the spacer separator. It optionally skewed in the sense that along one axis of symmetry in a two-dimensional plane, the top-to-tip length is longer than along the other. This spacer provides four equi-widthed blunt tipped ends (1200). The rifled sections as shown in FIG. 12b contain interstitial stepped optionally rifled spacers (1201) extending from near the blunt tipped ends toward channels (1205) formed for single or paired conductors that are provided such that the conductor or conductor pairs will be "squeezed" into a portion of the rifled section where some traction or friction within these interstitial stepped spacer rifled sections will control spacing and movement during the entire cabling operation. In this manner, again "worst pair" spacing can be achieved. A center (optional) orifice (1204) is also provided which would allow for reduction of weight of material and better flammability and smoke generation properties as previously described.

Figure 13B:
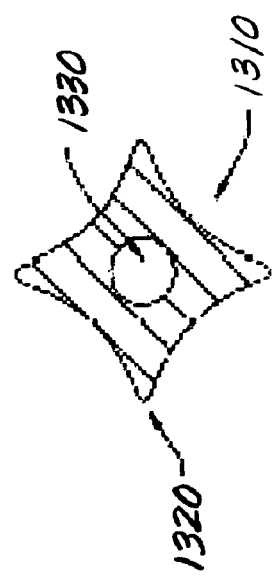
FIG. 13b is a cross-section end view of a diamond shaped separator with a center circular orifice.
Figure 13C:
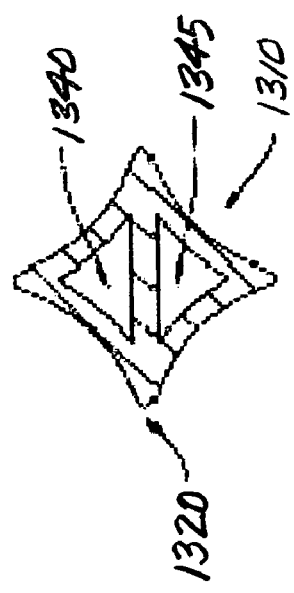
FIG. 13c is a cross-section end view of a diamond shaped separator with equilateral triangular slots.
Figure 13D:
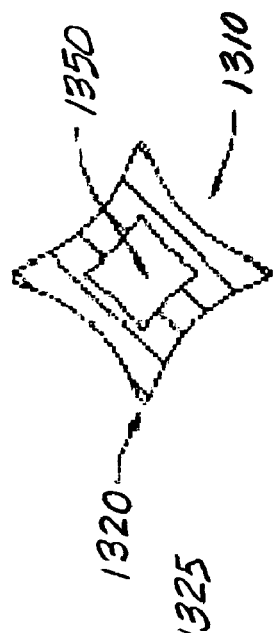
FIG. 13d is a cross-section end view of a diamond shaped separator with a diamond shaped center orifice or slot.
Figure 13A:
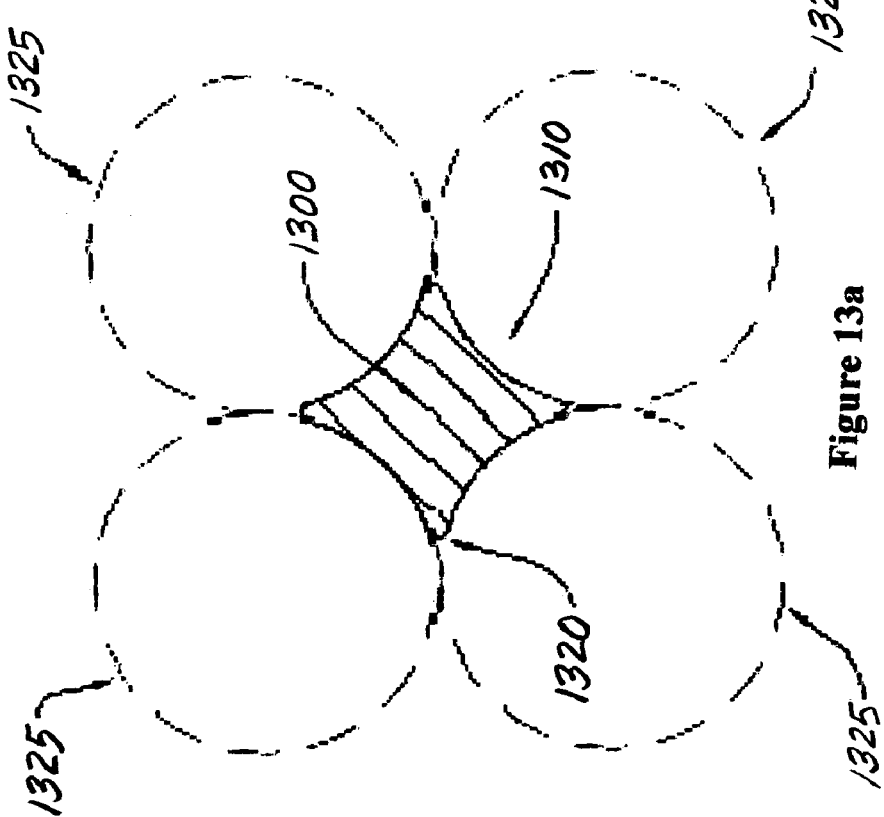
FIG. 13a is a cross-section end view of a diamond shaped separator.

FIG. 13a is a cross-sectional view of a diamond shaped cable spacer separator that is solid (1300) and provides for four semi-circular channels (1310) formed by curved surfaces of the diamond shaped spacer for conductors. The solid diamond shaped spacer has curved ends that converge at each of four tips (1320) which designate the beginning or ending of the channels. Individual conductors (1325) would be preferably placed in each of the channels for pair separator. Alternatively, conductor pairs could also be separated using this design and technique.

FIG. 13b is a cross-sectional view of a diamond shaped cable spacer separator that has a hollowed center circular orifice section (1330) and provides for four semi-circular channels (1310) formed by curved surfaces of the diamond shaped spacer for conductors. The solid diamond shaped spacer has curved ends that converge at each of four tips (1320) which designate the beginning or ending of the channels. Individual conductors would be preferably placed in each of the channels for pair separator. Alternatively, conductor pairs could also be separated using this design and technique.

FIG. 13c is a cross-sectional view of a diamond shaped cable spacer separator that has two triangular hollowed center sections, one of which is an upright equilateral triangular hollowed orifice (1340) and the other of which is a downward-facing equilateral triangular orifice (1345) and provides for four semi-circular channels (1310) formed by curved surfaces of the diamond shaped spacer for conductors. The solid diamond shaped spacer has curved ends that converge at each of four tips (1320) which designate the beginning or ending of the channels. Individual conductors would be preferably placed in each of the channels for pair separator. Alternatively, conductor pairs could also be separated using this design and technique.

FIG. 13d is a cross-sectional view of a diamond shaped cable spacer separator that has a diamond shaped hollowed center orifice section (1350) and provides for four semi-circular channels (1310) formed by curved surfaces of the diamond shaped spacer for conductors. The solid diamond shaped spacer has curved ends that converge at each of four tips (1320) which designate the beginning or ending of the channels. Individual conductors would be preferably placed in each of the channels for pair separator. Alternatively, conductor pairs could also be separated using this design and technique.

Figure 14:
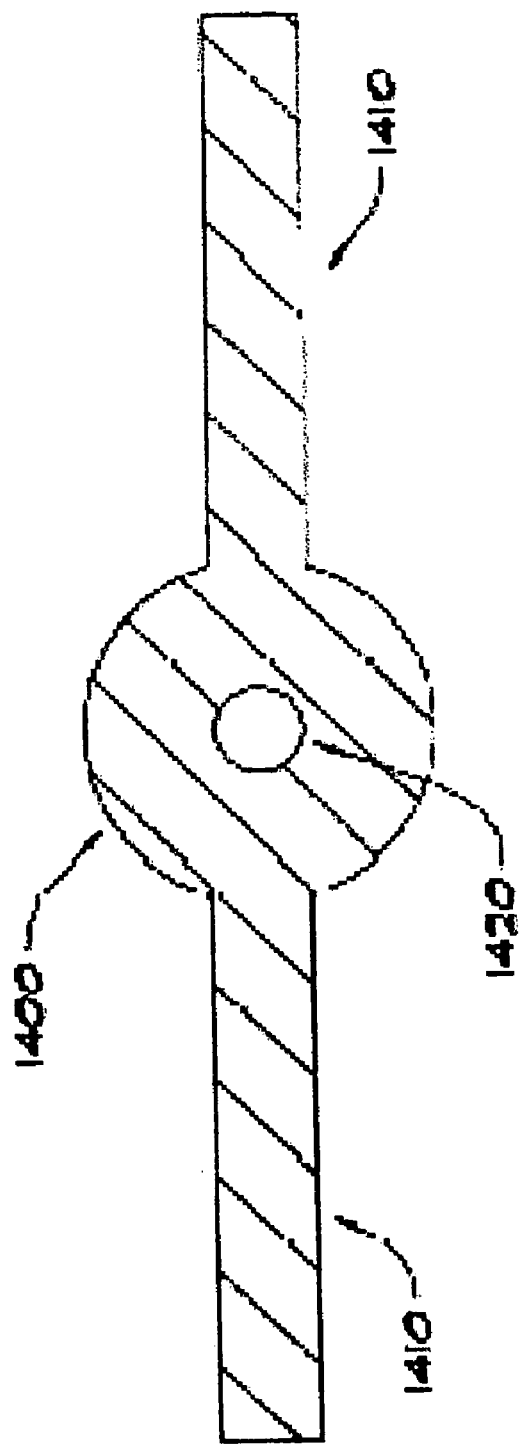
FIG. 14 is a cross-section end view of a pendulum-like shaped separator with a circular disc pendant near its center

FIG. 14 is a cross-sectional view of a pendulum-like shaped cable spacer separator with a circular-disc like pendant portion (1400) that is either in the center of the pendulum-like shaped separator or is optionally skewed to an elongated rectangular shaped end (1410). This separator does not form specific channels for conductors or conductor pairs, however the circular-disc like portion (1400) provides a device which allows for proper spacing of better or worse performing electrical pairs by placing this circular-disc in a specific location. The circular-disc (1400) includes an optional center hollow orifice portion (1420), again to reduce material loading which should enable certain cable constructions to pass stringent flame and smoke test requirements.

Figure 15:
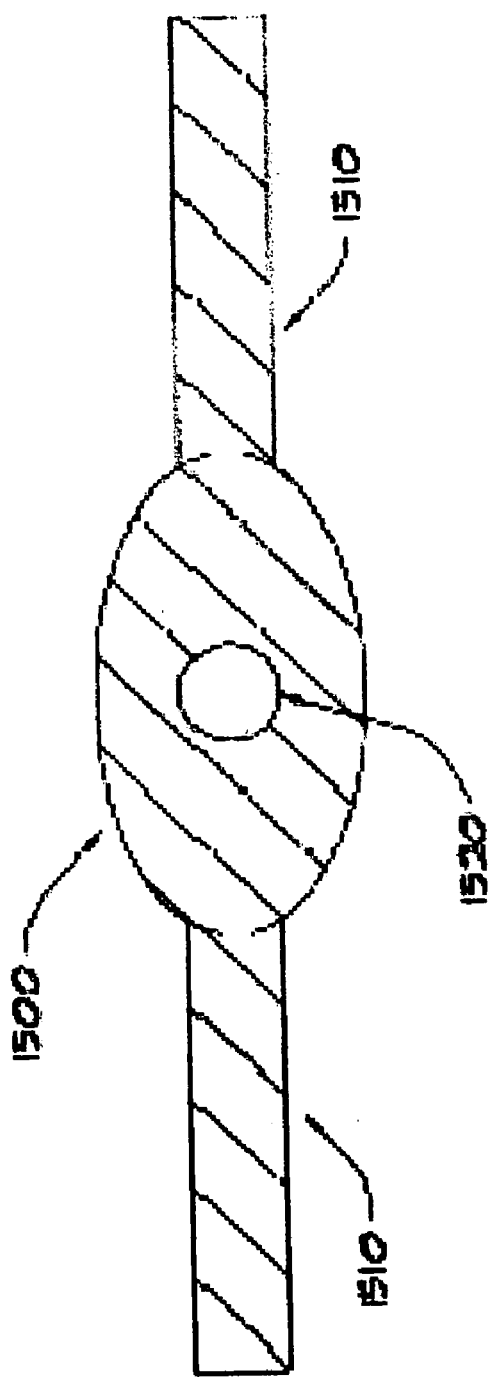
FIG. 15 is a cross-section end view of a pendulum-like shaped separator with an elliptical-disc pendant near its center

FIG. 15 is a cross-sectional view of a pendulum-like shaped cable spacer separator with an elliptical-disc like pendant portion (1500) that is either in the center of the pendulum-like shaped separator or is optionally skewed to an elongated rectangularly shaped end (1510). This separator also does not form specific channels for conductors or conductor pairs, however the elliptical-disc like pendant portion (1500) provides a device which allows for proper spacing of better or worse performing electrical pairs by placing this elliptical-disc in a specific location. The elliptical-disc like pendant portion (1500) includes an optional center hollow orifice portion (1520), again to reduce material loading which should enable certain cable constructions to pass stringent flame and smoke test requirements.

Figure 16:
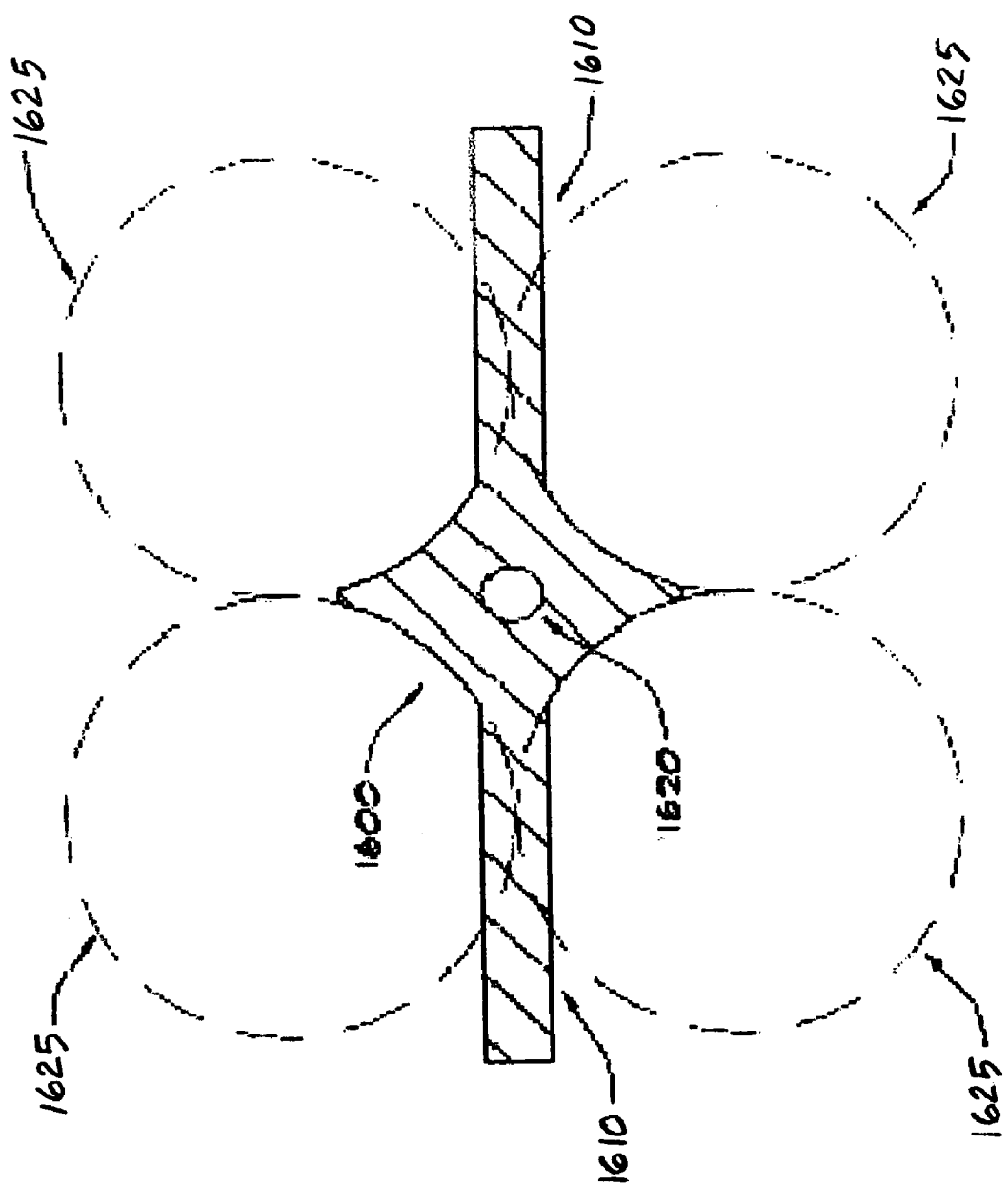
FIG. 16 is a cross-section end view of a pendulum-like shaped separator with a diamond-disc shaped pendant near its center

FIG. 16 is a cross-sectional view of a pendulum-like shaped cable spacer separator with a diamond-disc like pendant portion (1600) that is either in the center of the pendulum-like shaped separator or is optionally skewed to an elongated rectangularly shaped end (1610). This separator forms more specific channels for conductors or conductor pairs (1625) than that of FIGS. 14 and 15, and the diamond-disc like portion (1600) additionally provides a device which allows for proper spacing of better or worse performing electrical pairs by placing this diamond-disc in a specific location. The diamond-disc like portion (1600) includes an optional center hollow orifice portion (1620), again to reduce material loading which should enable certain cable constructions to pass stringent flame and smoke test requirements. The design and function of the separator of FIG. 16 is similar to that shown in FIGS. 13a–13d with the additional feature of the horizontal separator bar that restricts movement of the conductors in the vertical direction during cabling and subsequent handling.

Figure 17:
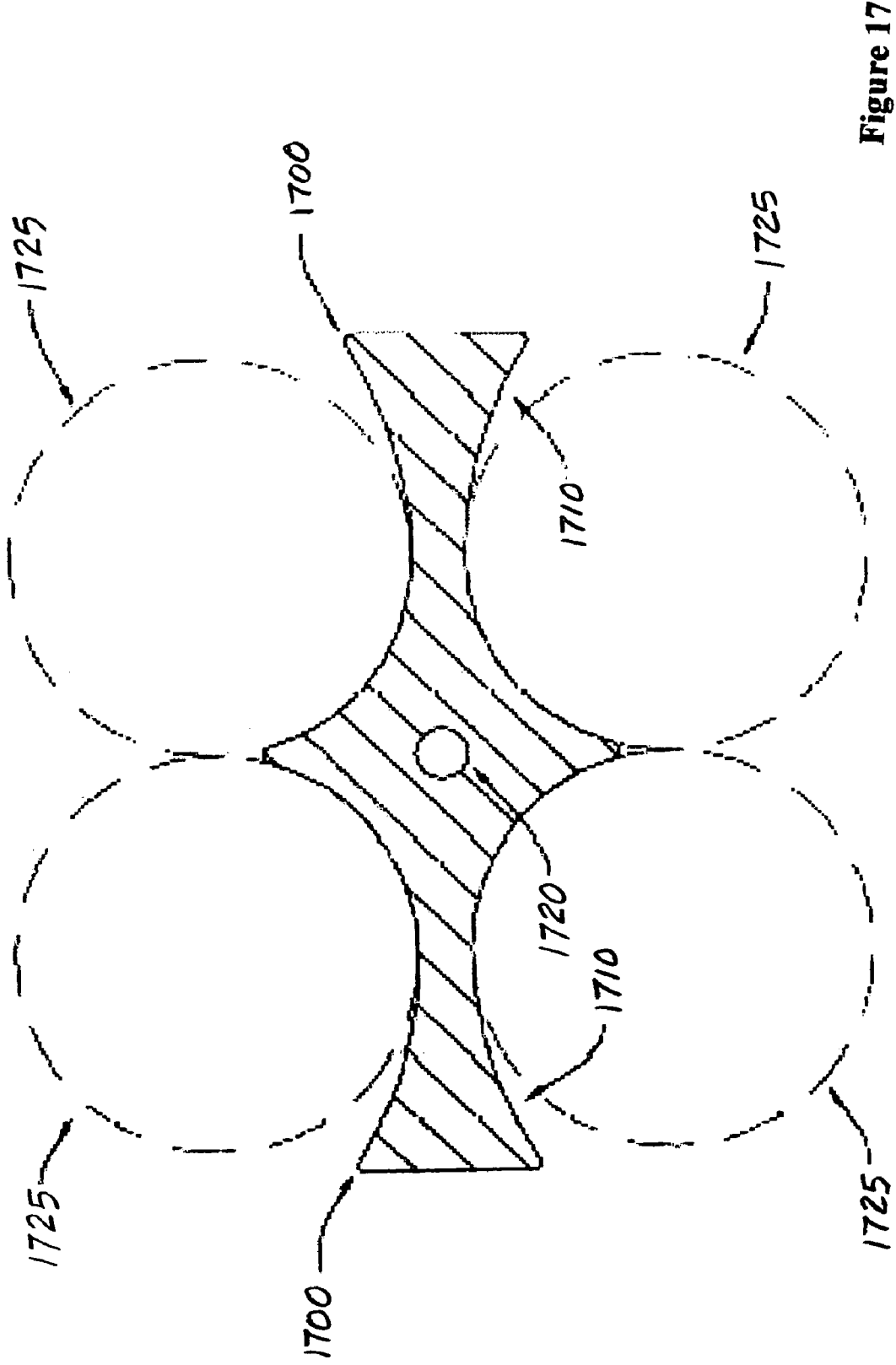
FIG. 17 is a cross-section end view pendulum-like dual lobed shaped separator with a diamond-disc shaped pendant near its center

FIG. 17 is a cross-sectional view of a pendulum-like, dual-lobed shaped cable spacer separator with a diamond-shaped pendant portion in the center that can be optionally skewed to one end and with lobed end portions (1700). Channels for conductors (1725) are formed by curved elongated rectangular portions (1710) of the dual-lobbed pendulum-like shaped separator). This separator forms more specific channels for conductors or conductor pairs (1725) than that of FIGS. 14 and 15, similar to that of FIG. 16, and the diamond-shaped pendant portion additionally provides a device which allows for proper spacing of better or worse performing electrical pairs by placing this diamond-shaped pendant in a specific location. The diamond-shaped pendant section includes an optional center hollow orifice portion (1720), again to reduce material loading which should enable certain cable constructions to pass stringent flame and smoke test requirements.

Figure 18:
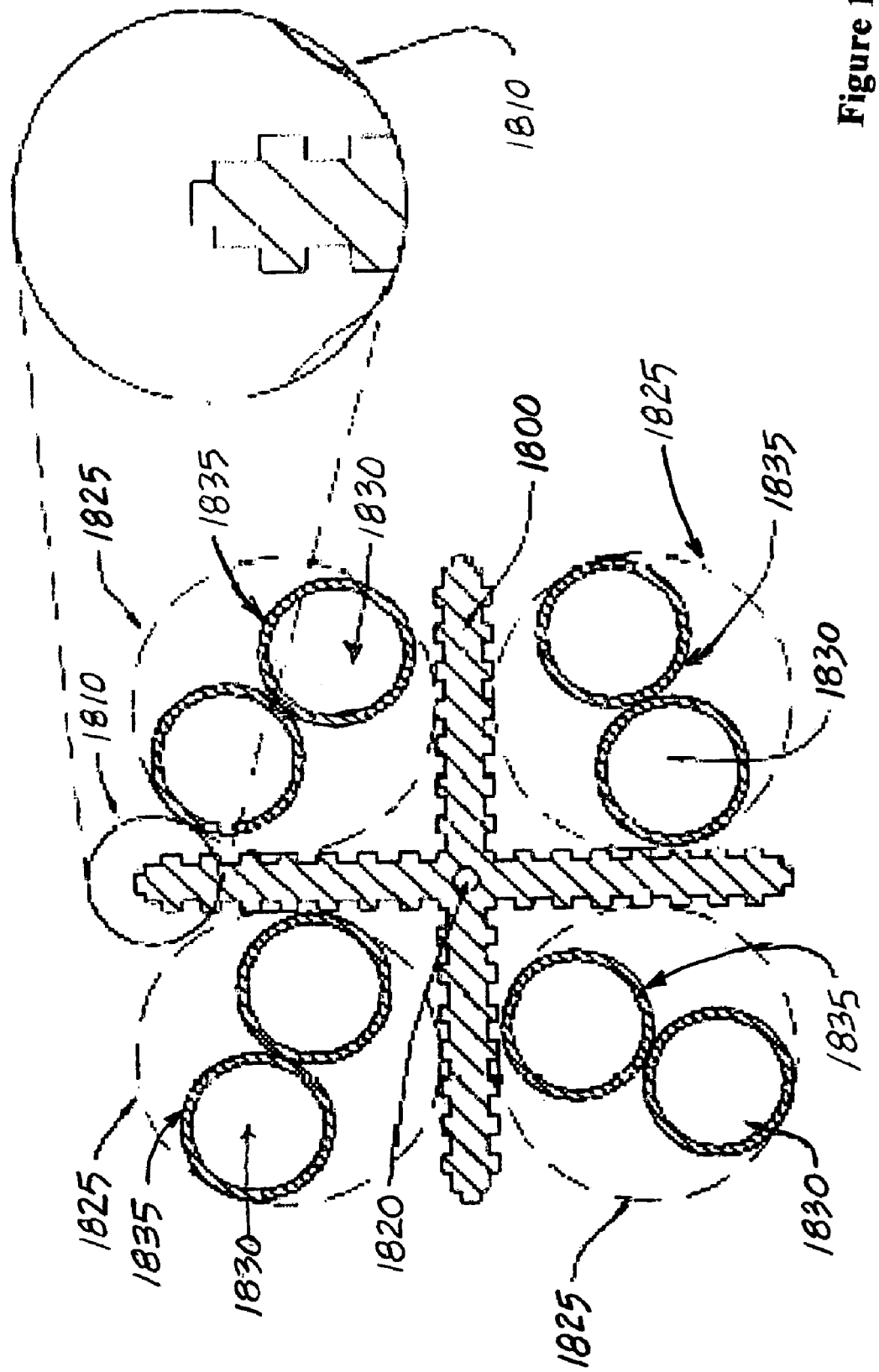
FIG. 18 is a cross-section end view of a rifled cross, symmetrically-even shaped separator.

FIG. 18 is a cross-sectional view of a rifled and symmetrically balanced cross cable spacer separator (1800) that is comprised optionally of a solid, foamed or solid skin over a foamed core as described earlier in the present specification and again for FIG. 18. The rifled cross separator also is comprised of four "tipped" ends that have key-like features (1810). The rifled cross separator provides clearance channels for conductors or conductor pairs that may or may not be separately insulated (1825) where each conductor or conductor pair includes an outer insulation material (1835) and an inner section portion of the conductor (1830). As for most of the prior separator constructions, a hollow orifice in the center (1820) is optional again for the purpose of material reduction loading.

Figure 19:
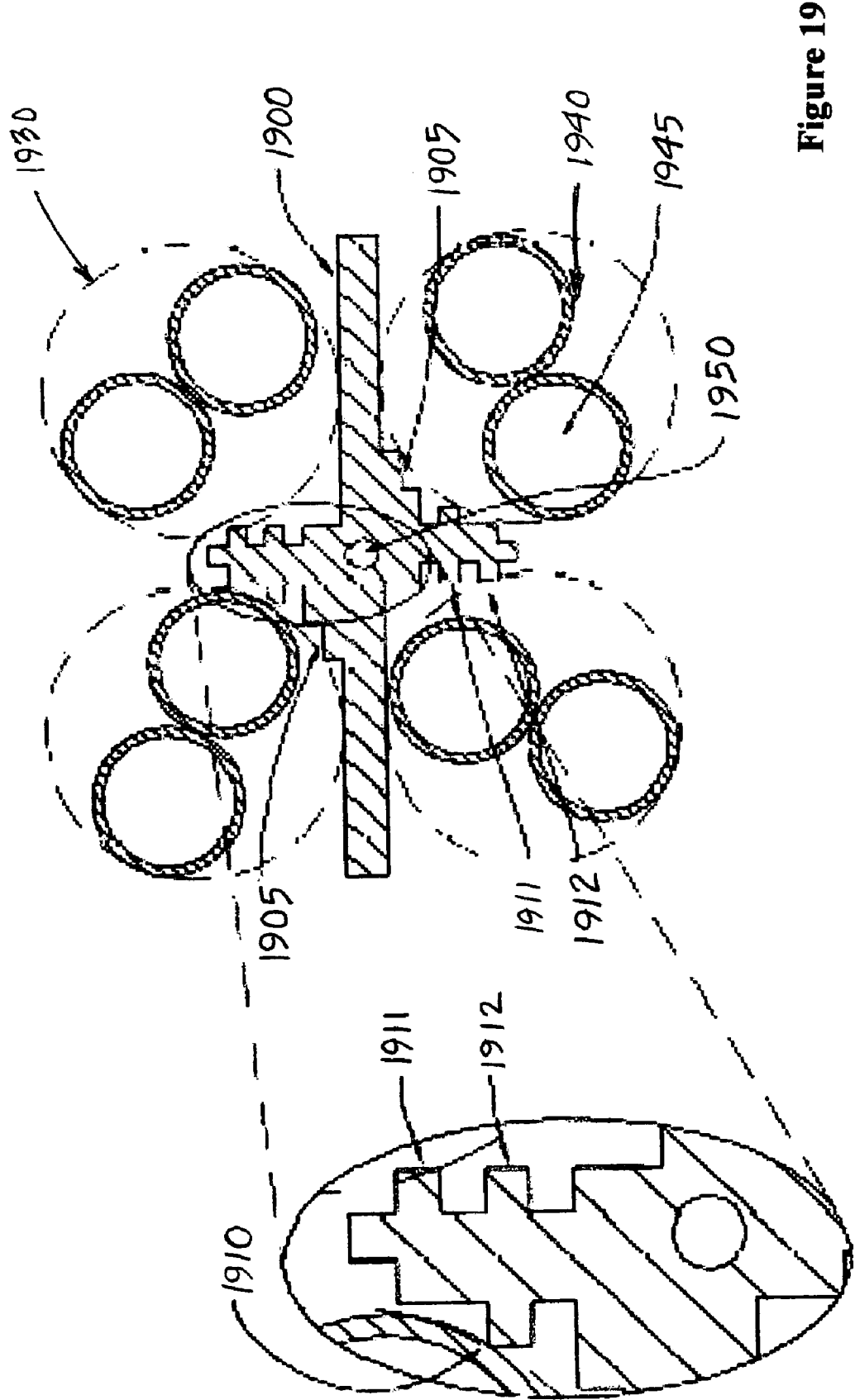
FIG. 19 is a cross-section end view of a mirrored battleship-shaped and inverted separator with top-side and bottom-side key-way shaped sections.

FIG. 19 is a cross-sectional view of a dual drill-bit shaped cable spacer separator (1900) or "mirrored battleship" shape that is comprised optionally of a solid, foamed or solid skin over a foamed core as described earlier. If one were to split this separator along its central horizontal axis, the top and bottom portions would be mirrored images of each other in that the bottom portion would appear as a reflection of the top portion in much the way a battleship would be reflected by floating in a still body of water. Along the top portion of the separator, there is an ascending stepped section (1905) upon which exists a key-like shaped section (1910) that includes a double key-way inward protruding portion (1911) and a double key-way outward protruding portion (1912) of the separator. Along the bottom portion of the separator, there is a symmetrical (with the top portion) descending stepped section (1905) which includes the same shaped key-like section (1910) with inward protruding portions (1911) and outward protruding portions (1912) that exist under the bottom stepped section (1905).

This separator again provides at least a four quadrant set of clearance channels for conductors or conductor pairs with an optional outer film (1930) and with conductors that have both an outer insulation material (1940) and an inner conductor material (1945) for each individual conductor or conductor pair. There is a center hollow portion (1950) as part of the stepped (1905) portion that is also shaped in a circular fashion to again achieve material reduction for cost, flammability and smoke generation benefits.

Figure 20:
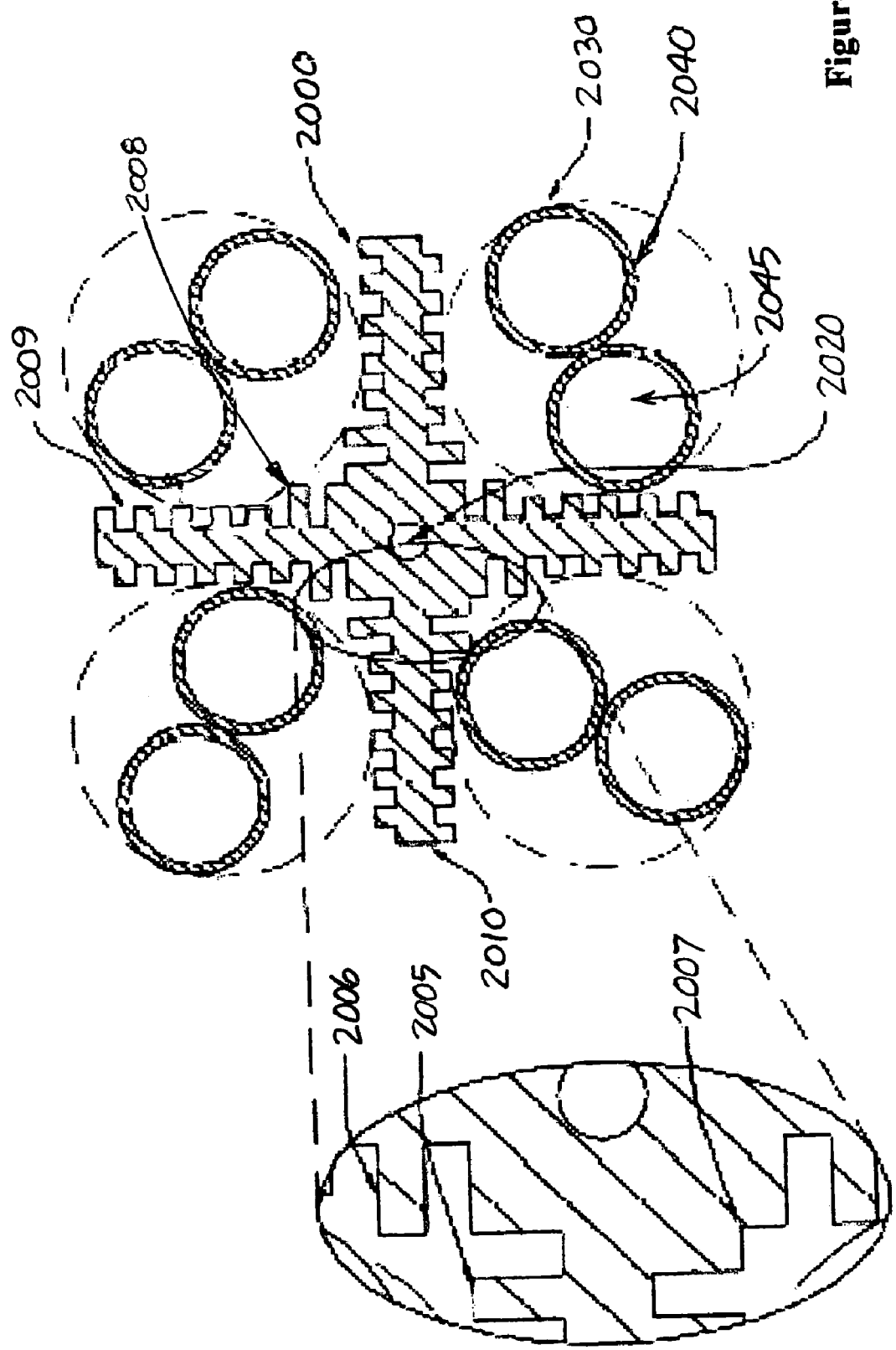
FIG. 20 is a cross-section end view of a staggered and rifled symmetrical cross shaped separator.

FIG. 20 is a cross-sectional view of a "staggered rifled cross" shaped cable spacer separator (2000) that is comprised optionally of a solid, foamed or solid skin over a foamed core. As in the spacer of FIG. 19, there is at least one upward protruding sections (2005) near the center portion of the staggered rifled cross separator along the lateral or horizontal direction that are longer than such subsequent upward protruding sections in the same direction. There is also at least one laterally protruding section (2006) near the center portion of the staggered rifled cross separator along the lateral or horizontal direction that is longer than any subsequent laterally protruding section in the same direction. In addition, there are inwardly intruding sections near the center portion of the spacer (2007) along the vertical and lateral or horizontal directions of the separator as well as laterally protruding sections (as many as four) (2008) that may exist near the center portion of the staggered rifled cross separator. Inwardly intruding sections are also located near the tipped portions of the separator (2009)—as many as four may exist. At the same tipped end portion, there may be inverted ends (2010). This entire geometry is configured to ensure that "worst pair" electrical conductors are spaced in a staggered arrangement to ensure that little or no influence or synergism can occur between the electrically worst two pairs or electrically worst individual conductors. The rifled arrangement allows for squeezing the conductors into the interstices of each of four quadrants with optional outer jacket or film insulation (2030) for the conductor pairs which include an outer insulation section (2040) and an inner conductor sections (2045). The central portion of the separator may also include a hollow orifice (2020).

Figure 21A:
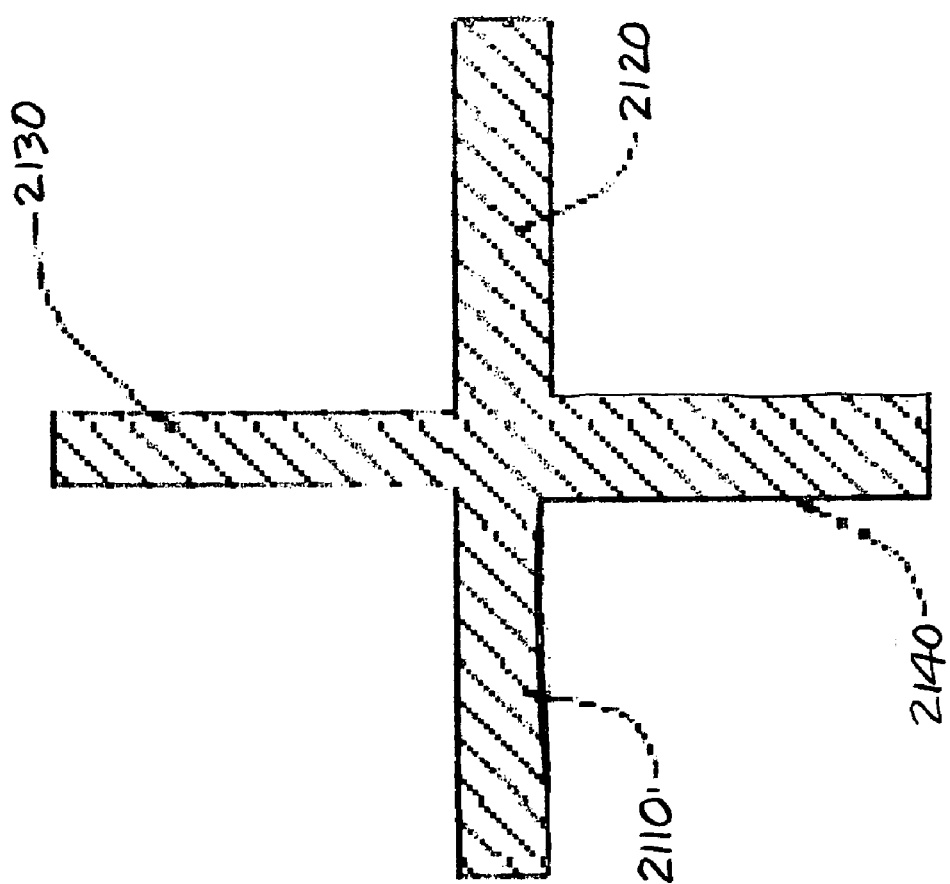
FIG. 21a is a cross-sectional view of an asymmetric cross-shaped separator.
Figure 21B:
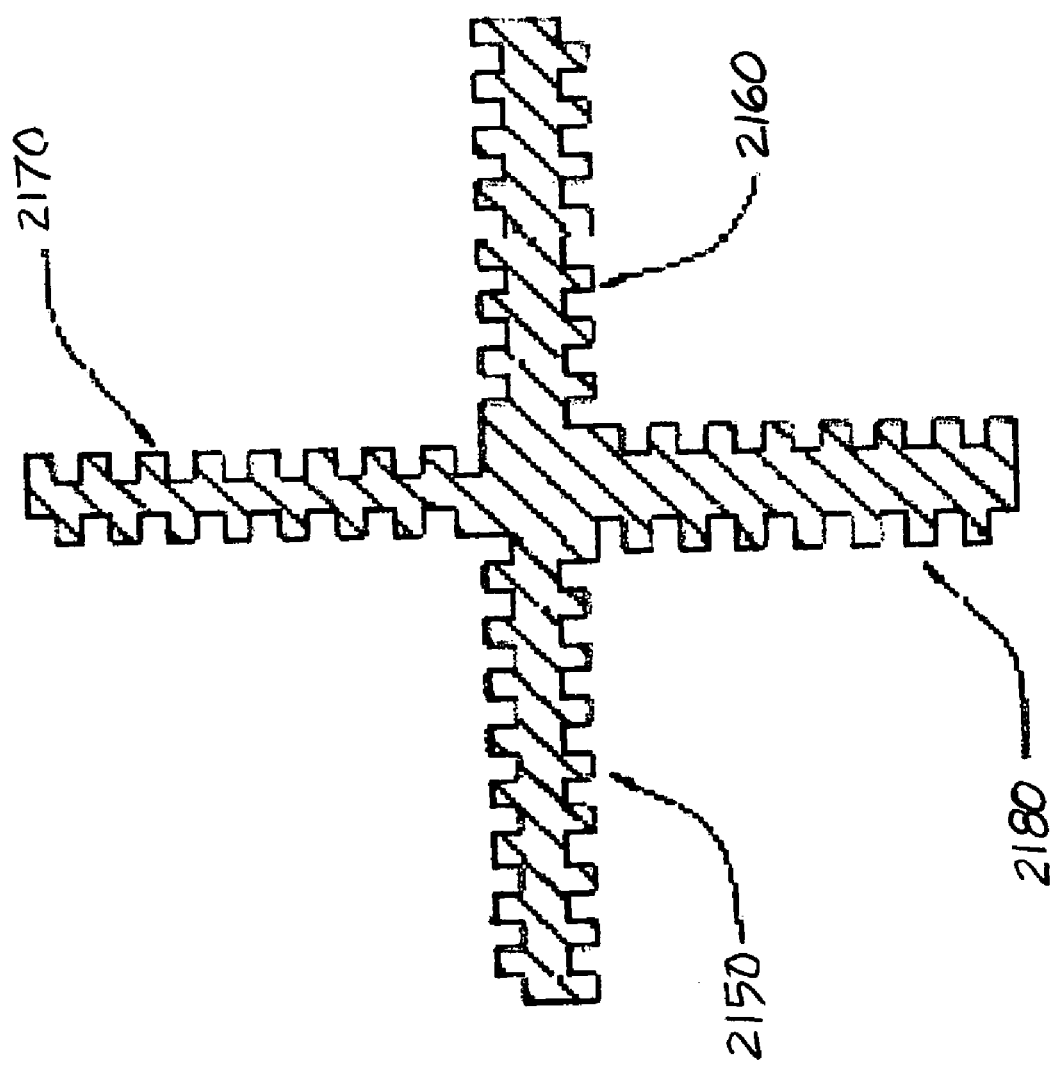
FIG. 21b is a cross-sectional view of an asymmetric cross-shaped separator with rifled or "saw-blade" like members.

FIG. 21a is a cross-sectional view of an asymmetric cross, where each of four quadrants formed by the cross to make clearance channels are formed by either vertical or horizontal sections along an axis of the cross with varying widths. Here, the left side horizontal member (2110) is narrower in width than that of the right side horizontal member (2120). Similarly, the vertical member (2130) extending in an upward direction is narrower in width than that of the other vertical member (2140). FIG. 21b is completely analogous to FIG. 21a except that the asymmetric cross in this cross-sectional view includes rifled or "saw-blade" like members as shown previously. In this figure, section (2150) is narrower than section (2160) along the horizontal axis, and section (2170) is narrower than section (2180). The "teeth" of the saw-blade are described in detail with FIG. 22.

FIG. 22 is a cross-sectional view of a saw-blade type separator (2200) that may be, in fact, a semi-rigid thermoplastic or thermoset film with "serrated" or rifled section along the top and bottom portions of the horizontal axis. The teeth that form serrated edges may be shaped in several ways, two of which are shown in the expanded view of the same figure. Along either the top or bottom portion of the separator blunt undulating sections may be used (2210) or other shapes such as the "u" or "v" grooved sections (2220). It should be understood that the teeth may be used in any combination desired, based on the need of the cable manufacturer.

Figure 23A:
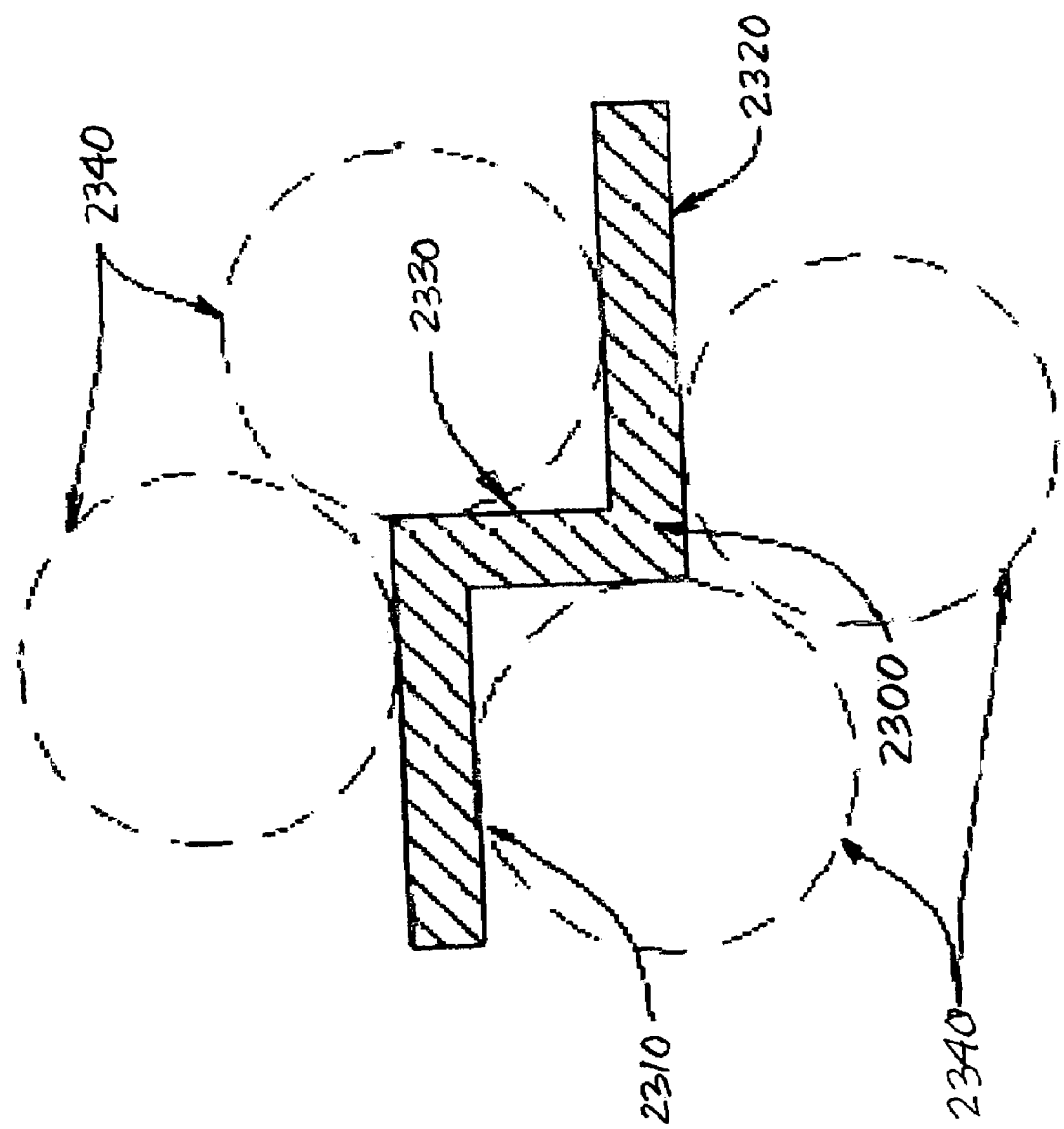
FIG. 23a is a cross-sectional view of a symmetrical "Z" or angle-iron shaped type separator.
Figure 23B:
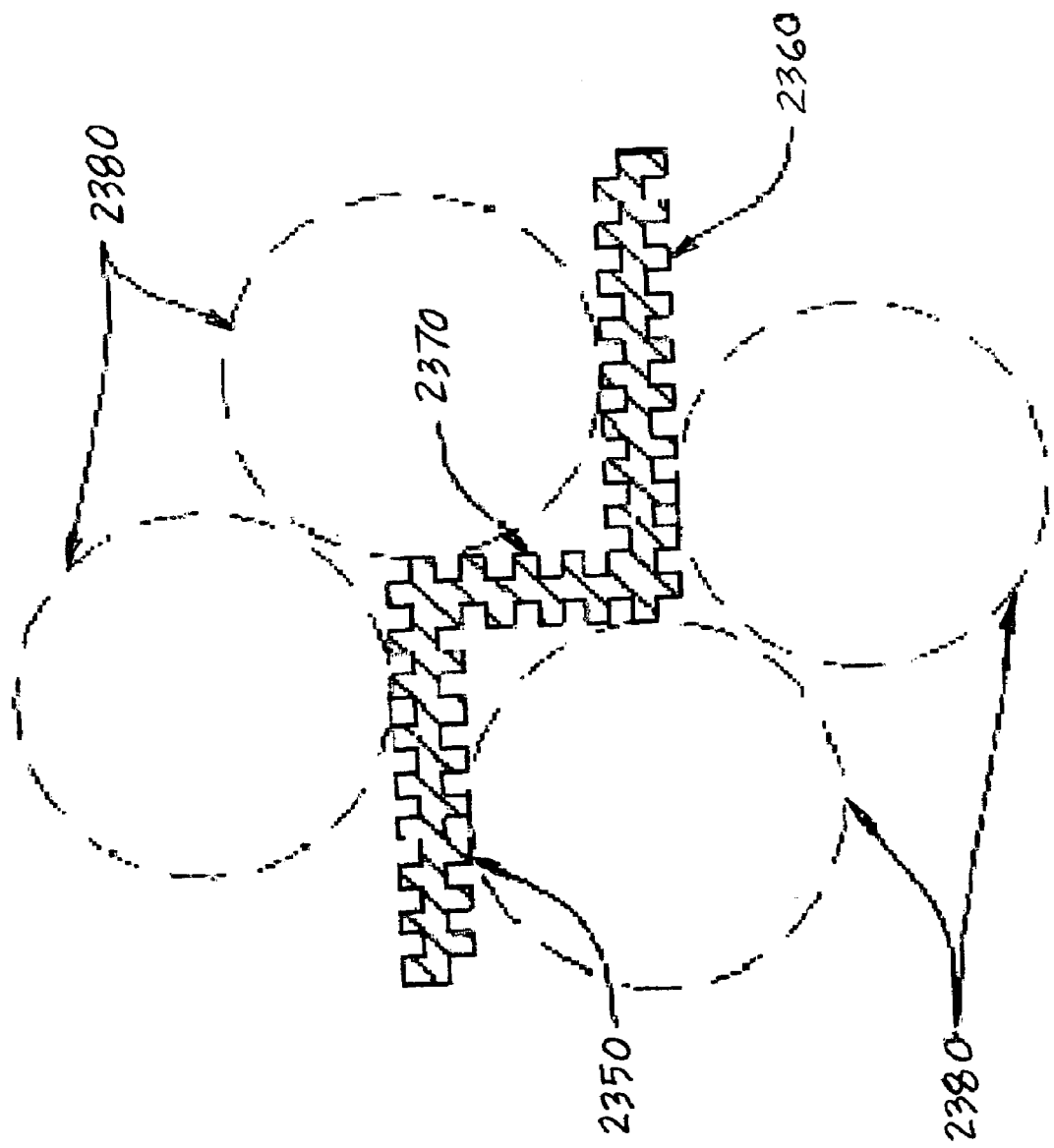
FIG. 23b is a cross-sectional view of a symmetrical "Z" or angle-iron shaped type separator with rifled or "saw-blade" like members.

FIG. 23a is a cross-sectional view of a symmetrical "Z" or angle-iron shaped type separator (2300) that also may be a semi-rigid thermoplastic or thermoset film. As shown, the separator is symmetric in that both horizontal sections (2310) and (2320) are of the same length and evenly spaced apart by the central vertical section (2330). The separator could also be asymmetric in that either of the horizontal sections could be extended or shortened with respect to one another. Also, the vertical section (2330) length could be adjusted as needed for electrical specification requirements. This separator is provided primarily for 2 conductor pair (2340) to be inserted in the clearance channels provided. FIG. 23b is also a symmetrical "Z" or angle-iron shaped type separator with the addition, in this cross-sectional view, of rifled or "saw-blade" like members as shown previously. In this figure, sections (2350) and (2360) along the horizontal axis can be the same length or arbitrarily different lengths—resulting in an asymmetric shape. The central vertical section (2370) and associated saw-blade like teeth can also be lengthened or shortened as necessary. The "teeth" of the saw-blade are described in detail in FIG. 22 and the same blunt undulating, "u" or "v" shaped grooves can be used for this separator as well. This separator is provided primarily for 2 conductor pair (2380) to be inserted in the clearance channels provided.

Figure 24A:
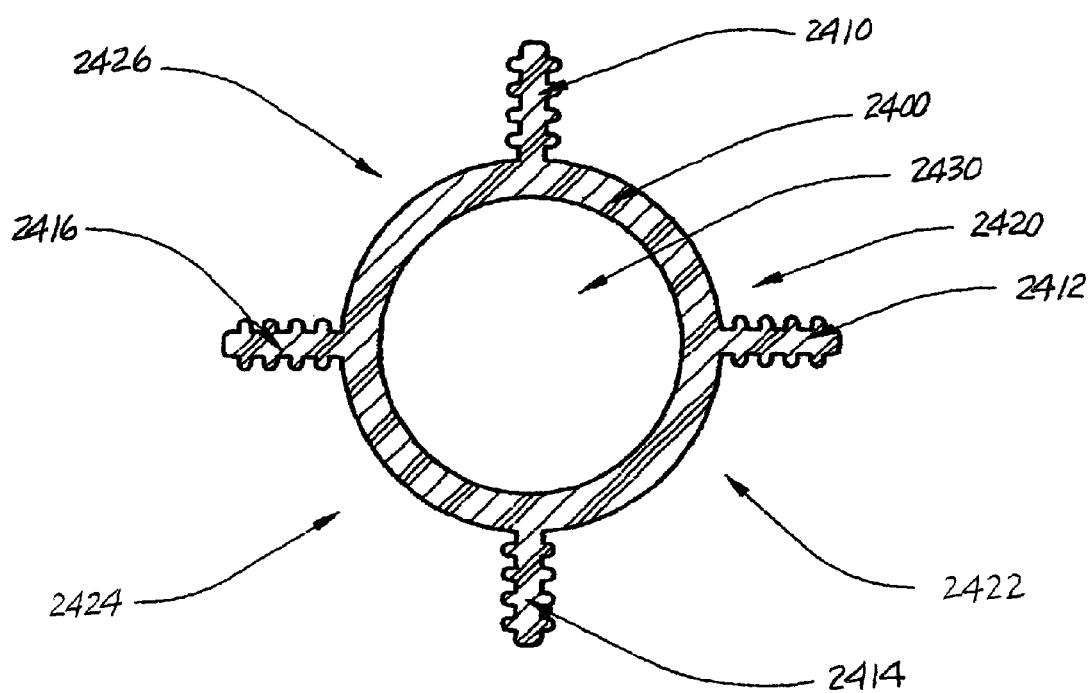
FIG. 24a is a cross-section view of one embodiment of the cable support-separator that includes a symmetrical core with a central circular ring region with four extending rifled protrusions each extending in a preferred 90 degree separation from each other for optimum pair separation. The central ring portion optionally includes a hollow region to act as an air blown fiber (ABF) duct which is available for filling with optical fiber which is comprised of solid, semi-solid, foamed or hollow polymeric smooth internal and external surfaces.

FIG. 24*a* is a cross-section view of one embodiment of the cable support-separator that includes a symmetrical core with a central circular ring region (100) with four extending rifled protrusion (2410, 2412, 2414, 2416) each extending in a preferred 90 degree separation from each other for optimum pair separation. The optimum pair separation is gained by placing pairs between the four extending rifled protrusions in regions (2420, 2422, 2424, 2426). The central circular ring portion (2400) optionally includes a hollow region (2430) to act as an air blown fiber (ABF) duct which is available for filling with optical fiber which is comprised of solid, semi-solid, foamed or hollow polymeric smooth internal and external surfaces.

Figure 24B:
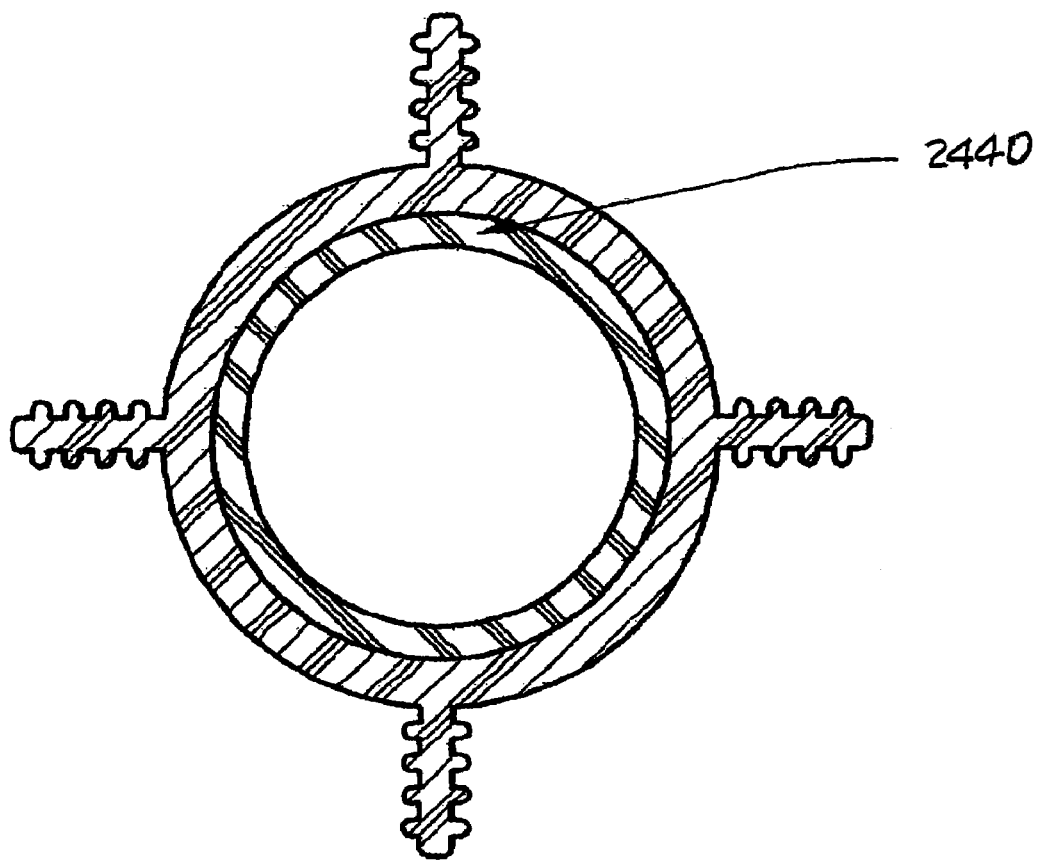
FIG. 24b is a cross-section view of a second embodiment of the cable support-separator that includes the same symmetrical core with a central circular ring region as for FIG. 24a, but also includes a second inner ring within the hollow region comprised of a different material than the outer ring for either increasing lubricity or friction with four extending rifled protrusions each extending in a preferred 90 degree separation from each other for optimum pair separation.

FIG. 24*b* is a cross-section view of a second embodiment of the cable support-separator that includes the same symmetrical core with a central circular ring region as for FIG. 24*a*, but also includes a second inner ring (2440) within the hollow region comprised of a different material than the outer ring for either increasing lubricity or friction with four extending rifled protrusions each extending in a preferred 90 degree separation from each other for optimum pair separation.

Figure 24C:
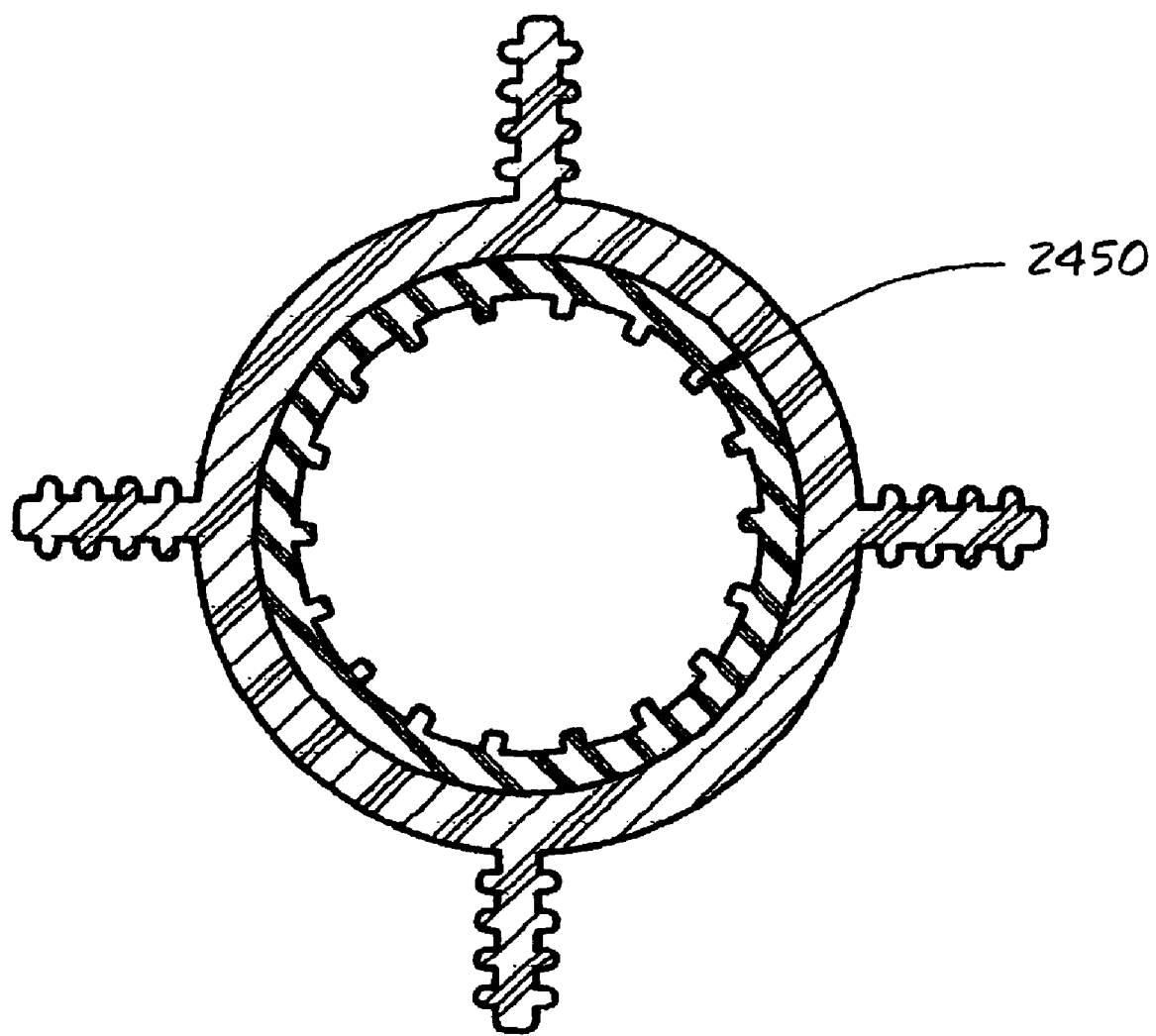
FIG. 24c is a cross-section view of a third embodiment of the cable support-separator that includes the same symmetrical core with a central circular ring region as for FIG. 24a, but also includes a second inner ring within the hollow region comprised of a different material than the outer ring for either increasing friction utilizing rifled inter spatially arranged sections with four extending rifled protrusions each extending in a preferred 90 degree separation from each other for optimum pair separation.

FIG. 24*c* is a cross-section view of a third embodiment of the cable support-separator that includes the same symmetrical core with a central circular ring region as for FIG. 24*a*, but also includes a second inner ring within the hollow region comprised of a different material than the outer ring for increasing friction utilizing rifled inner spatially arranged sections (2450) with four extending rifled protrusions each extending in a preferred 90 degree separation from each other for optimum pair separation.

Figure 24D:
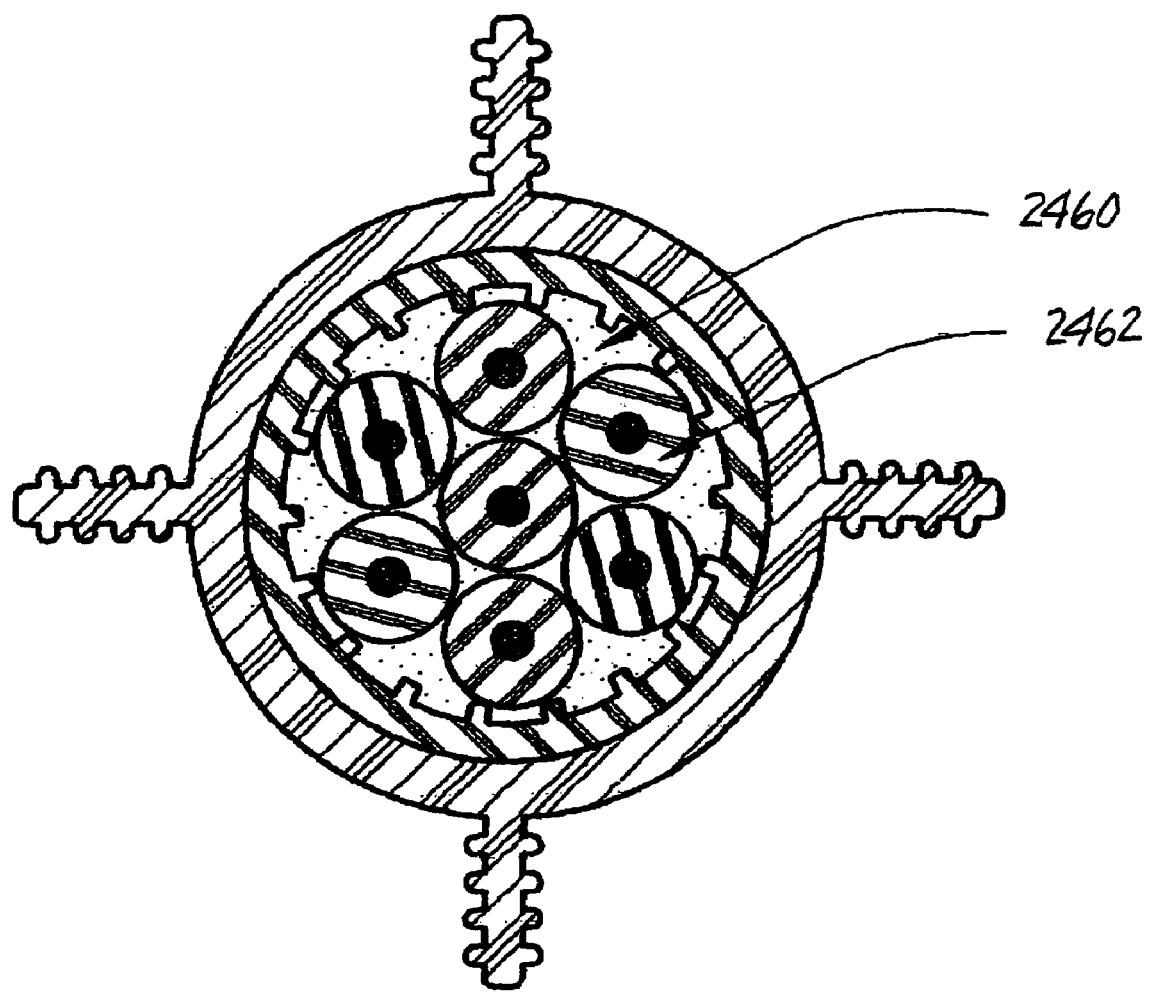
FIG. 24d is a cross-section view of a third embodiment of the cable support-separator that includes the same symmetrical core with a central circular ring region as for FIG. 24c, but also includes the optional use of a organic or inorganic fibers including a polyamide (for example Kevlar®) filing and an optional strength member within the second inner ring within the hollow region comprised of a different material than the outer ring as well as allowing for multiple separate multimode or single mode fiber optic units also contained within the same hollow region with four extending rifled protrusions each extending in a preferred 90 degree separation from each other for optimum pair separation.

FIG. 24*d* is a cross-section view of a fourth embodiment of the cable support-separator that includes the same symmetrical core with a central circular ring region as for FIG. 24*c*, but also includes the optional use of a organic or inorganic fibers (2460) including polyamide (for example Kevlar®) filing and an optional strength member within the second inner ring within the hollow region comprised of a different material than the outer ring as well as allowing for multiple separate multimode or single mode fiber optic units (2462) also contained within the same hollow region with four extending rifled protrusions each extending in a preferred 90 degree separation from each other for optimum pair separation.

Figure 24E:
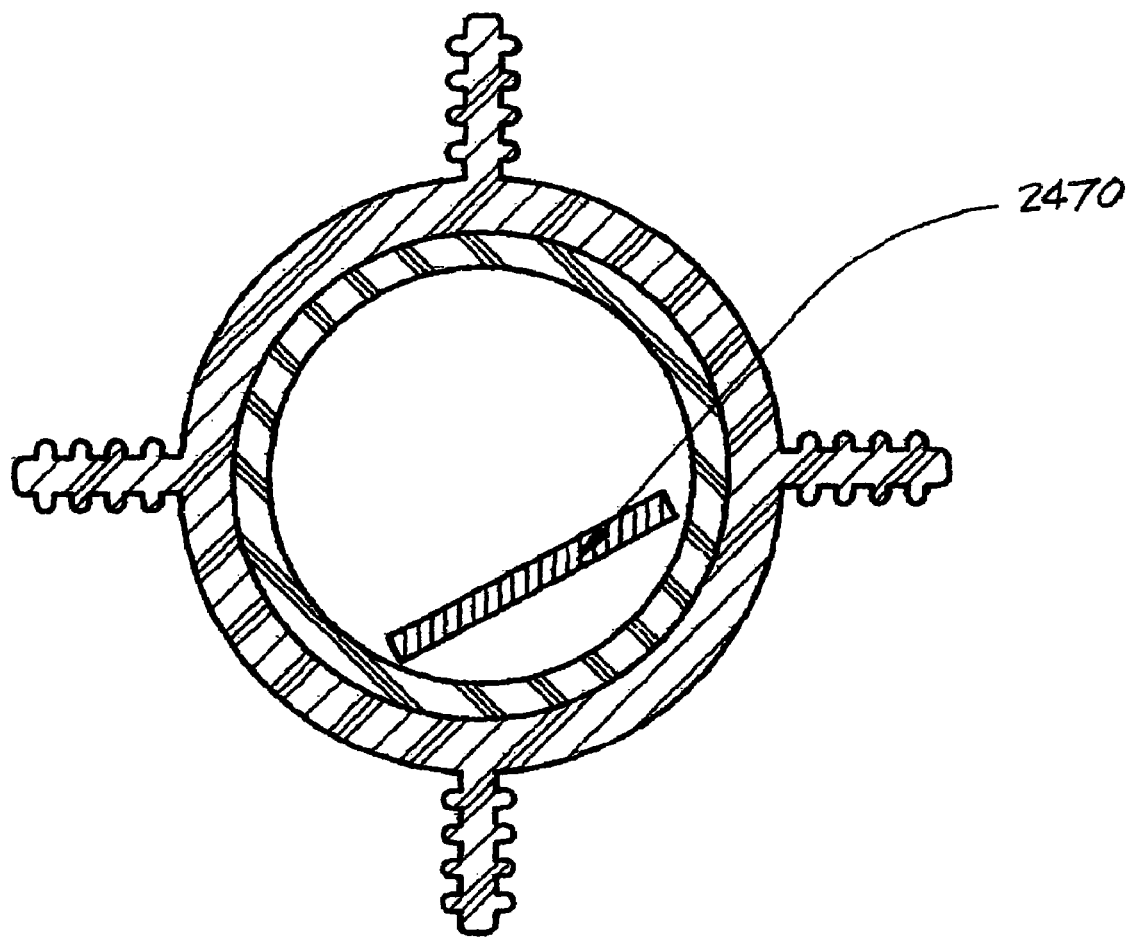
FIG. 24e is a cross-section view of a fifth embodiment of the cable support-separator that includes the same symmetrical core with a central circular ring region as for FIG. 24b and also includes an inner pull tape for attaching optical fibers or metallic conductors wherein the tape optionally itself incorporates a grip or for which a grip is provided for future pulling of those communication media through the hollow region at some future time or during an installation with four extending rifled protrusions each extending in a preferred 90 degree separation from each other for optimum pair separation.

FIG. 24*e* is a cross-section view of a fifth embodiment of the cable support-separator that includes the same symmetrical core with a central circular ring region as for FIG. 24*b* and also includes an inner pull tape (2470) for attaching optical fibers or metallic conductors wherein the tape optionally itself incorporates a grip or for which a grip is provided for future pulling of those communication media through the hollow region at some future time or during an installation with four extending rifled protrusions each extending in a preferred 90 degree separation from each other for optimum pair separation.

Figure 24F:
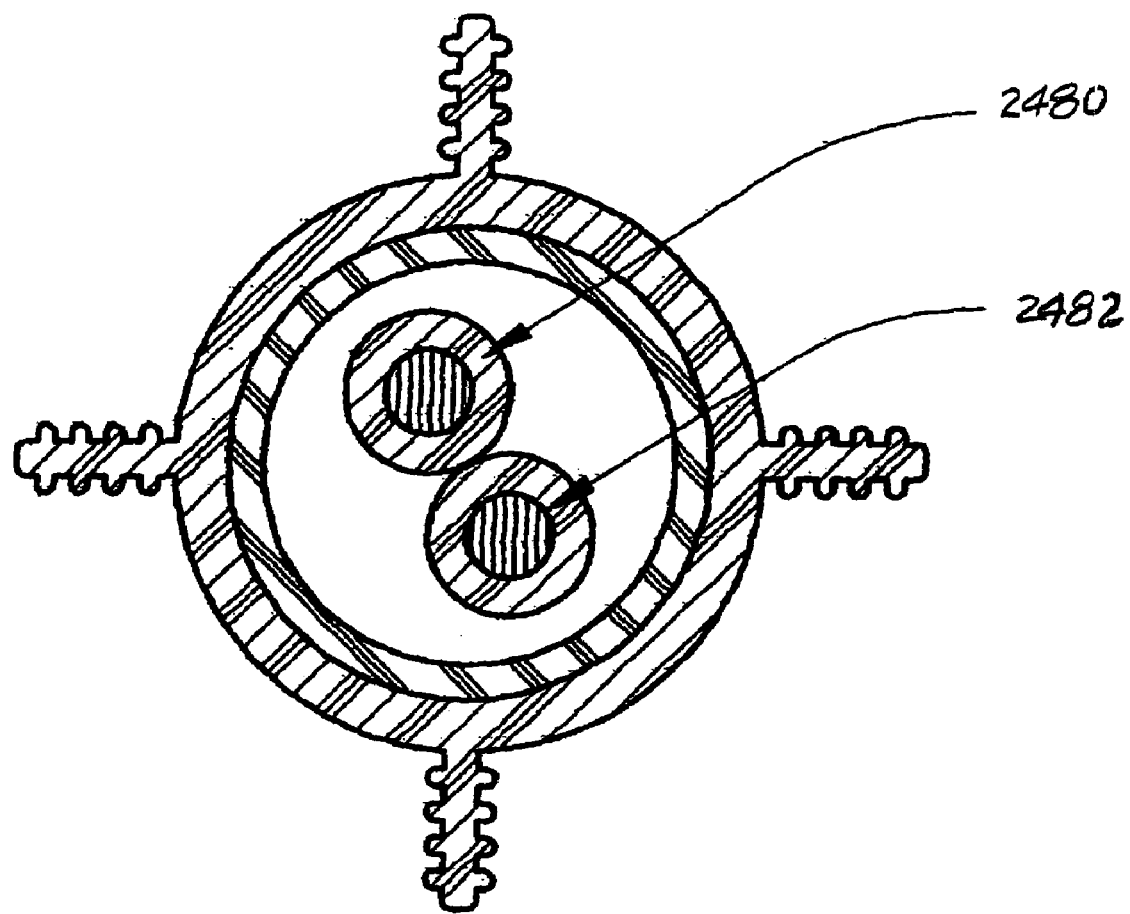
FIG. 24f is a cross-section view of a sixth embodiment of the cable support-separator that includes the same symmetrical core with a central circular ring region as for FIG. 24b but also two individual conductors (which may be twisted) inside the second inner ring which is smooth instead of rifled within the hollow region and comprised of a different material than the outer ring as well as allowing for multiple separate multimode or single mode fiber optic units also contained within the same hollow region with four extending rifled protrusions each extending in a preferred 90 degree separation from each other for optimum pair separation.

FIG. 24*f* is a cross-section view of a sixth embodiment of the cable support-separator that includes the same symmetrical core with a central circular ring region as for FIG. 24*b* but also two individual conductors (2480 and 2482) (which may be twisted) inside the second inner ring which is smooth instead of rifled within the hollow region and comprised of a different material than the outer ring as well as allowing for multiple separate multimode or single mode fiber optic units also contained within the same hollow region with four extending rifled protrusions each extending in a preferred 90 degree separation from each other for optimum pair separation.

Figure 24G:
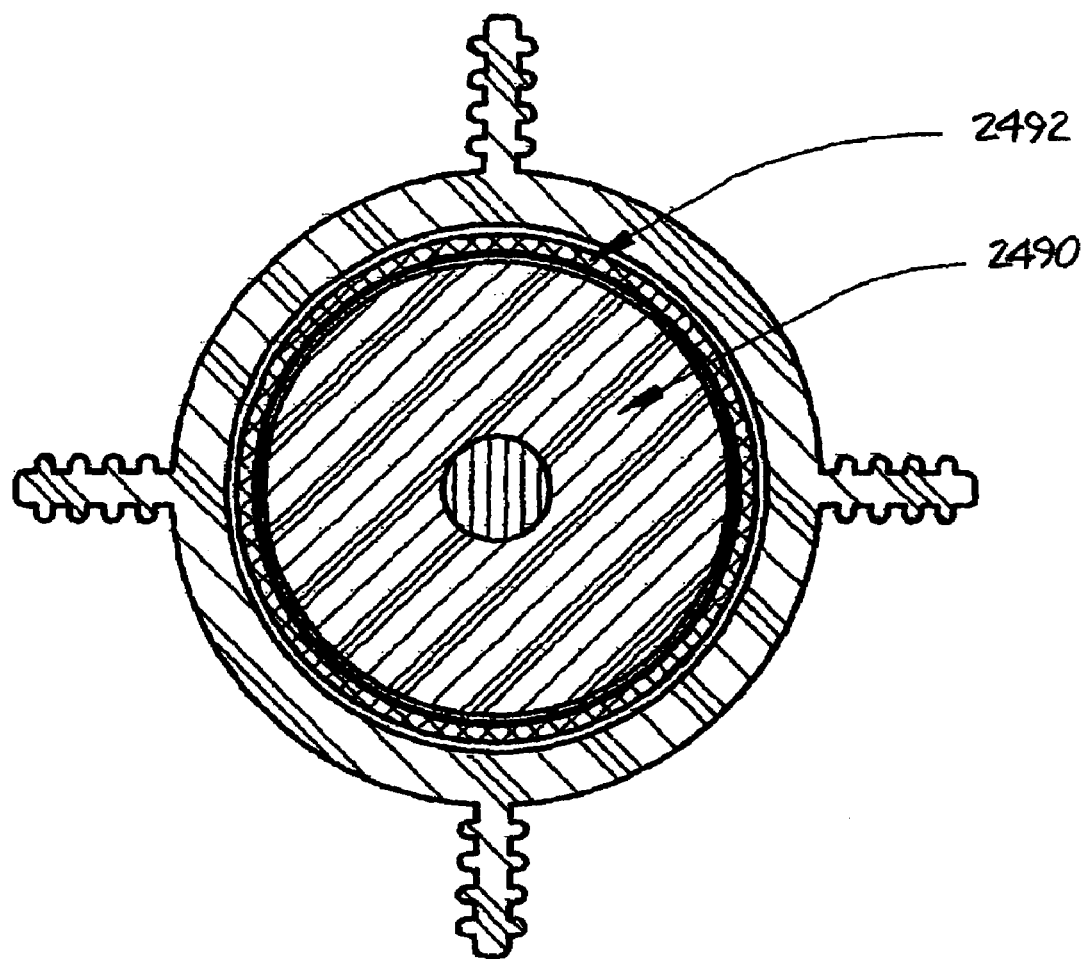
FIG. 24g is a cross-section view of a seventh embodiment of the cable support-separator that includes the same symmetrical core with a central circular ring region as for FIG. 24a with four extending rifled protrusions each extending in a preferred 90 degree separation from each other for optimum pair separation, but also includes the optional addition of one or more coaxial conductors contained in the center hollow region.

FIG. 24*g* is a cross-section view of a seventh embodiment of the cable support-separator that includes the same symmetrical core with a central circular ring region as for FIG. 24*a* with four extending rifled protrusions each extending in a preferred 90 degree separation from each other for optimum pair separation, but also includes the optional addition of one or more coaxial conductors (2490) with a tinned copper braided shield (2492).

Figure 25A:
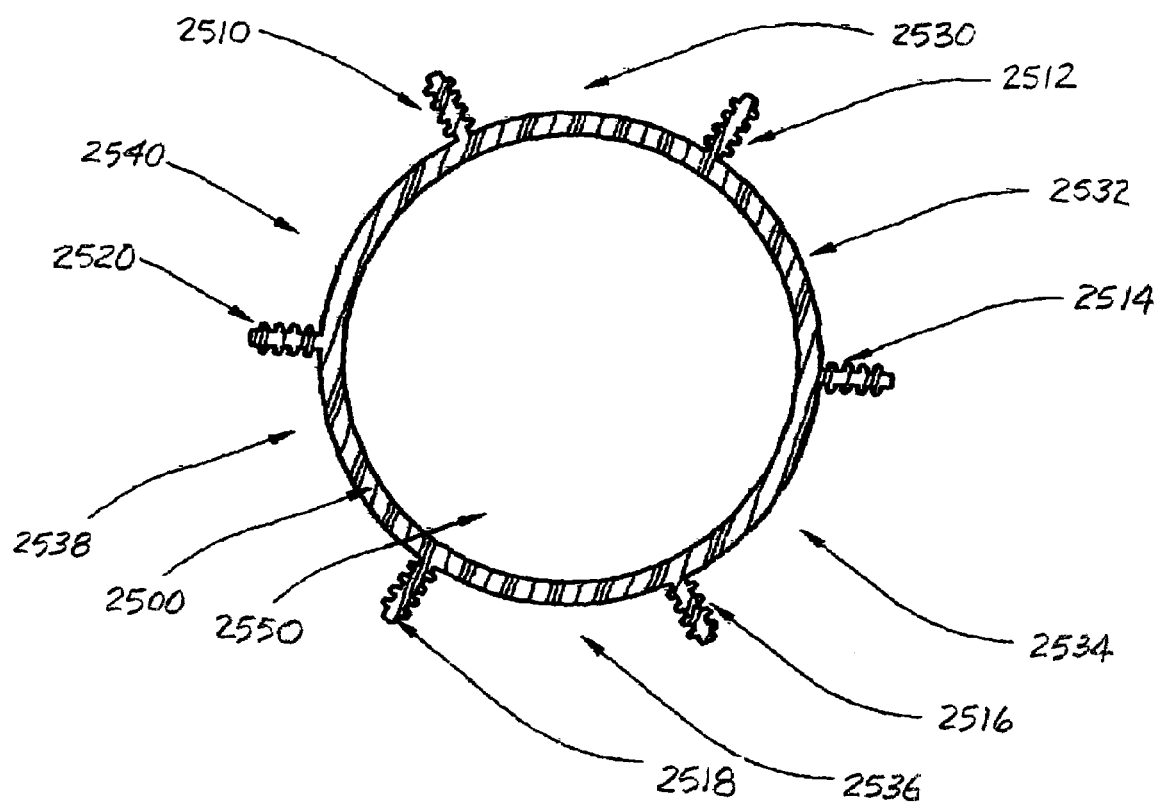
FIG. 25a is a cross-section view of an another embodiment of the cable support-separator that includes the same symmetrical core with a central circular ring region as for FIG. 24a but possesses 6 instead of 4 rifled protrusions each extending in a preferred degree separation from each other for optimum pair separation.

FIG. 25*a* is a cross-section view of another embodiment of the cable support-separator that includes the same symmetrical core with a central circular ring region as for FIG. 24*a* but possesses 6 instead of 4 rifled protrusions (2510, 2512, 2514, 2516, 2518, 2520) each extending in a preferred degree separation from each other for optimum pair separation. The optimum pair separation is gained by placing pairs between the six extending rifled protrusions in regions (2530, 2532, 2534, 2536, 2538, and 2540). The central circular ring portion (2500) optionally includes a hollow region (2550) to act as an air blown fiber (ABF) duct which is available for filing with optical fiber which is comprised of solid, semi-solid, foamed or hollow polymeric smooth internal and external surfaces.

Figure 25B:
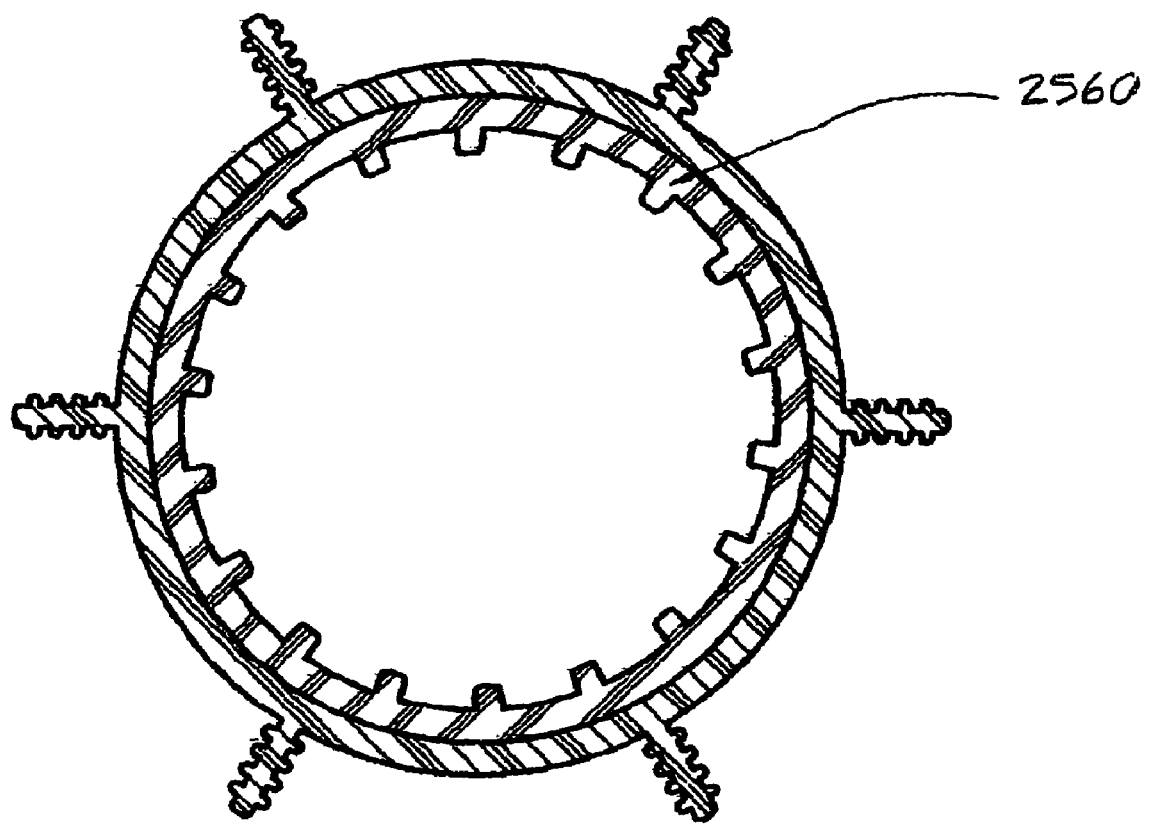
FIG. 25b is a cross-section view of another embodiment of the cable support-separator that includes the same symmetrical core with a central circular ring region as for FIG. 25a but with an inner rifled ring section with as few as two and as many as six extending protrusions each extending in a preferred degree separation along the outer ring from each other for optimum pair separation.

FIG. 25*b* is a cross-section view of another embodiment of the cable support-separator that includes the same symmetrical core with a central circular ring region as for FIG. 25*a* with as few as two and as many as six extending protrusions each extending in a preferred degree separation along the outer ring from each other for optimum pair separation, but also includes a second inner ring within the hollow region comprised of a different material than the outer ring for increasing friction utilizing rifled inner spatially arranged sections (2560).

Figure 25C:
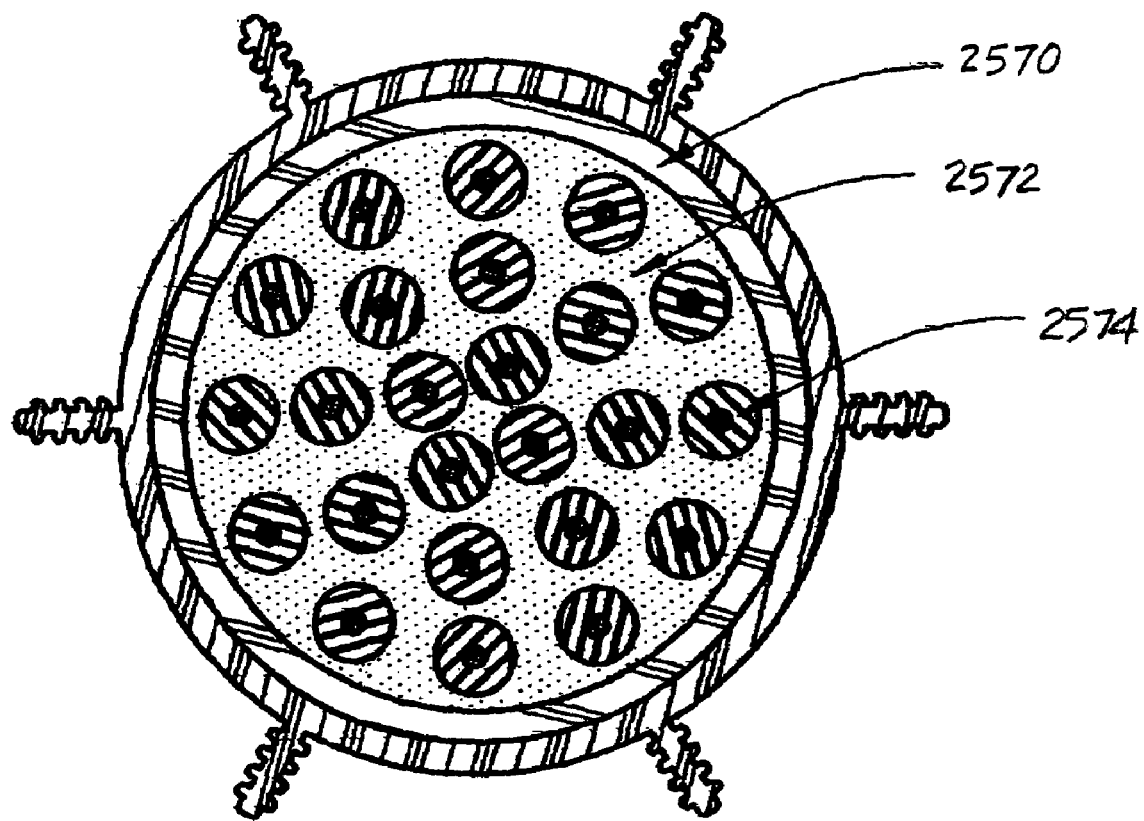
FIG. 25c is a cross-section view of another embodiment of the cable support-separator that includes the same symmetrical core with a central circular ring region as for FIG. 25a but with an inner smooth ring section with as few as two and as many as six extending protrusions each extending in a preferred degree separation along the outer ring from each other for optimum pair separation that optionally includes the addition of one or more conductors including optionally organic or inorganic fibers such as polyamide (for example Kevlar®) filing and an optional strength member within the second inner ring.

FIG. 25*c* is a cross-section view of another embodiment of the cable support-separator separator that includes the same symmetrical core with a central circular ring region as for FIGS. 25*a* and 25*b* but with an inner smooth ring section (2570) with as few as two and as many as six extending protrusions each extending in a preferred degree separation along the outer ring from each other for optimum pair separation that optionally includes the optional addition of one or more conductors (2574) including optionally organic or inorganic fibers such as polyamide (for example Kevlar®) filling and an optional strength member (2572) within the second inner ring.

Figure 25D:
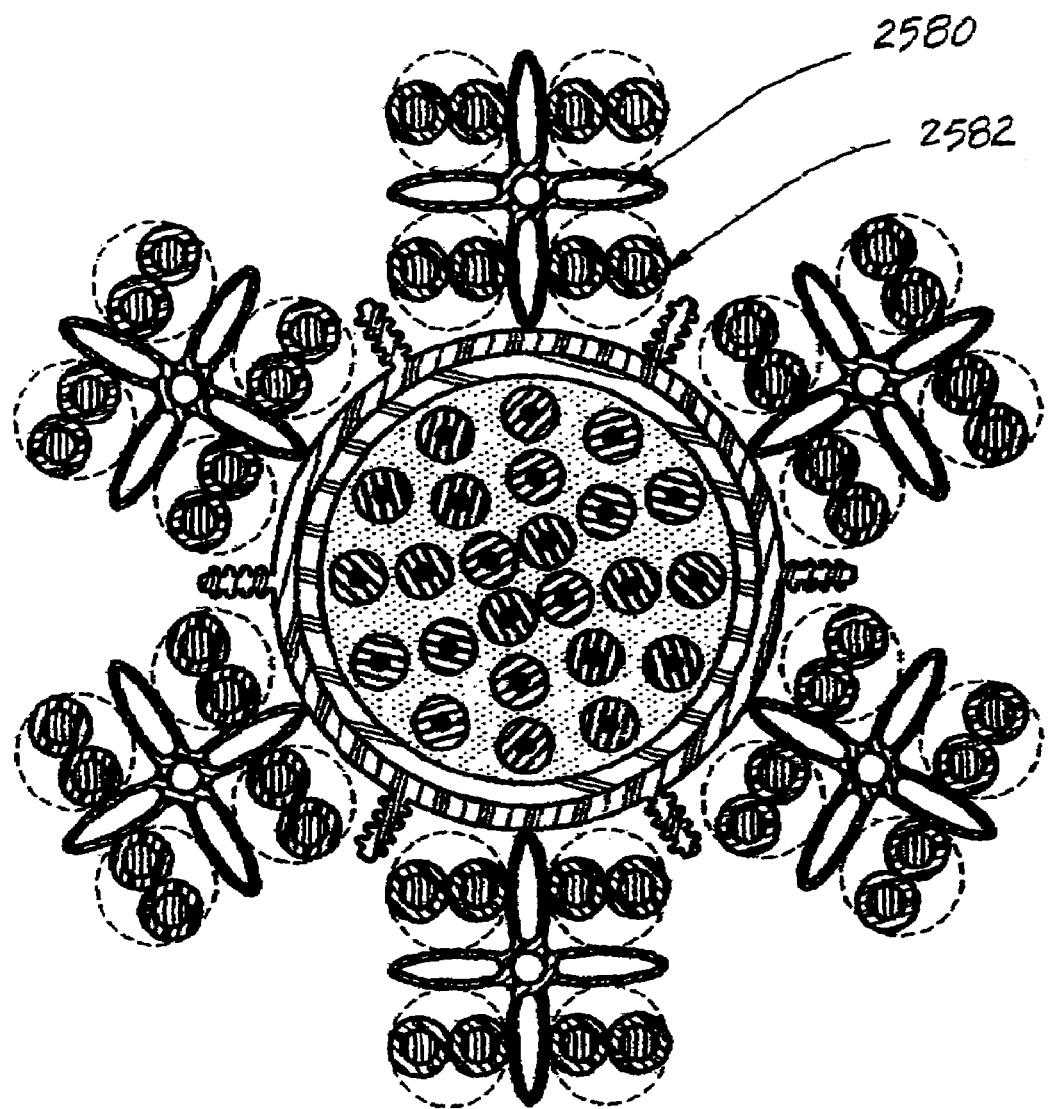
FIG. 25d is a cross-section view of another embodiment of the cable support-separator that includes the same symmetrical core with a central circular ring region as for FIG. 25c with an inner smooth ring section with as few as two and or as many as six extending protrusions each extending in a preferred degree separation along the outer ring from each other for optimum pair separation that optionally includes the addition of one or more conductors including optionally organic or inorganic fibers such as polyamide (for example Kevlar®) filing and an optional strength member within the second inner ring. Also, between as few as one and as many as six of the extending projections, additional daisy-like spacers (as shown in FIG. 28a) are placed which themselves allow for spacing of individual conductors or conductor pairs.
Figure 28A:
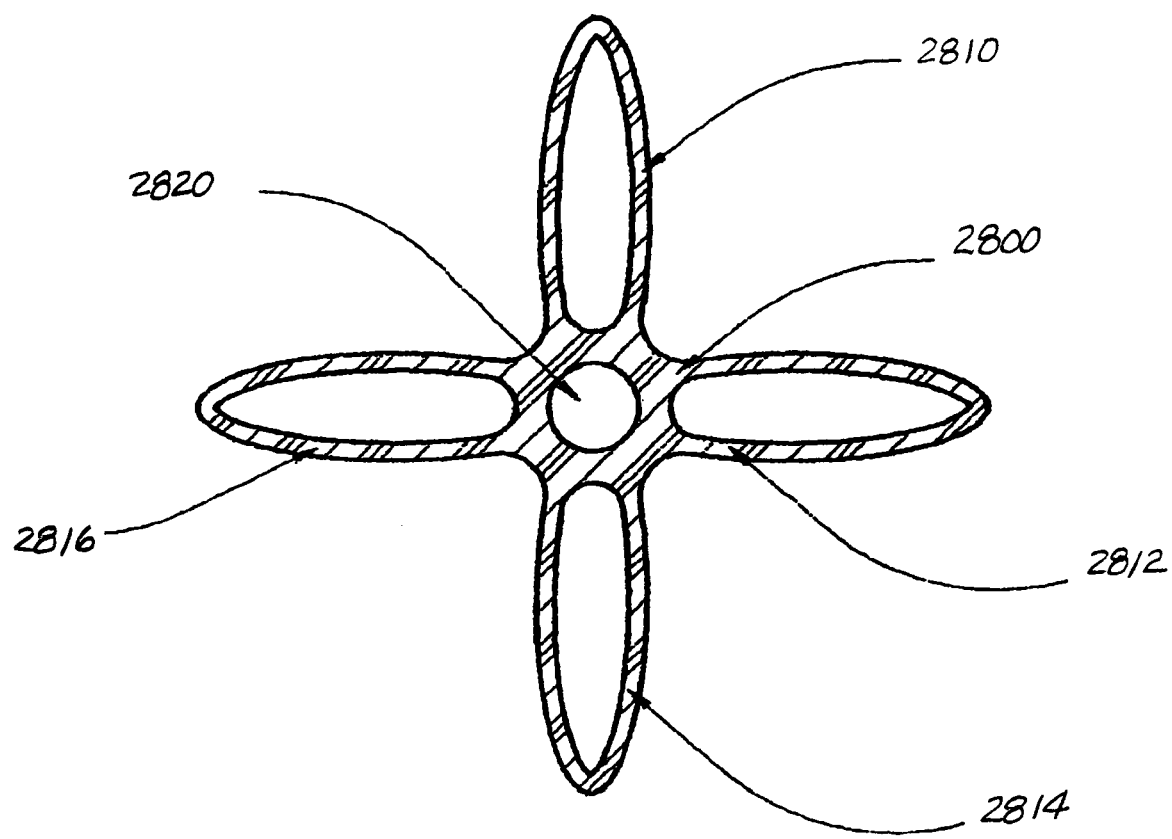
FIG. 28a is a cross-section view of another embodiment of the cable support-separator that includes a hollow four-petal or "daisy" shaped arrangement with a central core that may or may not be hollow. If the central region is hollow, the possibility again exists for that region to act as an air blown fiber (ABF) duct which is available for filling with optical fiber. Coaxial or twisted pair conductors may also be introduced in that region.

FIG. 25*d* is a cross-section view of another embodiment of the cable support-separator that includes the same symmetrical core with a central circular ring region as for FIGS. 25*a* and 25*c* but with an inner smooth ring section with as few as two and as many as six extending protrusions each extending in a preferred degree separation along the outer ring from each other for optimum pair separation that optionally includes the optional addition of one or more conductors including optionally organic or inorganic fibers such as polyamide (for example Kevlar®) filing and an optional strength member within the second inner ring. Also, between as few as one and as many as six of the extending projections, additionally daisy-like spacers (2580)(as shown in FIG. 28*a*) are placed which themselves allow for spacing of individual conductors or conductor pairs (2582).

Figure 25E:
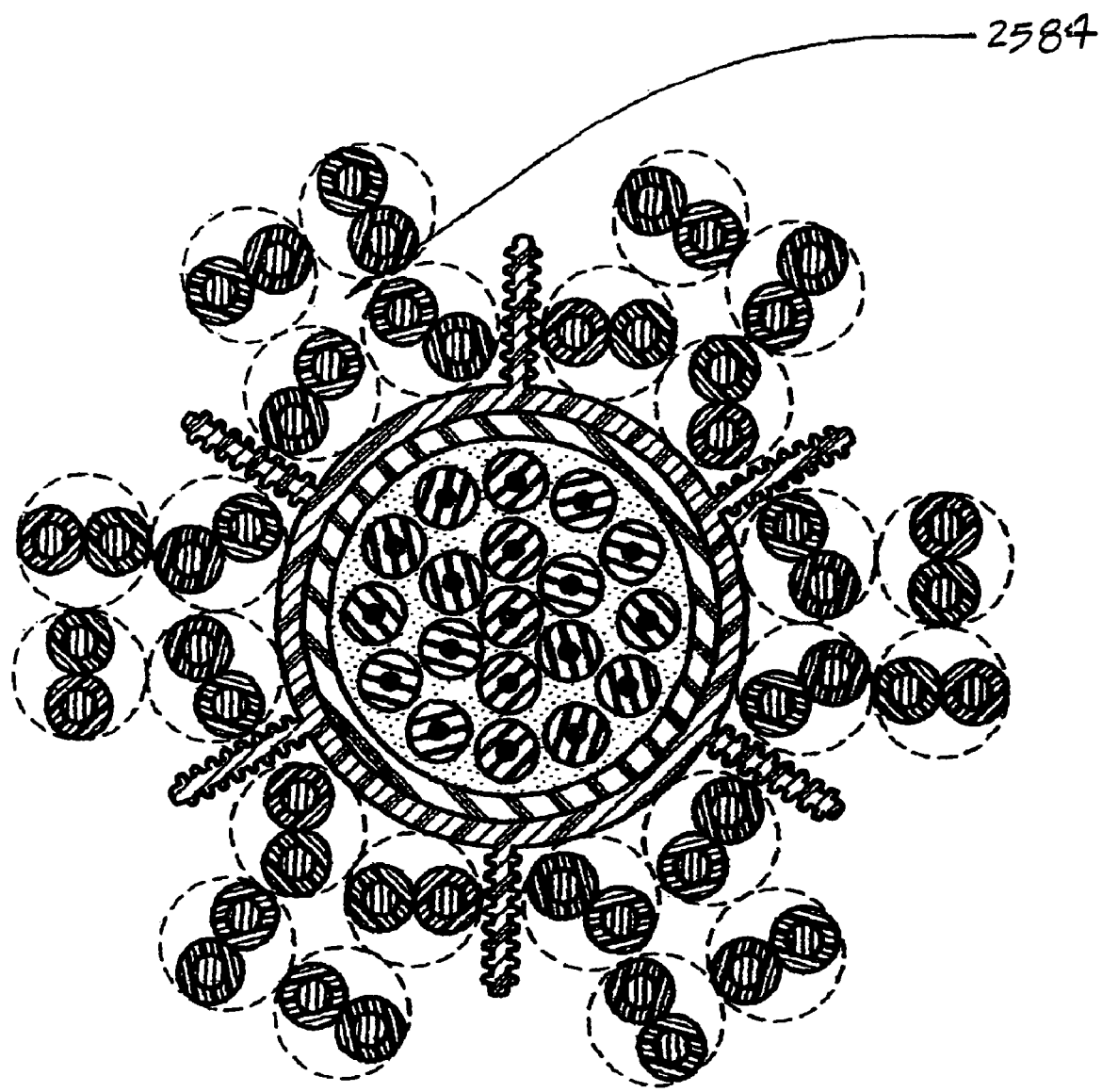
FIG. 25e is a cross-section view of another embodiment of the cable support separator that includes the same symmetrical core with a central circular ring region as for FIG. 25c with an inner smooth ring section with as few as two and as many as six extending protrusions each extending in a preferred degree separation along the outer ring from each other for optimum pair separation that optionally includes the addition of one or more conductors including optionally organic or inorganic fibers such as polyamide (for example Kevlar®) filing and an optional strength member within the second inner ring. Also, between as few as one and as many as six of the extending projections are shown without the additional daisy-like spacers (as shown in FIG. 28a).

FIG. 25*e* is a cross-section view of another embodiment of the cable support-separator that includes the same symmetrical core with a central circular ring region as for FIGS. 25*a* and 25*c* but with an inner smooth ring section with as few as two and as many as six extending protrusions each extending in a preferred degree separation along the outer ring from each other for optimum pair separation that optionally includes the optional addition of one or more conductors including optionally organic or inorganic fibers such as polyamide (for example Kevlar®) filing an an optional strength member within the second inner ring. Also, between as few as one and as many as six of the extending projections are shown without (2584) the additional daisy-like spacers (FIG. 28*a*).

Figure 25F:
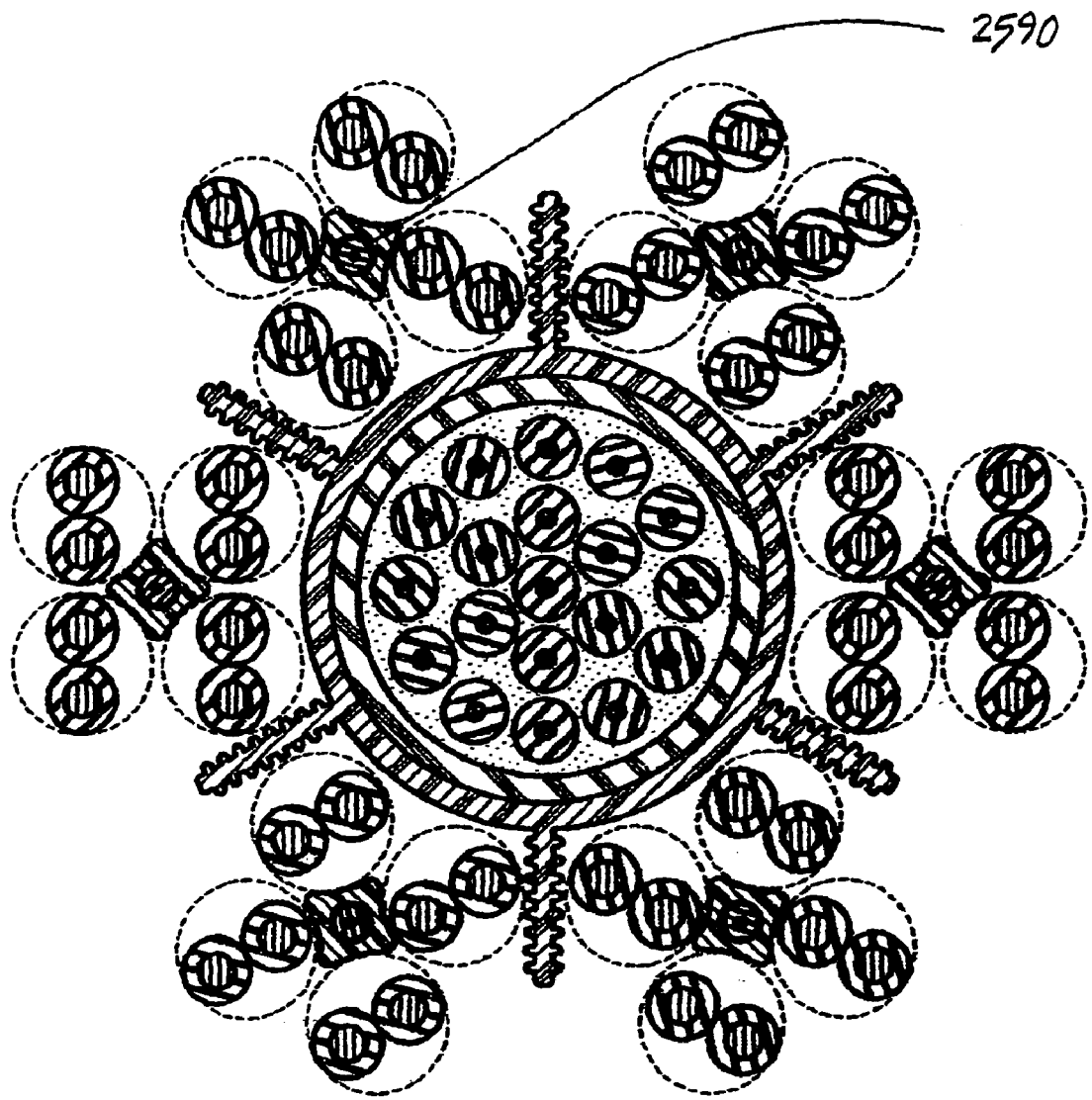
FIG. 25f is a cross-section view of another embodiment of the cable support-separator that includes the same symmetrical core with a central circular ring region as for FIG. 25c with an inner smooth ring section with as few as two and as many as six extending protrusions each extending in a preferred degree separation along the outer ring from each other for optimum pair separation that optionally includes the addition of one or more conductors including optionally organic or inorganic fibers such as polyamide (for example Kevlar®) filing and an optional strength member within the second inner ring. Also, between as few as one and as many as six of the extending projections, additional spacers comprised of a region which includes rounded lobes in a symmetric diamond-like geometry that defines as many as four separate regions for pairs that are properly separated in the final (often jacketed) cable design (as shown in FIG. 29a) are placed which themselves allow for spacing of individual conductors of conductor pairs.

FIG. 25*f* is a cross-section view of another embodiment of the cable support-separator that includes the same symmetrical core with a central circular ring region as for FIG. 25*e* but with an inner smooth ring section with as few as two and as many as six extending protrusions each extending in a preferred degree separation along the outer ring from each other for optimum pair separation that optionally includes the optional addition of one or more conductors including optionally organic or inorganic fibers such as polyamide (for example Kevlar®) filling and an optional strength member within the second inner ring. Also, between as few as one and as many as six of the extending projections, additional spacers (2590) comprised of a circular ring region which is surrounded by rounded lobes in a symmetric diamond-like geometry that defines as many as four separate regions for pairs that are properly separated in the final (often jacketed) cable designed (as shown in FIG. 29*e*) are placed which themselves allow for spacing of individual conductors or conductor pairs.

Figure 26A:
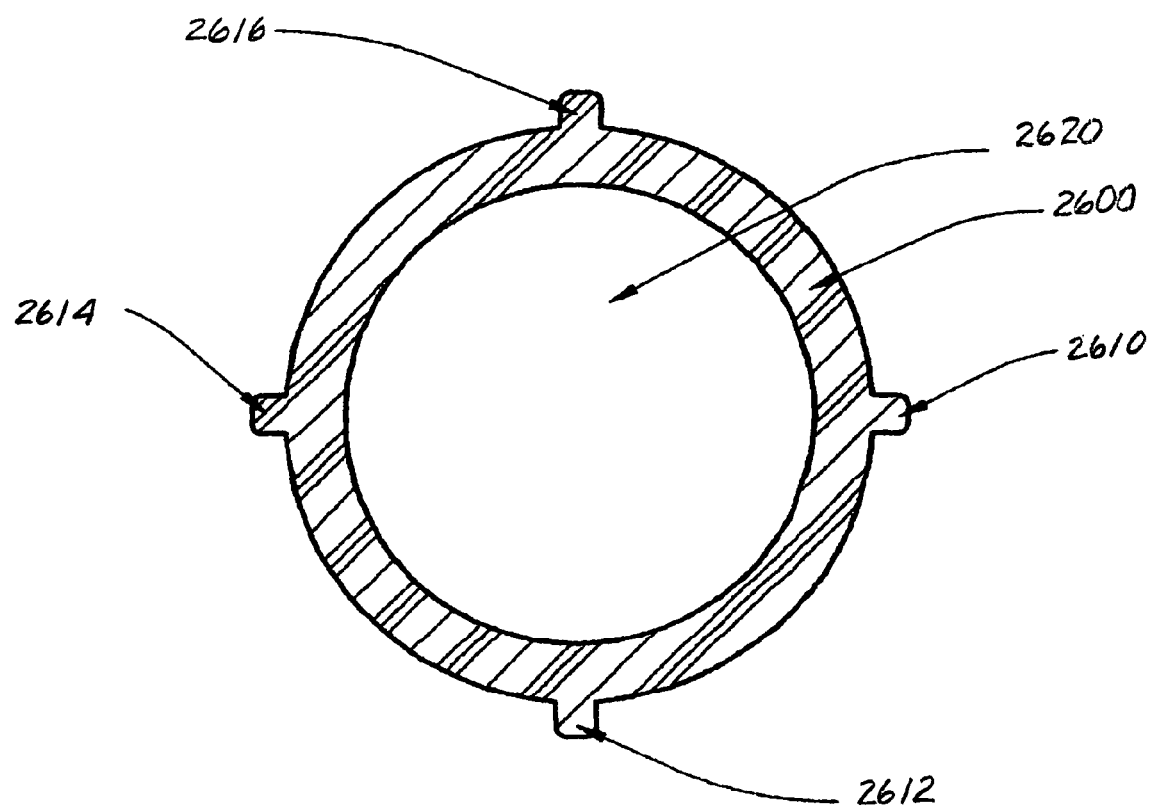
FIG. 26a is a cross-section view of another embodiment of the cable support-separator that includes a symmetrical core with a central circular ring region with four extending smoother protrusions, each protrusion extending less than those of FIGS. 24a through 25f, each again extending in a preferred 90 degree separation from each other for optimum pair separation. The central ring portion optionally includes a hollow region to act as an air blown fiber (ABF) duct which is available for filling with optical fiber which is comprised of solid, semi-solid, foamed or hollow polymeric smooth internal and external surfaces.

FIG. 26*a* is a cross-section view of another embodiment of the cable support-separator that includes a symmetrical core with a central circular ring region (2600) with four extending smooth protrusions (2610, 2612, 2614, 2616), each protrusion extending less than those of FIGS. 24*a* through 25*f*, each again extending in a preferred 90 degree separation from each other for optimum pair separation. The central region portion optionally includes a hollow region (2620) to act as an air blown fiber (ABF) duct which is available for filing with optical fiber which is comprised of solid, semi-solid, foamed or hollow polymeric smooth internal and external surfaces.

Figure 26B:
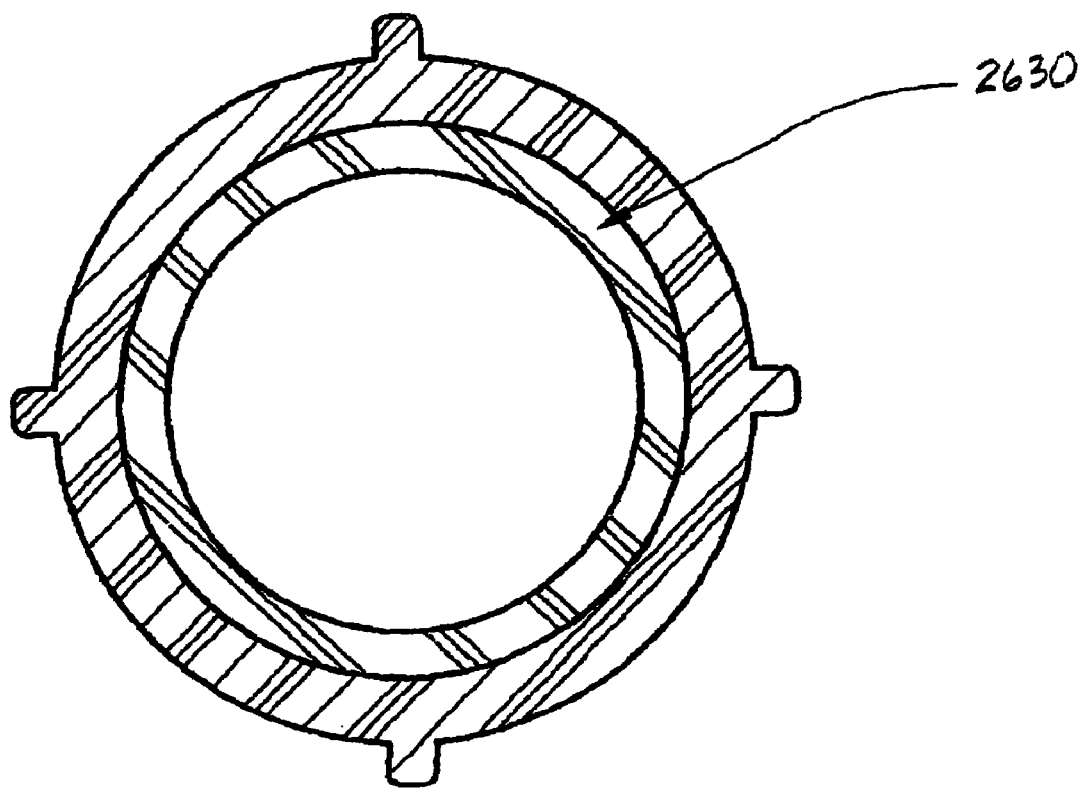
FIG. 26b is a cross-section view of another embodiment of the cable support-separator that includes a symmetrical core with a central circular ring region with four extending smooth protrusions, each protrusion extending less than those of FIGS. 24a through 25f, each again extending in a preferred 90 degree separation from each other for optimum pair separation and also includes a second inner ring within the hollow region comprised of a different material than the outer ring for either increased lubricity or friction. The central ring portion optionally includes a hollow region to act as an air blown fiber (ABF) duct which is available for filling with optical fiber which is comprised of solid, semi-solid, foamed or hollow polymeric smoother internal and external surfaces.

FIG. 26*b* is a cross-section view of another embodiment of the cable support-separator that includes a symmetrical core with a central circular ring region with four extending smooth protrusions, each protrusion extending less than those of FIGS. 24*a* through 24*f*, each again extending in a preferred 90 degree separation from each other for optimum pair separation and also includes a second inner ring (2630) within the hollow region comprised of a different material than the outer ring for either increasing lubricity or friction. The central ring portion optionally includes a hollow region to act as an air blown fiber (ABF) duct which is available for filing with optical fiber which is comprised of solid, semi-solid, foamed or hollow polymeric smooth internal and external surfaces.

Figure 26C:
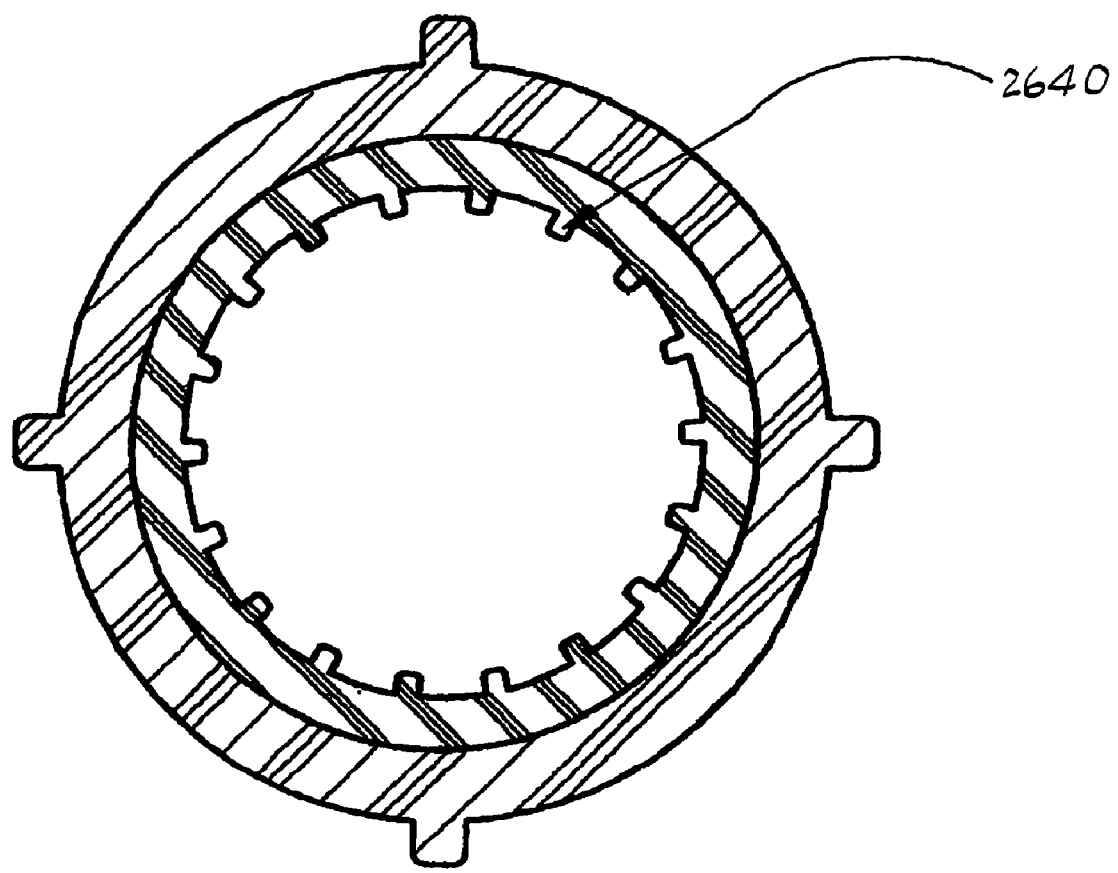
FIG. 26c is a cross-section view of another embodiment of the cable support-separator that includes a symmetrical core with a central circular ring region with four extending smooth protrusions each protrusion extending less than those of FIGS. 24a through 25f, each again extending in a preferred 90 degree separation from each other for optimum pair separation and also includes a second inner ring within the hollow region comprised of a different material than the outer ring for increasing friction utilizing rifled inner spatially arranged sections. The central ring portion optionally includes a hollow region to act as an air blown fiber (ABF) duct which is available for filling with optical fiber which is comprised of solid, semi-solid, foamed or hollow polymeric smooth internal and external surfaces.

FIG. 26*c* is a cross-section view of another embodiment of the cable support-separator that includes a symmetrical core with a central circular ring region with four extending smooth protrusions, each protrusion extending less than those of FIGS. 24*a* through 25*f*, each against extending in a preferred 90 degree separation from each other for optimum pair separation and also includes also includes a second inner ring within the hollow region comprised of a different material than the outer ring for increasing friction utilizing rifled inner spatially arranged sections (2640). The central ring portion optionally includes a hollow region to act as an air blown fiber (ABF) duct which is available for filling with optical fiber which is comprised of solid, semi-solid, foamed or hollow polymeric smooth internal and external surfaces.

Figure 26D:
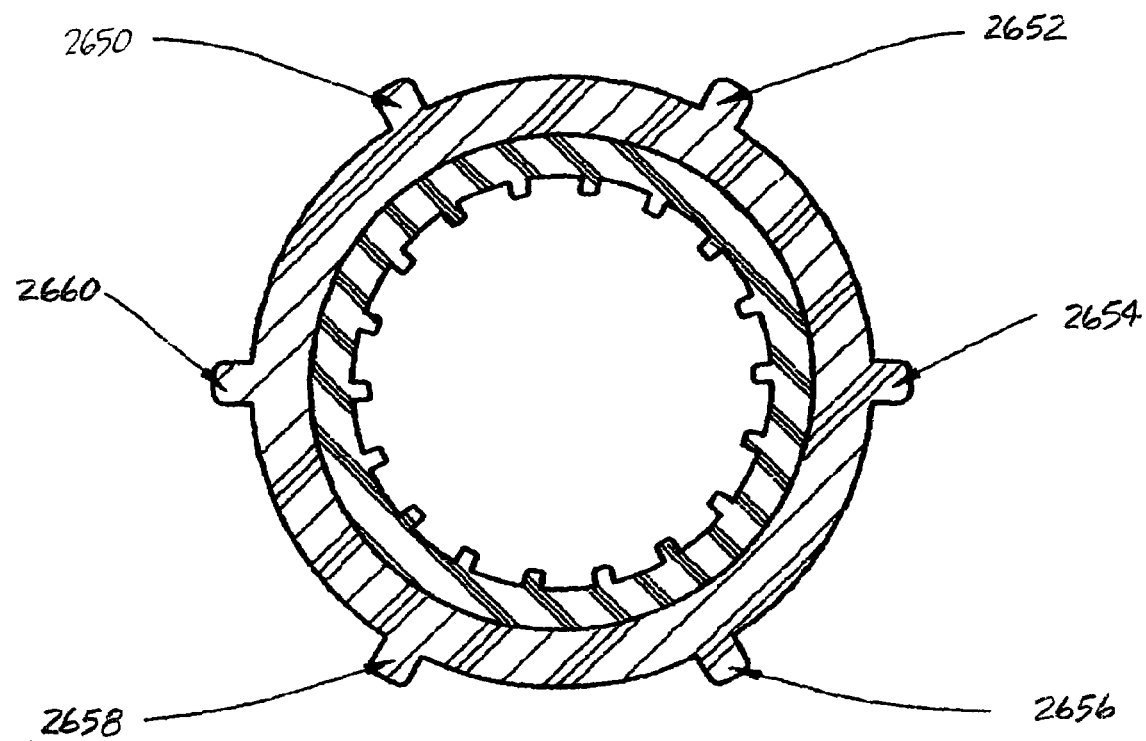
FIGS. 26d and 26e are cross-section views of another embodiment of the cable support-separator that includes a symmetrical core with a central circular ring region with as few as two and as many as six extending smoother protrusions, each protrusion extending less than those of the series of FIGS. 24a through 25f, each again extending in a preferred separation from each other for optimum pair separation and also includes also includes a an optional second inner ring within the hollow region comprised of a different material than the outer ring for increasing friction utilizing rifled inner spatially arranged sections. The central ring portion optionally includes a hollow region to act as an air blow fiber (ABF) duct which is available for filling with optical fiber which is comprised of solid, semi-solid, foamed or hollow polymeric smooth internal and external surfaces.
Figure 26E:
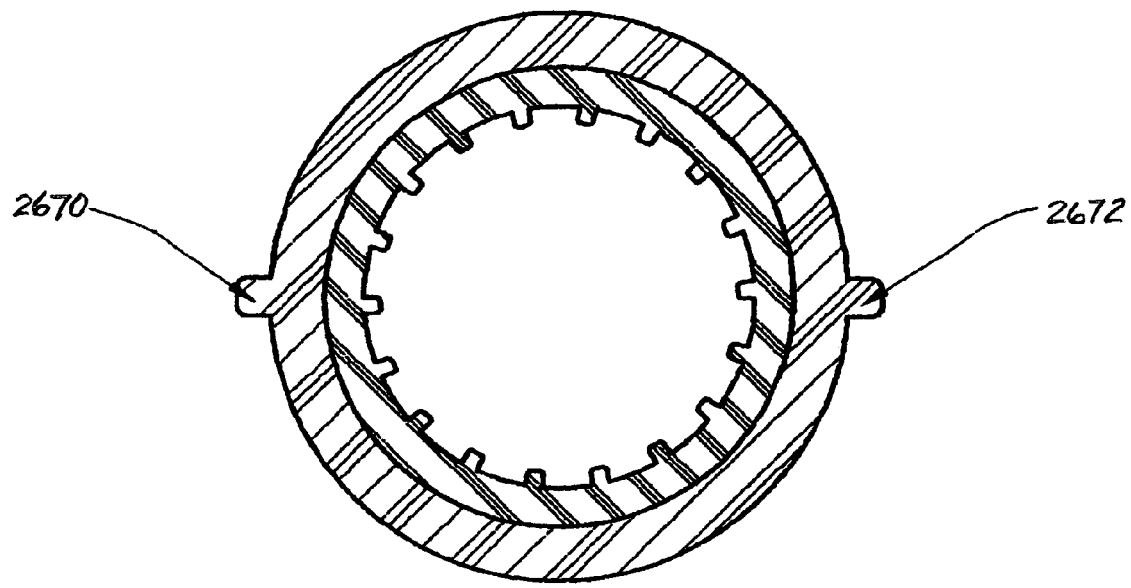

FIGS. 26*d* and 26*e* are cross-section views of another embodiment of the cable support-separator that includes a symmetrical core with a central circular ring region with as few as two (2670 and 2672 in FIG. 26*e*) and as many as six extending smooth protrusions (2650, 2652, 2654, 2656, 2658, 2660 in FIG. 26*d*), each protrusion extending less than those of the series of FIGS. 24*a* through 25*f*, each again extending in a preferred separation from each other for optimum pair separation and also includes also includes a an optional second inner ring within the hollow region comprised of a diffferent material than the outer ring for increasing friction utilizing rifled inner spatially arranged sections. The central ring portion optionally includes a hollow region to act as an air blown fiber (ABF) duct which is available for filling with optical fiber which is comprised of solid, semi-solid, foamed or hollow polymeric smooth internal and external surfaces.

Figure 26F:
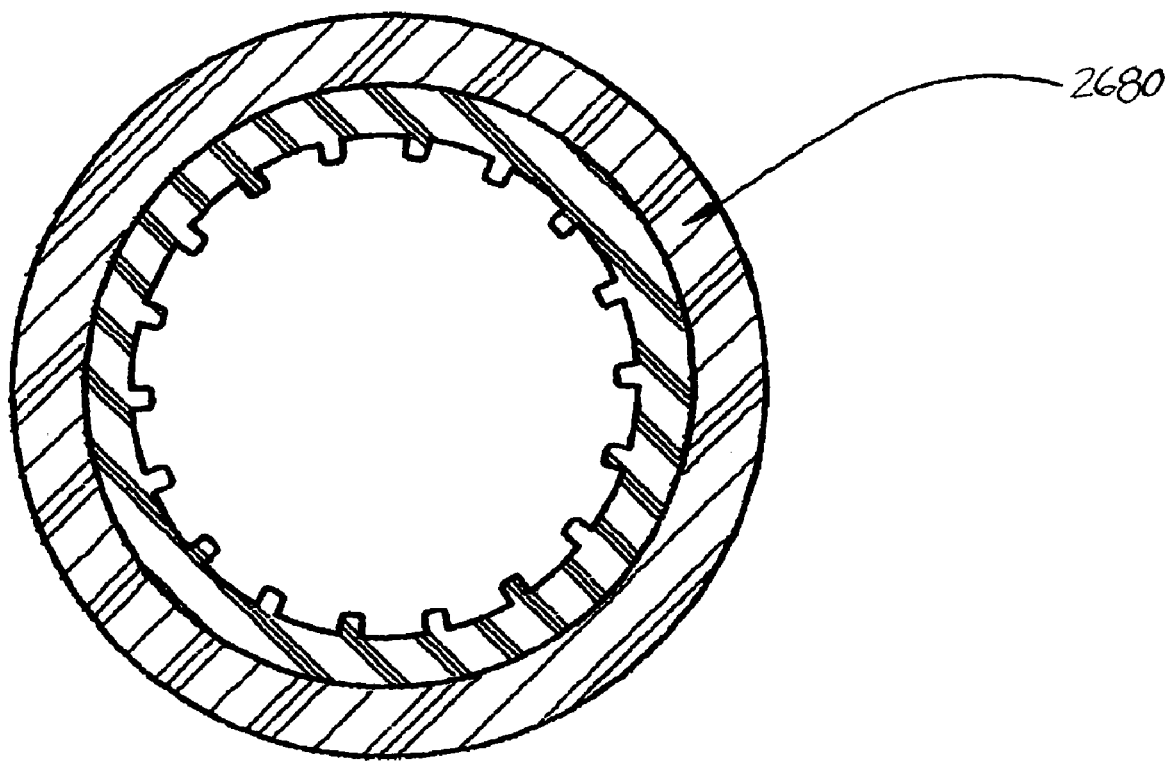
FIG. 26f is a cross-section view of another embodiment of the cable support-separator that includes a symmetrical core with a central circular ring region with no extending protrusions that includes also an optional second inner ring within the hollow region comprised of a different material than the outer ring for increasing friction utilizing rifled inner spatially arranged sections. The central ring portion optionally includes a hollow region to act as an air blown fiber (ABF) duct which is available for filling with optical fiber which is comprised of solid, semi-solid, foamed or hollow polymeric smooth internal and external surfaces.

FIG. 26*f* is a cross-section view of another embodiment of the cable support-separator that includes a symmetrical core with a central circular ring region with no extending protrusions (2680) that includes also an optional second inner ring within the hollow region comprised of a different material than the outer ring for increasing friction optionally utilizing rifled inner spatially arranged sections. The central ring portion optionally includes a hollow region to act as an air blown fiber (ABF) duct which is available for filing with optical fiber which is comprised of solid, semi-solid, foamed or hollow polymeric smooth internal and external surfaces.

Figure 27A:
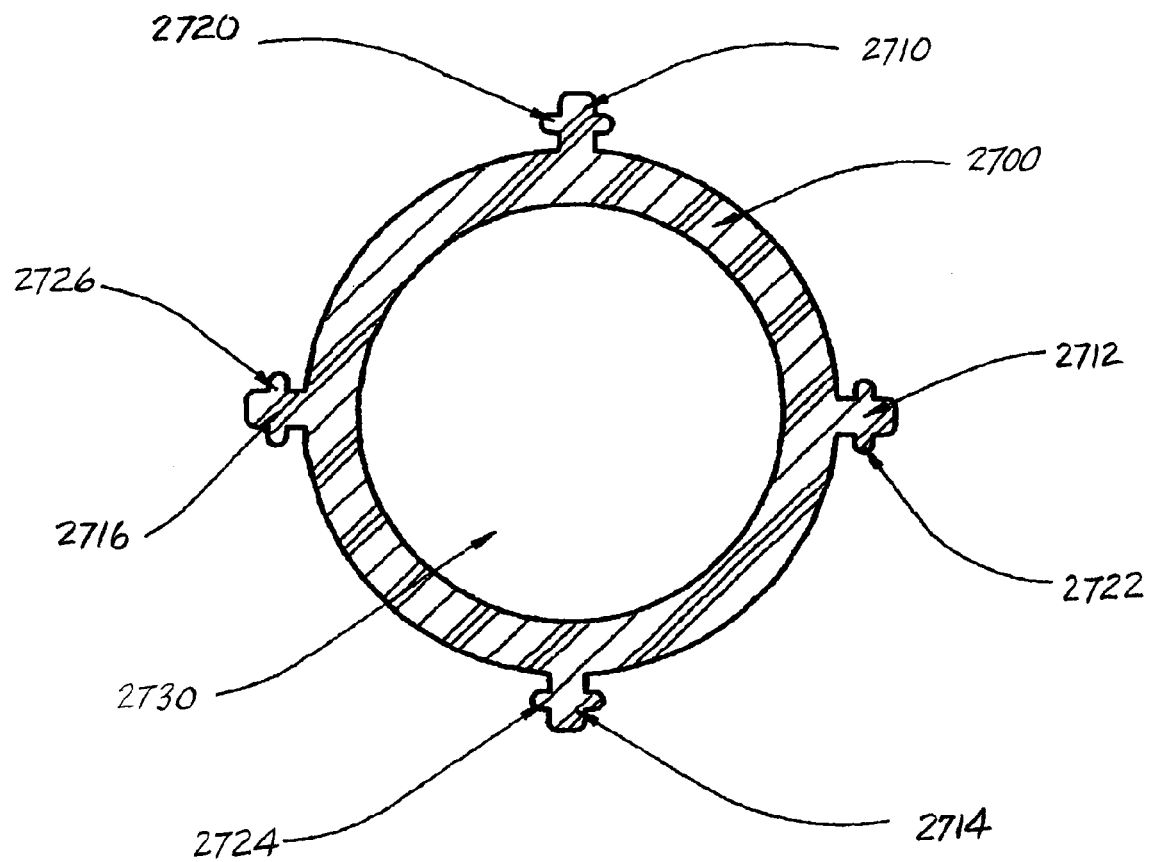
FIG. 27a is a cross-section view of another embodiment of the cable support-separator that includes a symmetrical core with a central circular ring region with four extending protrusions each protrusion extending less than those of FIGS. 24a through 25f and each with at least a single cross-like section extending outward from the circular ring section in a preferred 90 degree separation from each other for optimum pair separation. The central ring portion optionally includes a hollow region to act as an air blown fiber (ABF) duct which is available for filling with optical fiber which is comprised of solid, semi-solid, foamed or hollow polymeric smooth internal and external surfaces.

FIG. 27*a* is a cross-section view of another embodiment of the cable support-separator that includes a symmetrical core with a central circular ring region (2700) with four extending protrusions (2710, 2712, 2714, 2716) each protrusion extending less than those of FIGS. 24*a* through 25*f* and each with at least a single cross-like section (2720, 2722, 2724, 2726) extending outward from the circular ring section in a preferred 90 degree separation from each other for optimum pair separation. The central ring portion optionally includes a hollow region (2730) to act as an air blown fiber (ABF) duct which is available for filling with optical fiber which is comprised of solid, semi-solid, foamed or hollow polymeric smooth internal and external surfaces.

Figure 27B:
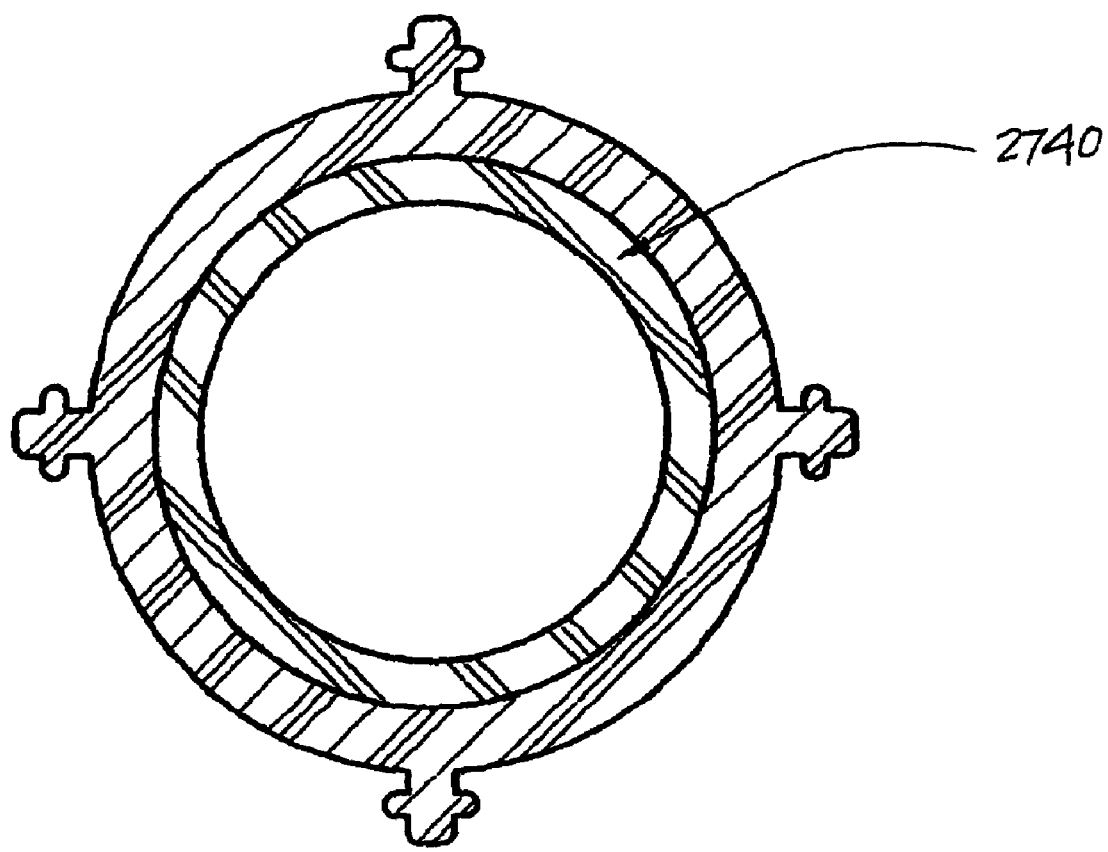
FIG. 27b is a cross-section view of another embodiment of the cable support-separator that includes a symmetrical core with a central circular ring region and each with at least a single cross-like section extending from the circular ring section, each protrusion extending less than those of FIGS. 24a through 25f, each again extending in a preferred 90 degree separation from each other for optimum pair separation and also includes a second inner ring within the hollow region comprised of a different material than the outer ring for either increasing lubricity or friction. The central ring portion optionally includes a hollow region to act as an air blown fiber (ABF) duct which is available for filling with optical fiber which is comprised of solid, semi-solid, foamed or hollow polymeric smooth internal and external surfaces.

FIG. 27*b* is a cross-section view of another embodiment of the cable support-separator that includes a symmetrical core with a central circular ring region and each with at least a single cross-like section extending from the circular ring section, each protrusion extending less than those of FIGS. 24*a* through 25*f*, each again extending in a preferred 90 degree separation from each other for optimum pair separation and also includes a second inner ring (2740) within the hollow region comprised of a different material than the outer ring for either increasing lubricity or friction. The central ring portion optionally includes a hollow region to act as an air blown fiber (ABF) duct which is available for filing with optical fiber which is comprised of solid, semi-solid, foamed or hollow polymeric smooth internal and external surfaces.

Figure 27C:
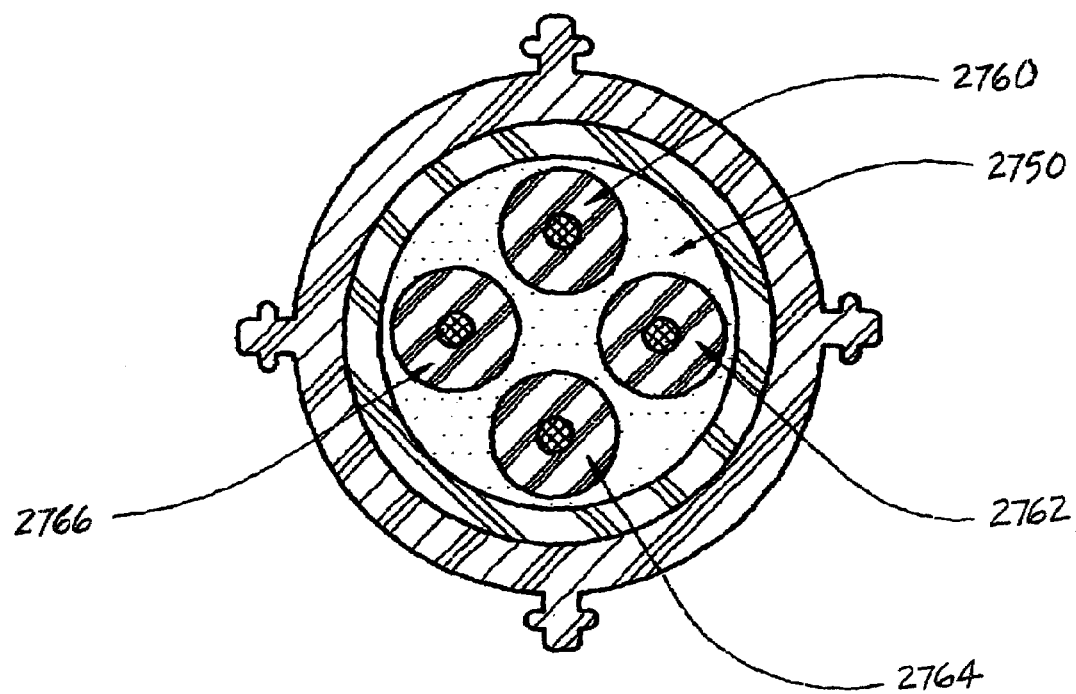
FIG. 27c is a cross-section view of another embodiment of the cable support-separator that includes a symmetrical core with a central circular ring region and each with at least a single cross-like section extending from the circular ring section, each protrusion extending less than those of FIGS. 24a through 25f, each again extending in a preferred 90 degree separation from each other for optimum pair separation and also includes a second inner ring within the hollow region comprised of a different material than the outer ring for either increasing lubricity or friction. The inner portion of the hollow ring region here is optionally filled with inorganic or organic fibers such as polyamide fiber (Kevlar®) and at least four single or multimode fiber optic units.

FIG. 27*c* is a cross-section view of another embodiment of the cable support-separator that includes a symmetrical core with a central circular ring region and each with at least a single cross-like section extending from the circular ring section, each protrusion extending less than those of FIGS. 24*a* through 25*f*, each again extending in a preferred 90 degree separation from each other for optimum pair separation and also includes a second inner ring within the hollow region comprised of a different material than the outer ring for either increasing lubricity or friction. The inner portion of the hollow ring region here is optionally filled with inorganic or organic fibers (2750) such as polyamide fiber (Kevlar®) and at least four single or multimode finer optic units (2760, 2762, 2764, and 2766).

Figure 27D:
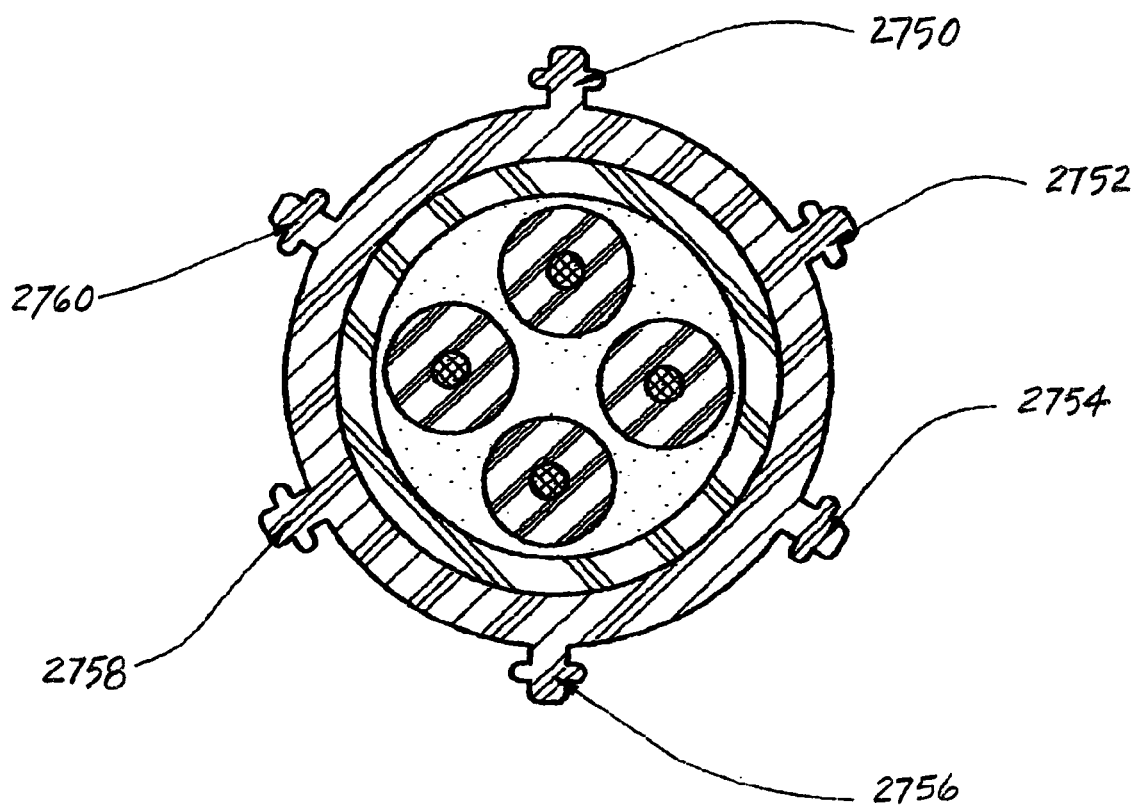
FIGS. 27d and 27e include a cross-section view of another embodiment of the cable support-separator that includes a symmetrical core with a central circular ring region with as few as two and as many as six extending protrusions each with at least a single cross-like section, each protrusion extending less than those in of FIGS. 24e through 25f, each again extending in a preferred separation from each other for optimum pair separation and also includes also includes an optional second inner ring within the hollow region comprised of a different material than the outer ring for increasing friction utilizing rifled inner spatially arranged sections. The central ring portion optionally includes a hollow region to act as an air blown fiber (ABF) duct which is available for filling with optical fiber which is comprised of solid, semi-solid, foamed or hollow polymeric smooth internal and external surfaces.
Figure 27E:
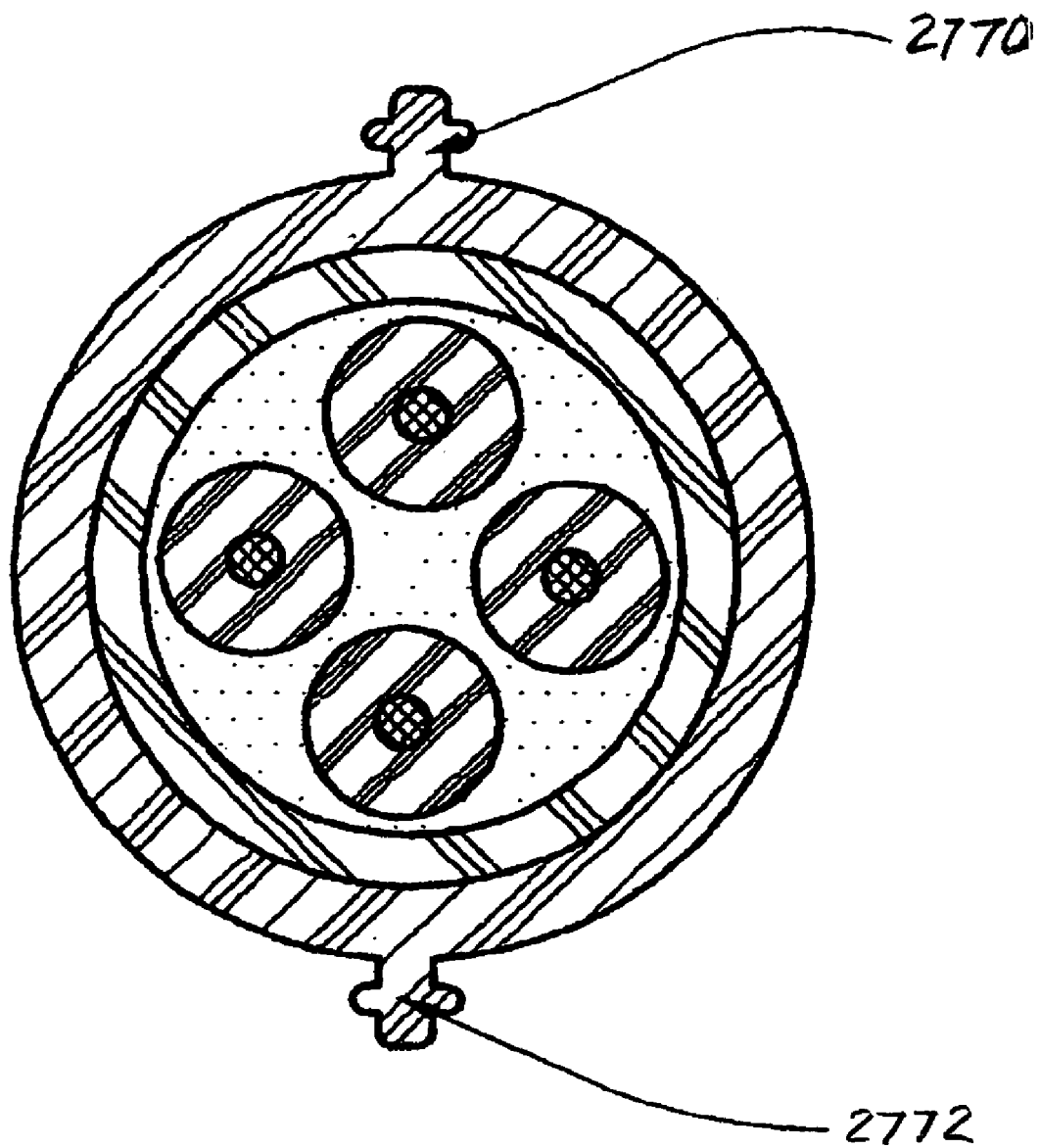

FIGS. 27*d* and 27*e* include a cross-section view of another embodiment of the cable support-separator that includes a symmetrical core with a central circular ring region with as few as two (2770 and 2772 in FIG. 27*e*) and as many as six (2750, 2752, 2754, 2756, 2758, and 2760 in FIG. 27*d*) extending protrusions each with at least a single cross-like section, each protrusion extending less than those of FIGS. 24*a* through 25*f*, each again extending in a preferred separation from each other for optimum pair separation and also includes an optional second inner ring within the hollow region comprised of a different material than the outer ring for increasing friction utilizing rifled inner spatially arranged sections. The central ring portion optionally includes a hollow region to act as an air blown fiber (ABF) duct which is available for filing with optical fiber which is comprised of solid, semi-solid, foamed or hollow polymeric smoother internal and external surfaces.

Figure 27F:
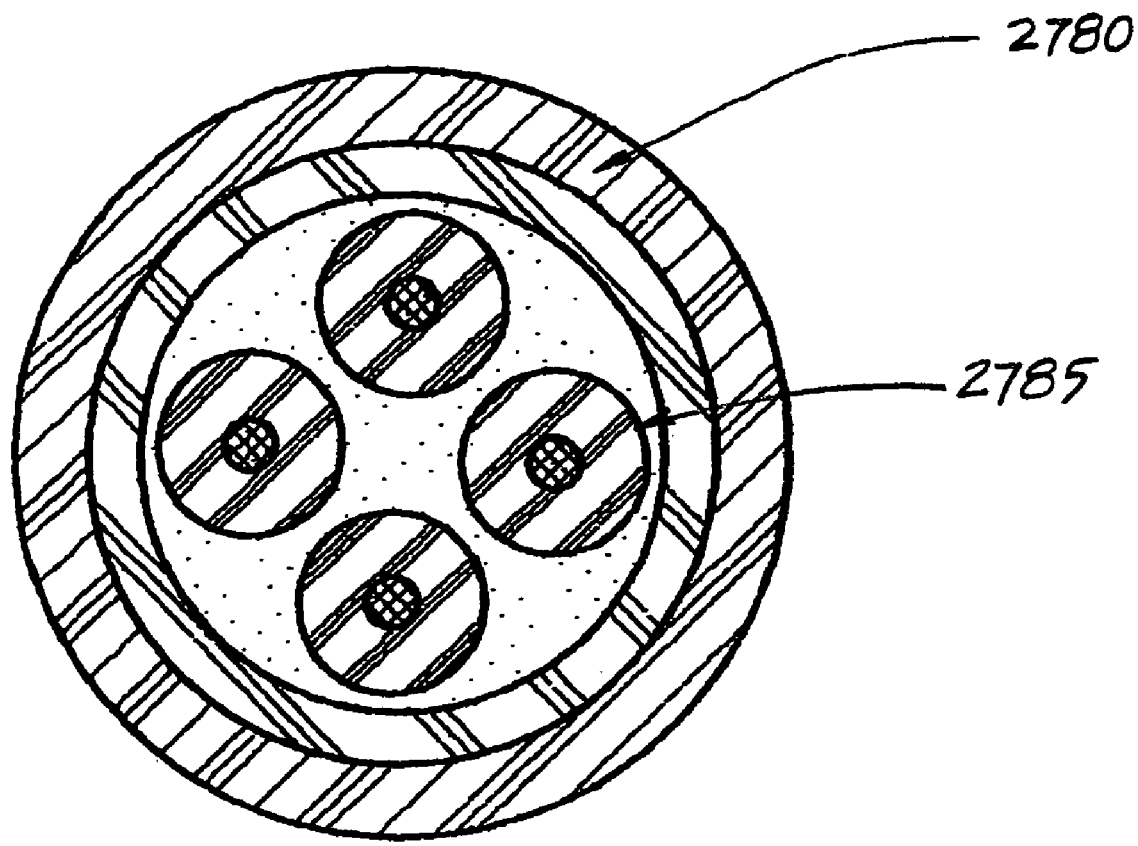
FIG. 27f includes a cross-section view of another embodiment of the cable support-separator includes a symmetrical core with a central circular ring region with no extending protrusions that includes also an optional second inner ring within the hollow region comprised of a different material than the outer ring for increasing friction utilizing rifled inner spatially arranged sections. The central ring portion optionally includes a hollow region to act as an air blown fiber (ABF) duct which is available for filling with optical fiber which is comprised of solid, semi-solid, foamed or hollow polymeric smooth internal and external surfaces.

FIG. 27*f* includes a cross-section view of another embodiment of the cable support-separator includes a symmetrical core with a central circular ring region with no extending protrusions (2780) that includes also an optional second inner ring which is smoother within the hollow region comprised of a different material than the outer ring for increasing friction as well as allowing for multiple separate multimode or single mode fiber optic units (2785) also contained within the same hollow region. The central ring portion optionally includes a hollow region to act as an air blown fiber (ABF) duct which is available for filling with optical fiber which is comprised of solid, semi-solid, foamed or hollow polymeric smooth internal and external surfaces.

FIG. 28*a* is a cross section view of another embodiment of the cable support-separator that includes a hollow four-petal (2810, 2812, 2814, and 2816) or "daisy" shaped arrangement with a central core (2800) that may or may not be hollow (2820 shown hollow). If the central region is hollow, the possibility again exists for that region to act as an air blown fiber (ABF) duct which is available for filling with optical fiber. Coaxial or twisted pair conductors may also be introduced in that region.

Figure 28B:
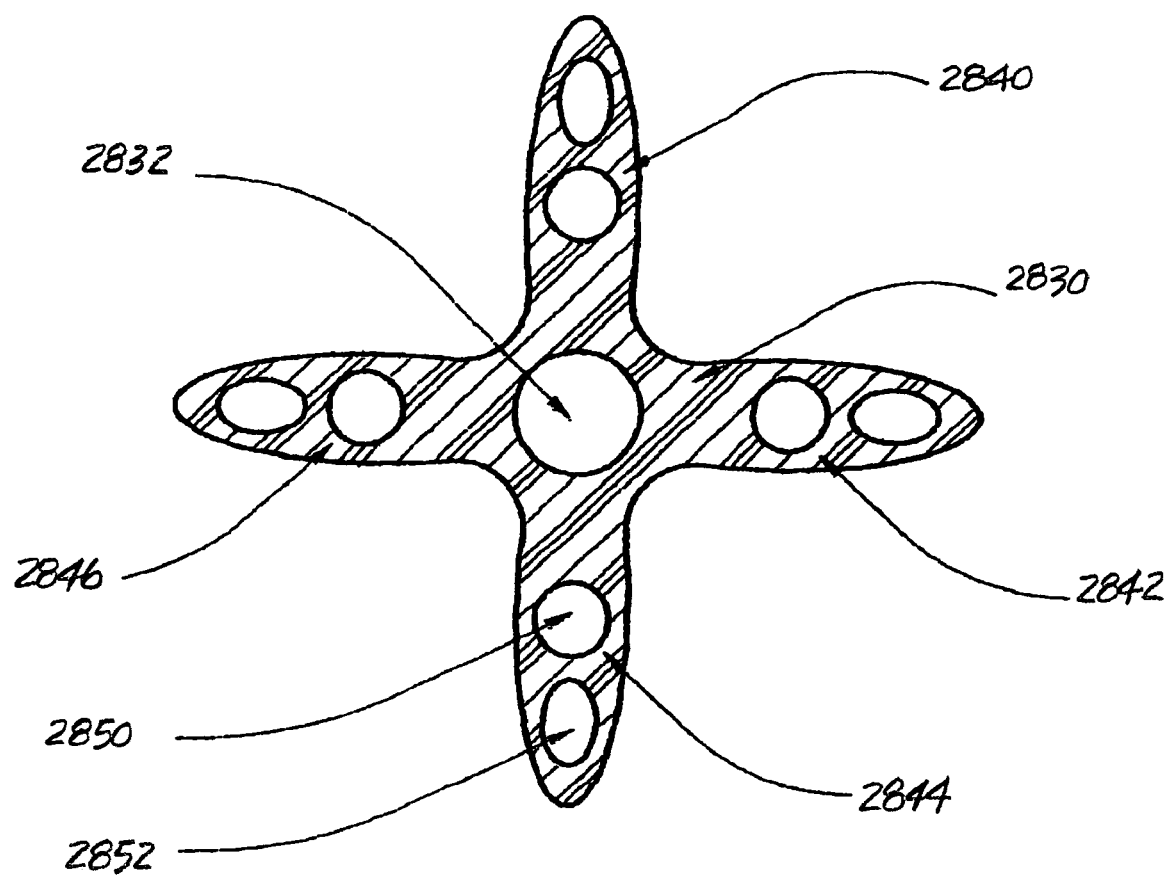
FIG. 28b is a cross-section view of another embodiment of the cable support-separator that includes a solid four-petal or "daisy" shaped arrangement with a central core that may or may not be hollow. Each "petal" contains two hollow sections for additional optical or metallic conductor media. The central region is hollow allowing for the possibility that this region may act as an air blown fiber (ABF) duct which is available for filling with optical fiber. Coaxial or twisted pair conductors may also be introduced in that region.

FIG. 28*b* is a cross-section view of another embodiment of the cable support-separator that includes a solid four-petal (2840, 242, 2844, and 2486) or "daisy" shaped arrangement with a central core (2830) that may or may not be hollow (2832 shown hollow). Each "petal" contains two hollow sections (2850 and 2852) for additional optical or metallic conductor media. The central region (2832) is hollow allowing for the possibility that this region may act as an air blown fiber (ABF) duct which is available for filing with optical fiber. Coaxial or twisted pair conductors may also be introduced in that region.

Figure 28C:
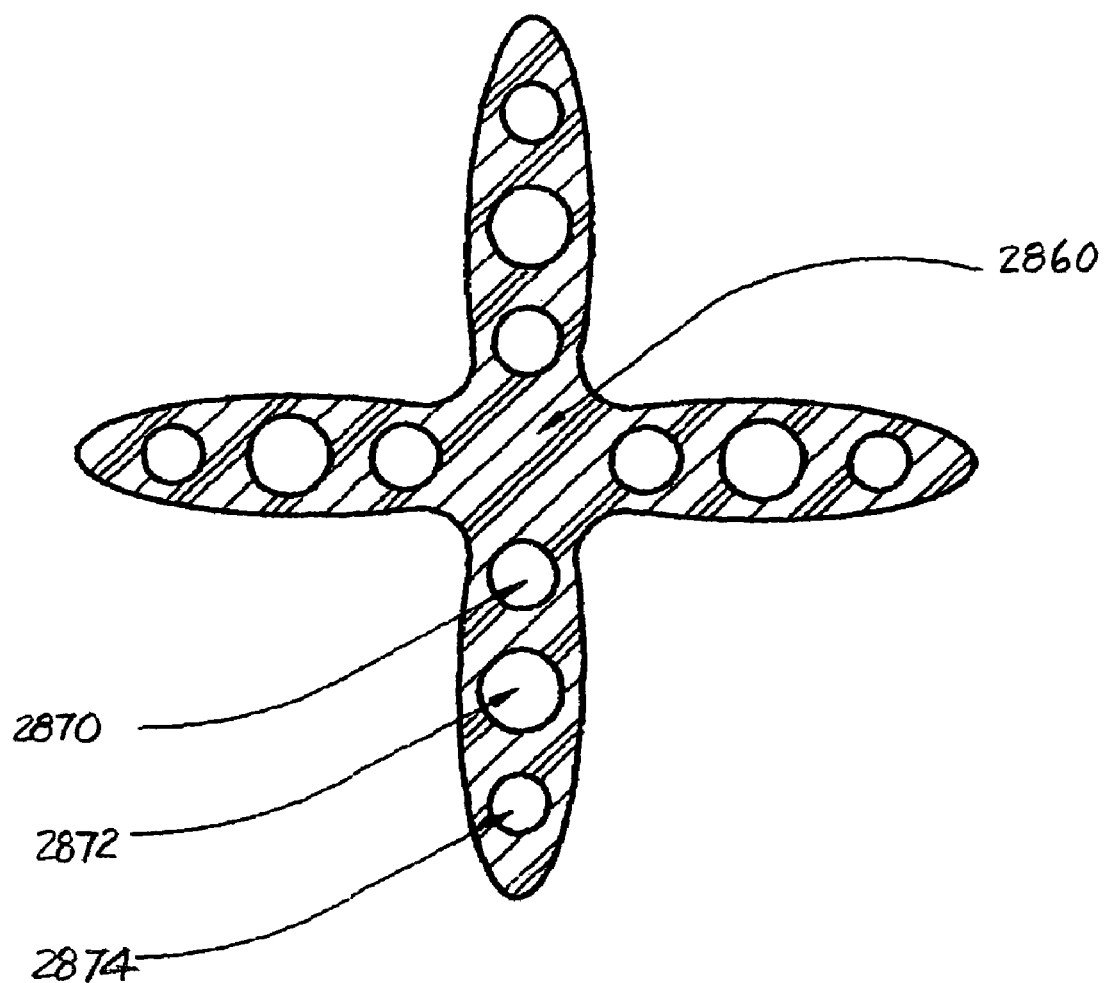
FIG. 28c is a cross-section view of another embodiment of the cable support-separator that includes a solid four-petal or "daisy" shaped arrangement with a central core that may or may not be hollow. Each "petal" contains three hollow sections of differing diameters for additional optical or metallic conductor media. The central region is solid.

FIG. 28*c* is a cross-section view of another embodiment of the cable support-separator that includes a solid four-petal or "daisy" shaped arrangement with a central core (2860) that may or may not be hollow. Each "petal" contains three hollow sections (2870, 2872, 2874) of differing diameters for additional optical or metallic conductor media. The central region (2860) is solid.

Figure 28D:
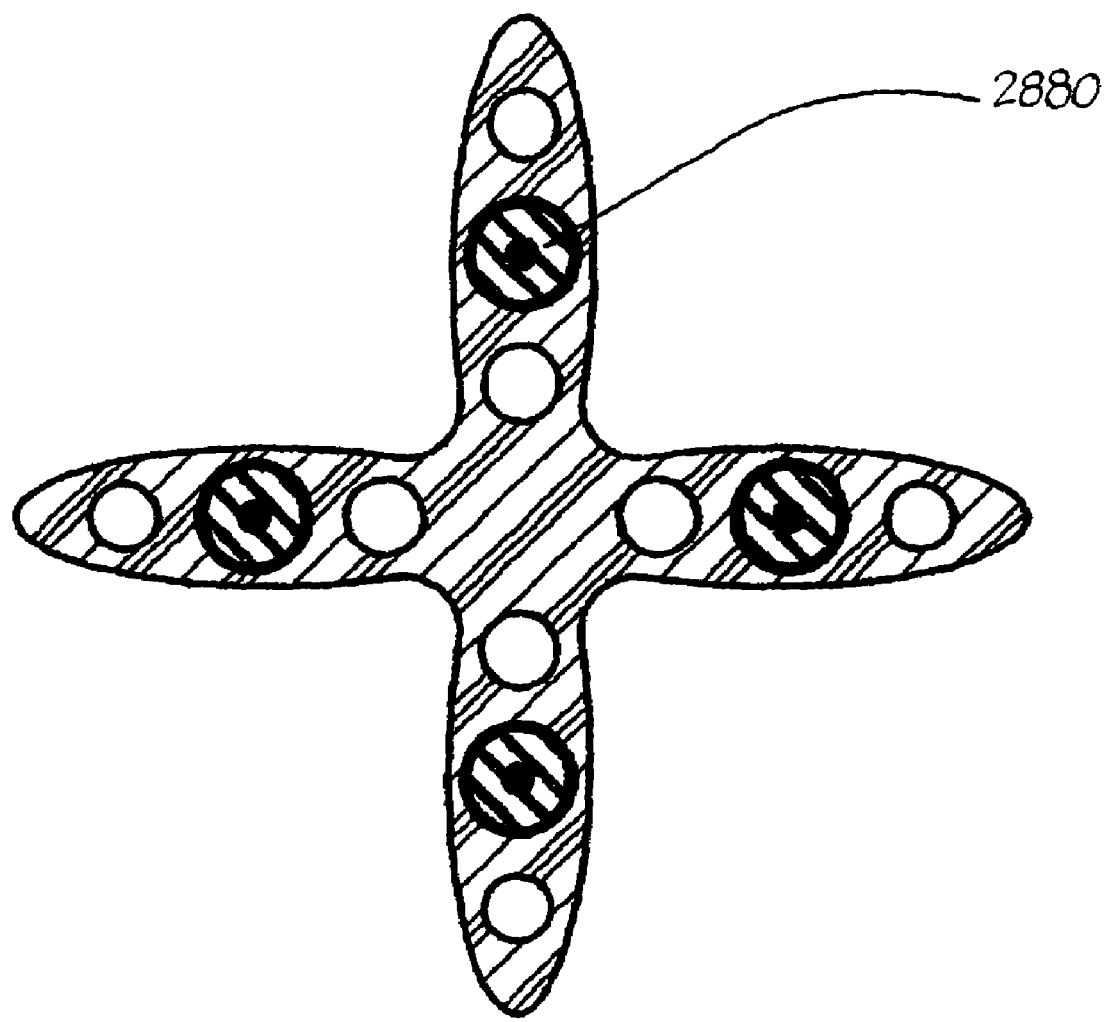
FIG. 28d is a cross-section view of another embodiment of the cable support-separator that includes a solid four-petal or "daisy" shaped arrangement with a central core that may or may not be hollow. Each "petal" contains three hollow sections of differing diameters for additional optical or metallic conductor media. In this case, the center hollow section of each petal is filled with an optical fiber unit. The central region is solid or optionally hollow.

FIG. 28*d* is a cross-section view of another embodiment of the cable support-separator that includes a solid four-petal or "daisy" shaped arrangement with a central core that mayor not be hollow. Each "petal" contains three hollow sections of differeing diameters for additional optical or metallic conductor media. In this case, the center hollow section of each petal is filled with an optical fiber unit (2880). The central region is solid or optionally hollow.

Figure 28E:
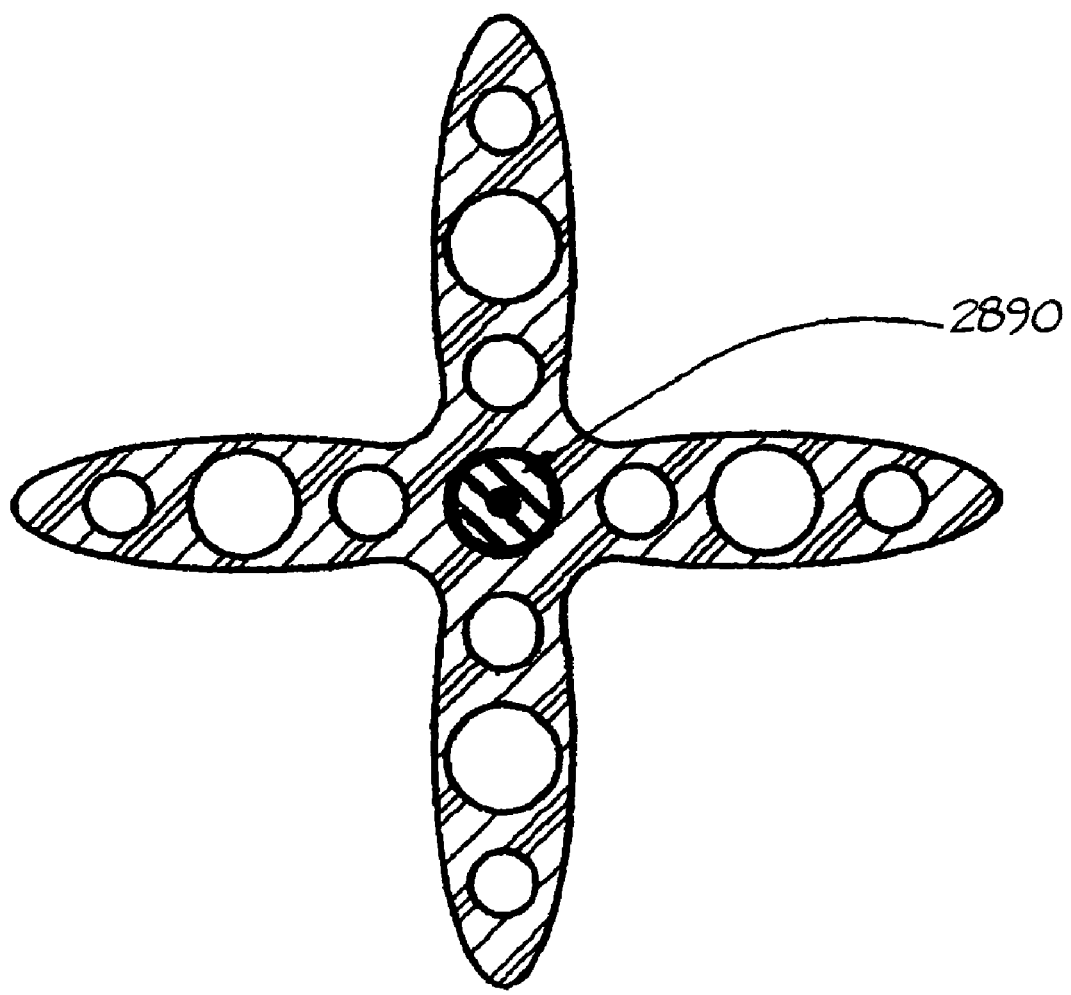
FIG. 28e is a cross-section view of another embodiment of the cable support-separator that includes a solid four-petal or "daisy" shaped arrangement with a central core that may or may not be hollow. In this case, the center hollow section is filled with an optical fiber unit.

FIG. 28*e* is a cross-section view of another embodiment of the cable support-separator that includes a solid four-petal or "daisy" shaped arrangement with a central core that mayor may not be hollow. Each "petal" contains three hollow sections of differeing diameters for additional optical or metallic conductor media. In this case, the center hollow section of the daisy is filled with an optical fiber unit (2890). The central region is solid or optionally hollow.

Figure 29A:
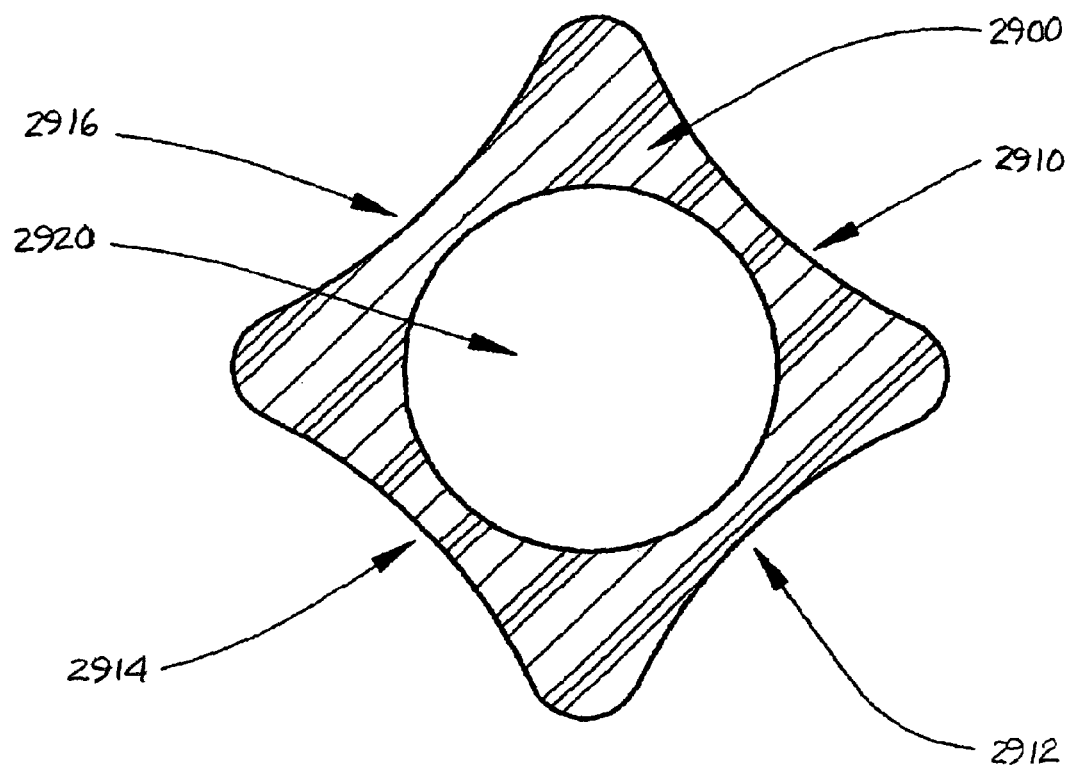
FIGS. 29a, 29b, 29c are cross-sectional views of another set of embodiments of the cable support-separator that includes a circular ring region which is surrounded by rounded lobes in a symmetric diamond-like geometry that defines as many as four separate regions for pairs that are properly separated in the final (often jacketed) cable design. Against the central ring portion can optionally include a hollow region that may be used as an air blown fiber (ABF) duct which is available for filling with optical fiber which is comprised of solid, semi-solid, foamed or hollow polymeric smoother internal and external surfaces.
Figure 29B:
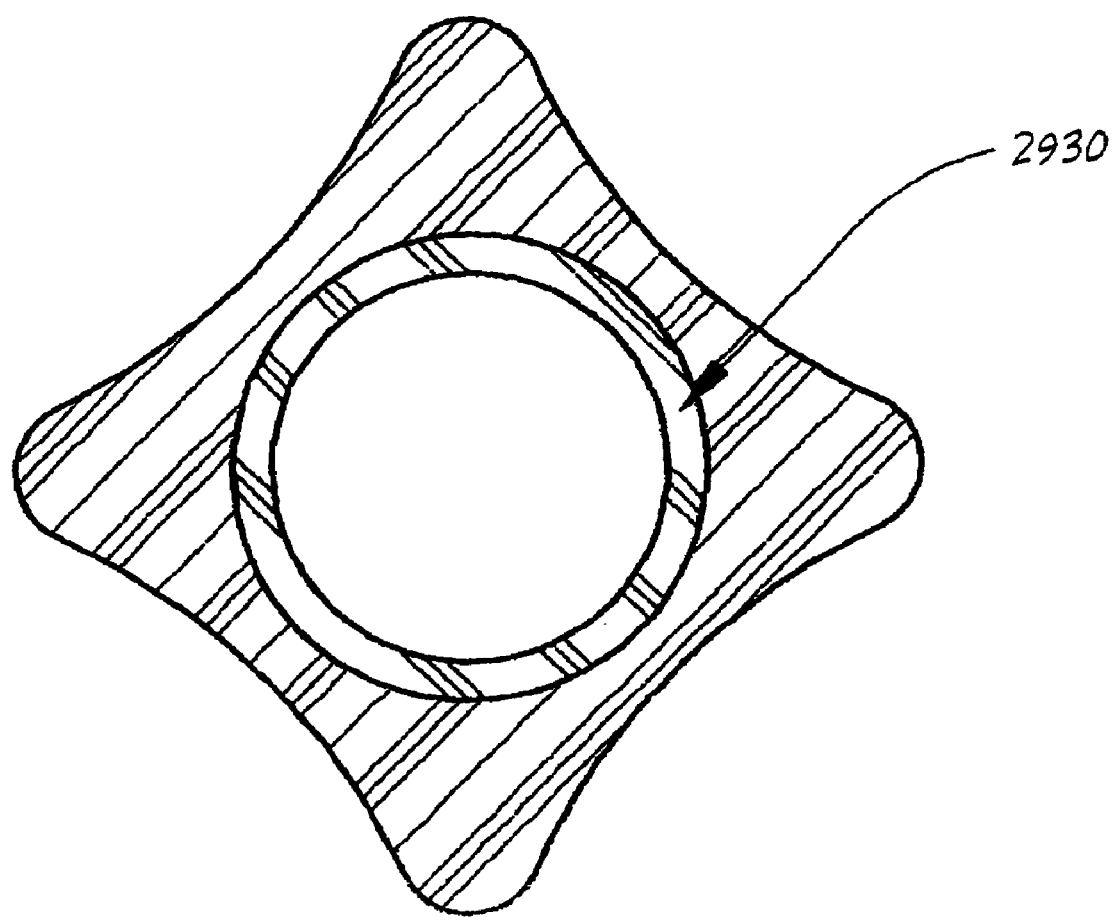
Figure 29C:
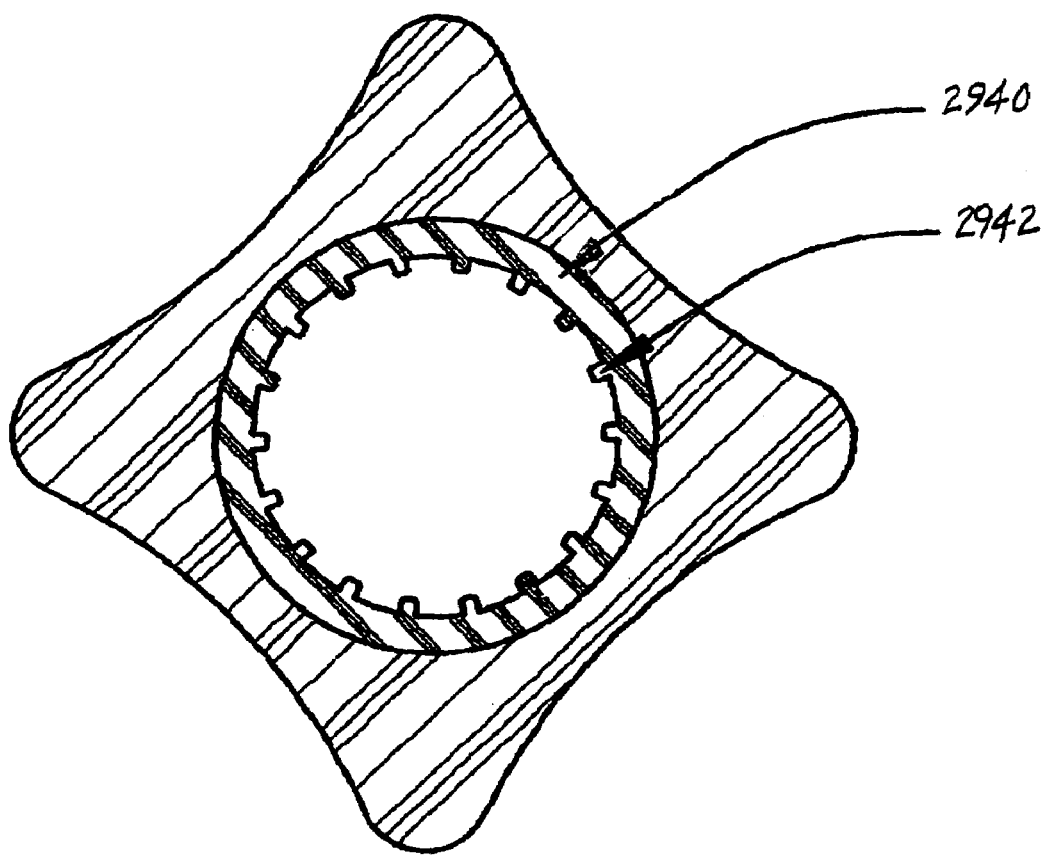

FIGS. 29*a*, 29*b*, 29*c* are cross-sectional views of another set of embodiments of the cable support-separator that includes a circular ring region (2900) which is surrounded by rounded lobes (2910, 2912, 2914, 2916) in a symmetric diamond-like geometry that defines as many as four separate regions for pairs that are properly separated in the final (often jacketed) cable design. Again the central ring portion can optionally include a hollow region (2920) that may be used as an air blown fiber (ABF) duct which is available for filling with optical fiber which is comprised of solid, semi-solid, foamed or hollow polymeric smooth internal and external surfaces. FIG. 29*a* has no inner ring. FIG. 29*b* has a smooth inner ring (2930) with optionally different material than the outer ring, and FIG. 29*c* has an inner ring (2940) with rifled sections (2942). Each can optionally be used for coax or twisted pair as well as for fiber optic conductors in advance, during, or after installation.

Figure 29D:
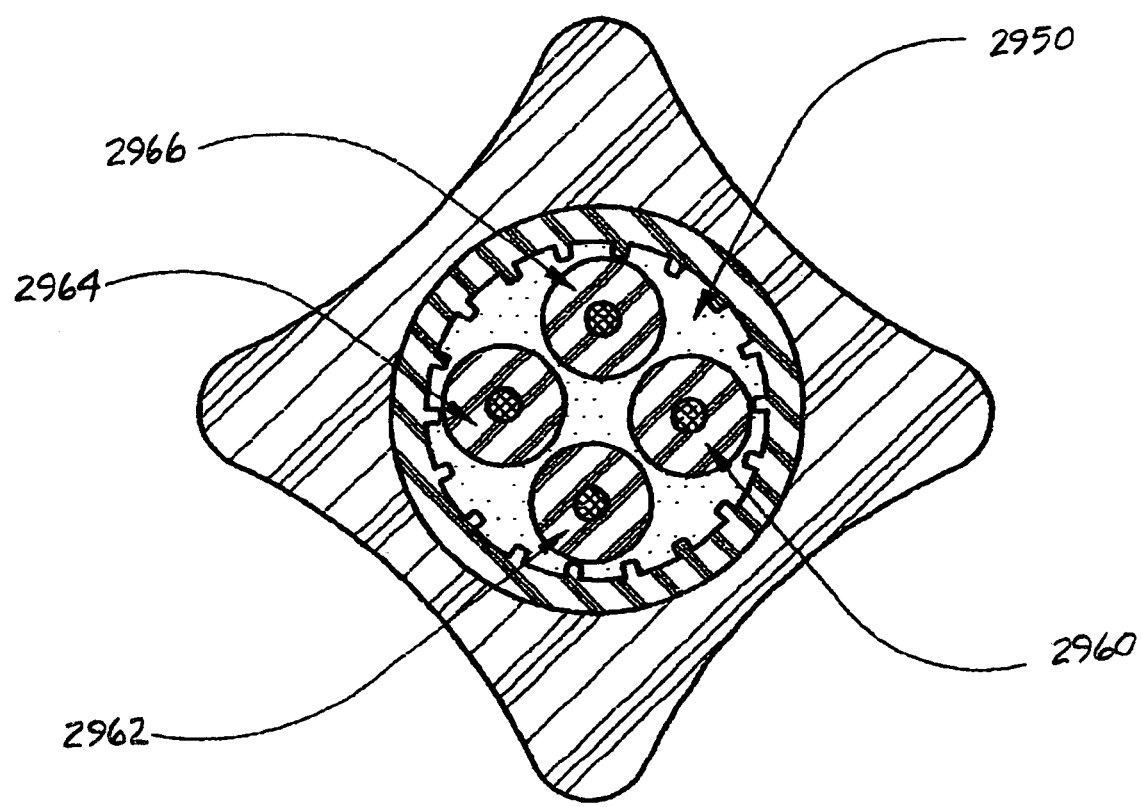
FIG. 29d is a cross-sectional view of another embodiment of the cable support-separator that includes a circular ring region which is surrounded by rounded lobes in a symmetric diamond-like geometry that defines as many as four separate regions for pairs that are properly separated in the final (often jacketed) cable design. This design includes the optional addition of one or more conductors including optionally organic or inorganic fibers such as a polyamide (for example Kevlar®) filling and an optional strength member within the second inner ring (that may or may not be rifled). Again the central ring portion can optionally include a hollow region that may be used as an air blown fiber (ABF) duct which is available for filling with optical fiber which is comprised of solid, semi-solid, foamed or hollow polymeric smooth internal and external surfaces.
Figure 29E:
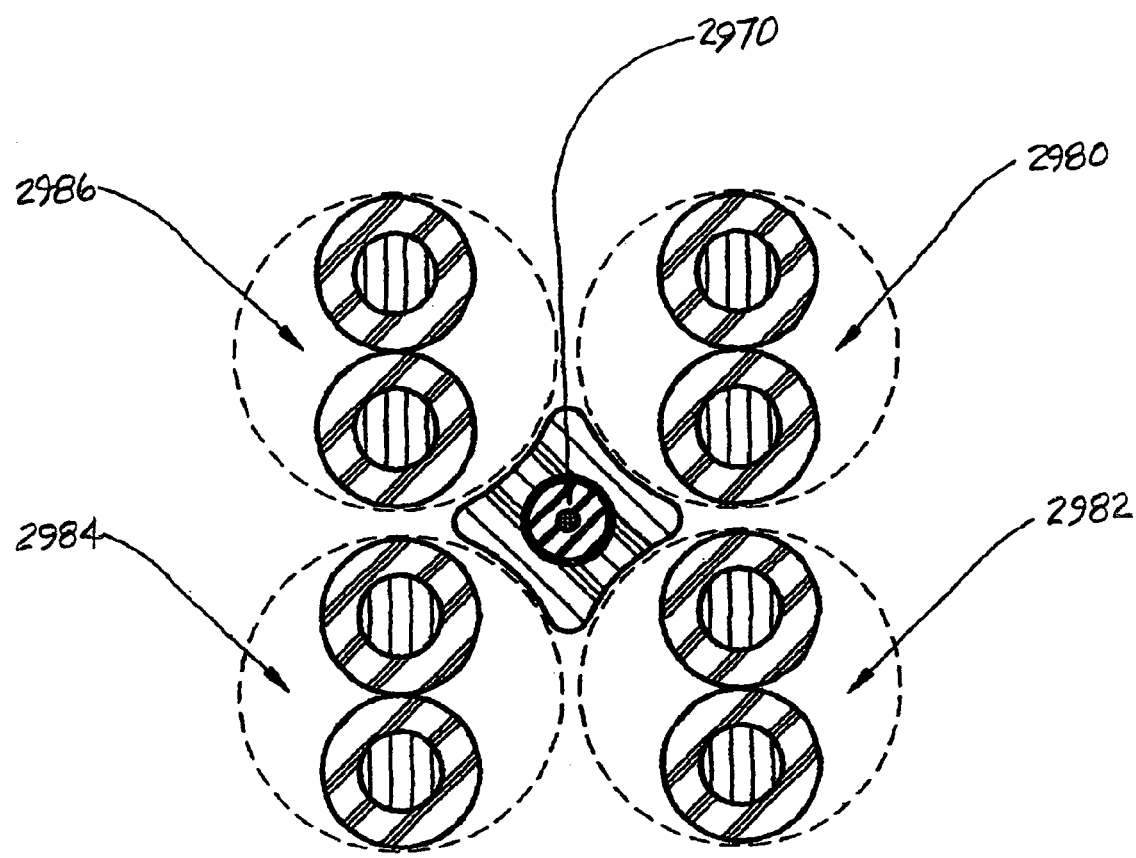
FIG. 29e is a cross-sectional view of another embodiment of the cable support-separator that includes a circular ring region which is surrounded by rounded lobes in a symmetric diamond-like geometry that defines as many as four separate regions for pairs that are properly separated in the final (often jacketed) cable design. This design includes a center portion filled with a fiber optic unit as well as four separated conductor pairs in each of the regions defined by the symmetric diamond-like geometry of the cable support-separator. Again the central ring portion can optionally include a hollow region that may be used as an air blown fiber (ABF) duct which is available for filling with optical fiber which is comprised of solid, semi-solid, foamed or hollow polymeric smooth internal and external surfaces.

FIG. 29*d* is a cross-sectional view of another embodiment of the cable support-separator that includes a circular ring region which is surrounded by rounded lobes in a symmetric diamond-like geometry that defines as many as four separate regions for pairs that are properly separated in the final (often jacketed) cable design. This design includes the optional addition of one or more conductors including optionally organic or inorganic fibers such as polyamide (for example Kevlar®) filling and an optional strength member (2950) within the second inner ring (that may or may not be rifled). Again the central ring portion can optionally include a hollow region that may be used as an air blown fiber (ABF) duct which is available for filling with optical fiber (2960, 2962, 2964, 2966) which is comprised of solid, semi-solid, foamed or hollow polymeric smooth internal and external surfaces.

FIG. 29*e* is a cross-sectional view of another embodiment of the cable support-separator that includes a circular ring region which is surrounded by rounded lobes in a symmetric diamond-like geometry that defines as many as four separate regions for pairs that are properly separated in the final (often jacketed) cable design. This design includes a center portion filled with a fiber optic unit (2970) as well as four separated conductor pairs (2980, 2982, 2984, 2986) in each of the regions defined by the symmetric diamond-like geometry of the cable support-separator. Again the central ring portion can optionally include a hollow region that may be used as an air blown fiber (ABF) duct which is available for filling with optical fiber which is comprised of solid, semi-solid, foamed or hollow polymeric smooth internal and external surfaces.

Figure 29F:
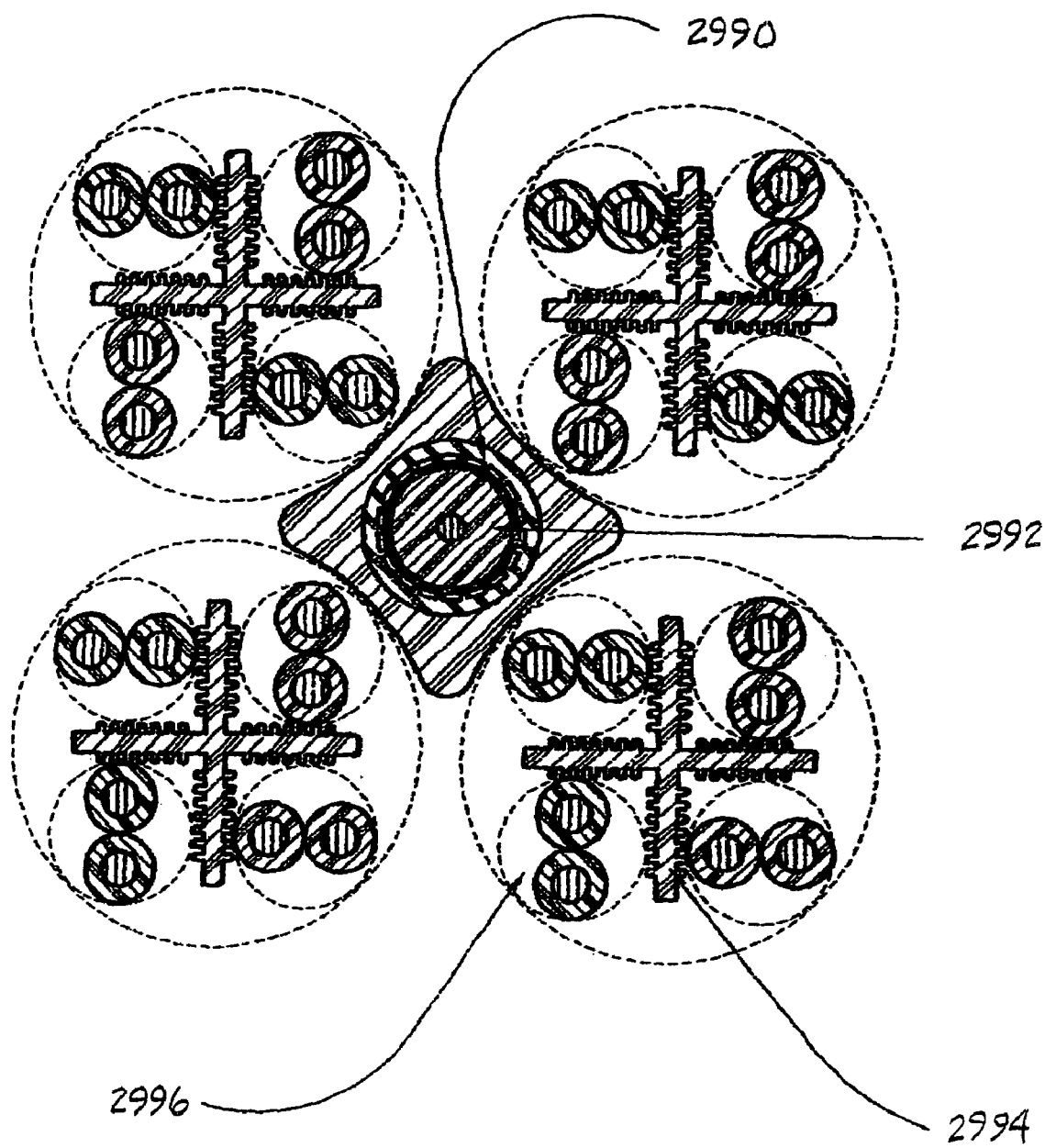
FIG. 29f is a cross-sectional view of another embodiment of the cable support-separator that includes a circular ring region which is surrounded by rounded lobes in a symmetric diamond-like geometry that defines as many as four separate regions for pairs that are properly separated in the final (often jacketed) cable design. This design includes a center portion with a second inner ring portion filled with a fiber optic unit or other conductors as well as four cross-like separators (see FIG. 30a) in each of the regions defined by the symmetric diamond-like geometry of the cable support-separator within which another, up to four pairs of conductors are situated and separated by the cross-like separator. Again the central ring portion can optionally include a hollow region that may be used as an air blown fiber (ABF) duct which is available for filling with optical fiber which is comprised of solid, semi-solid, foamed or hollow polymeric smooth internal and external surfaces.

FIG. 29*f* is a cross-sectional view of another embodiment of the cable support-separator that includes a circular ring region which is surrounded by rounded lobes in a symmetric diamond-like geometry that defines as many as four separate regions for pairs that are properly separated in the final (often jacketed) cable design. This design includes a center portion with a second inner ring portion (2990) filled with a fiber optic unit (2992) or other conductors as well as four cross-like separators (2994) (see FIG. 18) in each of the regions defined by the symmetric diamond-like geometry of the cable support-separator within which another, up to four pairs of conductors (2996) are situated and separated by the cross-like separator. Again the central ring portion can optionally include a hollow region that may be used as an air blown fiber (ABF) duct which is available for filling with optical fiber which is comprised of solid, semi-solid, foamed or hollow polymeric smooth internal and external surfaces.

Figure 30A:
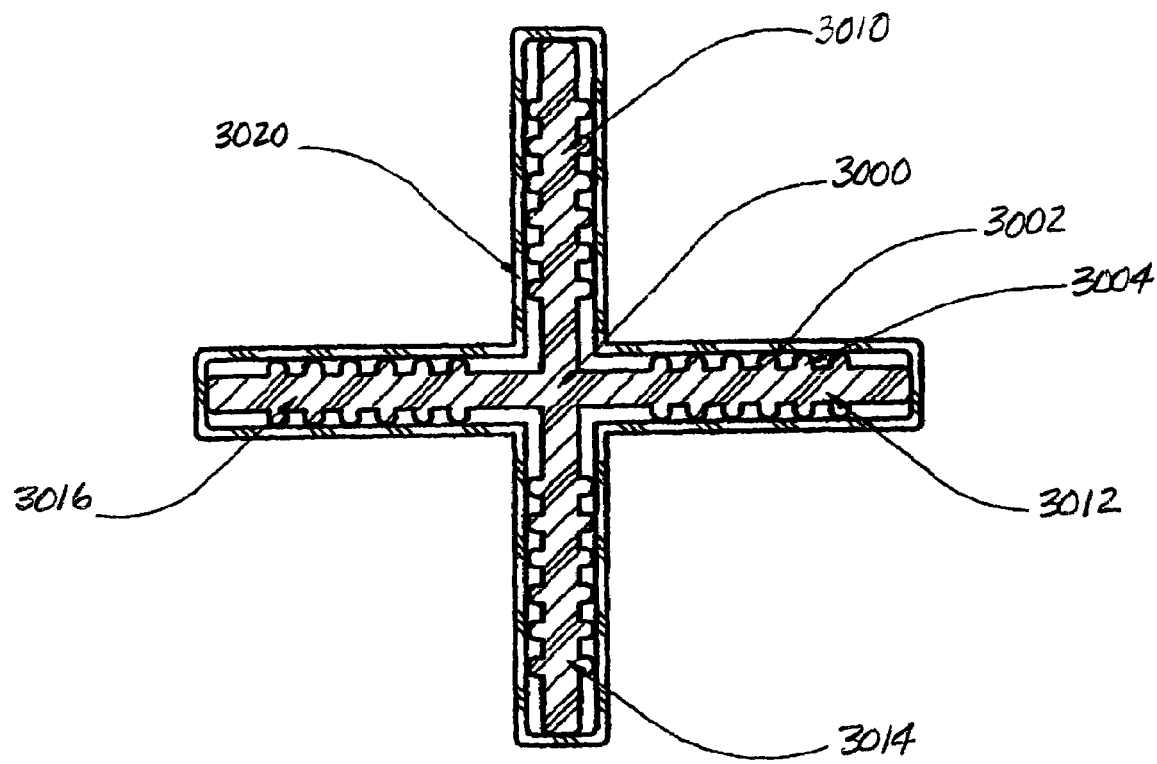
FIG. 30a is a cross-section view of another embodiment of the cable support-separator that includes a more conventional cross-like separator section with "rifled" sections extending outward into four quadrants away from the central region and is encased or covered within an outer insulated layer which is itself shaped in an identical cross except that the dimensions of this outer cross is larger than the rifled inner cross and functions as a "skin". The inner cross-like portion may be metallized by utilizing electroless or electrolytic plating techniques over a thermoplastic.

FIG. 30a is a cross-section view of another embodiment of the cable support-separator that includes a more conventional cross-like separator section (3000) with "rifled" sections (3002 and 3004, for example) extending outward into four quadrants (3010, 3012, 3014, 3016) away from the central region (3000) and is encased or covered within an outer insulated layer (3020) which is itself shaped in an identical cross except that the dimensions of this outer cross is larger than the rifled inner cross and functions as a "skin". The inner cross-like portion may be metallized by utilizing electroless or electrolytic plating techniques over a thermoplastic film.

Figure 30B:
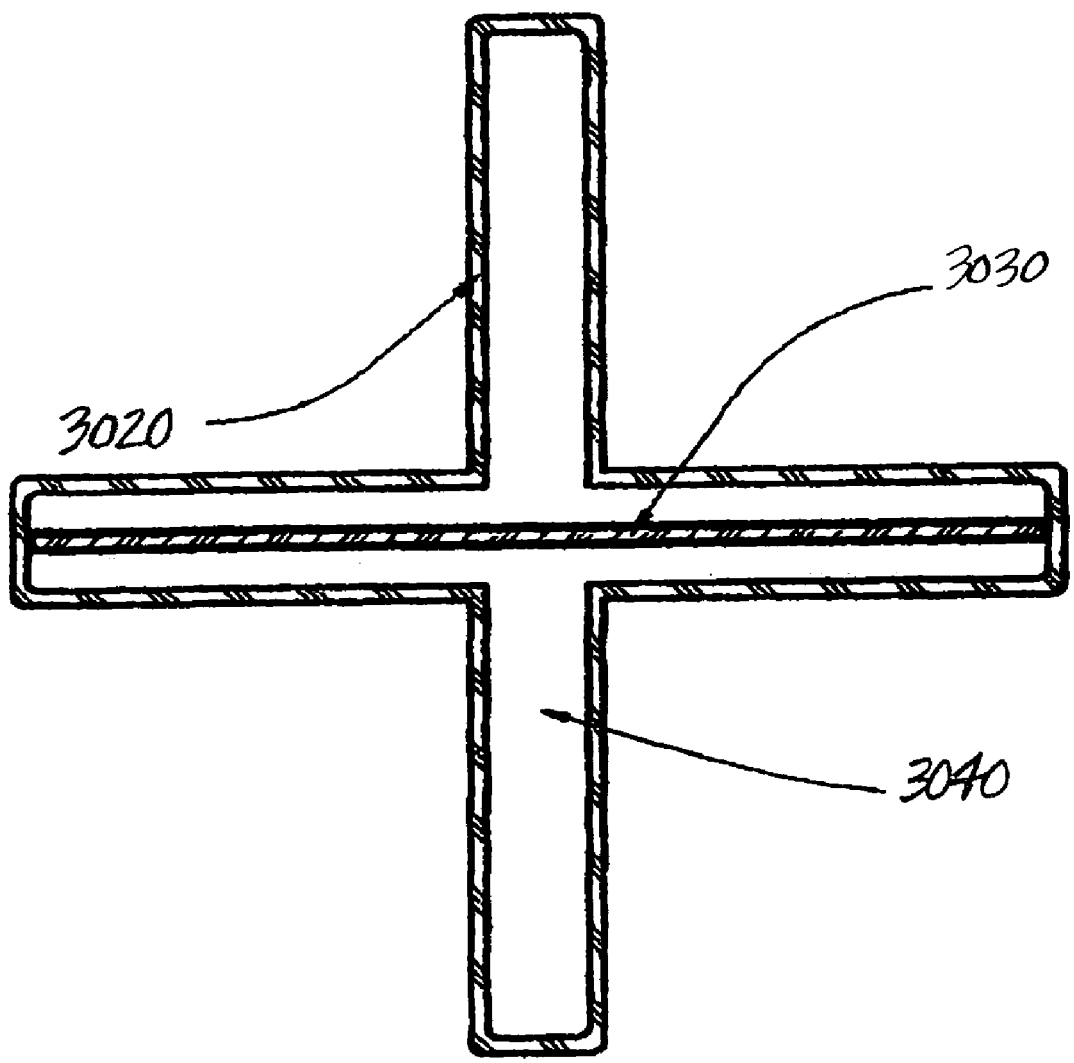
FIG. 30b is a cross-section view of another embodiment of the cable support-separator that includes the same more conventional cross-like separator section as with FIG. 30a except that this separator contains a shield that extends along the horizontal axis and optionally also along the vertical axis or both axes within the horizontal hollow portion of the cross-like separator. This shield is comprised of aluminum PET film and may be configured so that it is held within the outer cross-like separator. The design also allows for shielding exterior to the separator under a jacketed cable containing the separator.

FIG. 30b is a cross-section view of another embodiment of the cable support-separator that includes the same more conventional cross-like separator section as with FIG. 30a except that this separator contains a shield (3030) that extends along the horizontal axis and optionally also along the vertical axis or both axes within the horizontal hollow portion (3040) of the cross-like separator. This shield is comprised of aluminum PET film and may be configured so that it is held within the outer cross-like separator (3020) and may also be part of an overall shielded cable which is shielded using aluminum backed PET film or a braided metallic shield or any combination.

Figure 31A:
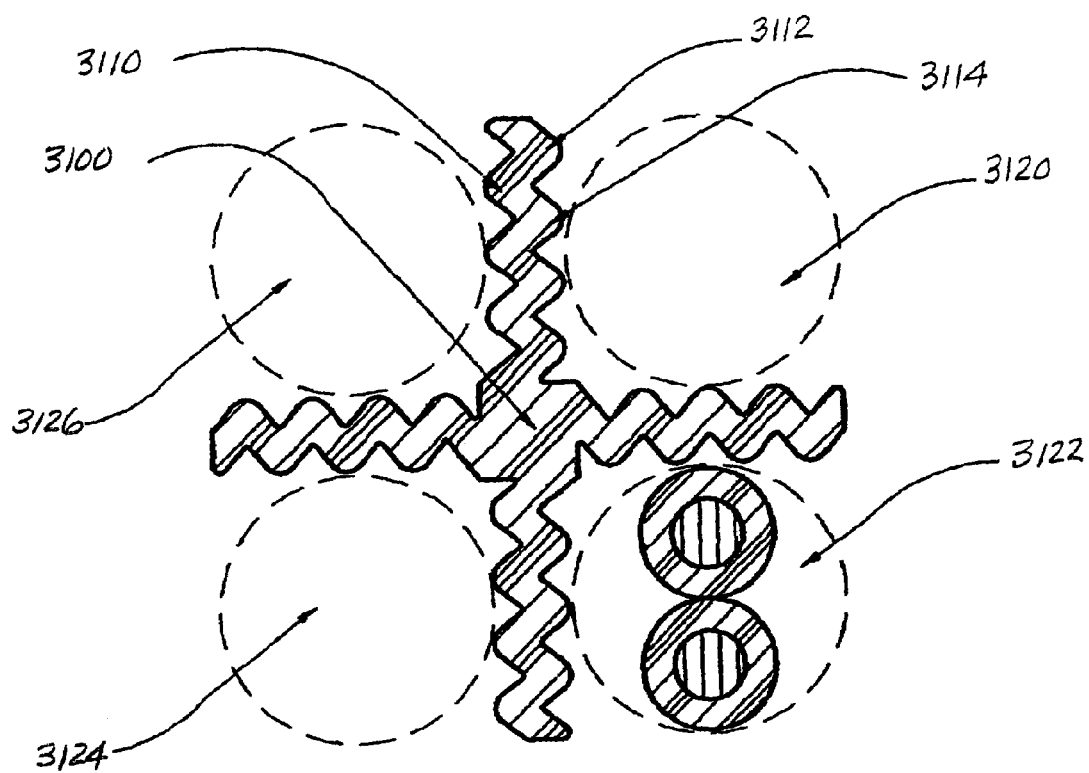
FIG. 31a is a cross-section view of another embodiment of the cable support-separator that includes providing variations on a cross-like arrangement by adding "zig-zag" extensions that extend away from the central region. Again the cross-like "zig-zag" arrangement may be covered within an outer insulated layer which is itself shaped in an identical cross except that the dimensions of this outer cross are larger than the rifled inner cross and functions as a "skin".

FIG. 31a is a cross-section view of another embodiment of the cable support-separator that includes providing variations on a cross-like arrangement by adding "zig-zag" extensions (3110, 3112, 3114, for example) that extend away from the central region (3100). Again the cross-like "zig-zag" arrangement may be covered within an outer insulated layer which is itself shaped in an identical cross except that the dimensions of this outer cross are larger than the rifled inner cross and functions as a "skin". This design optionally includes four separated conductor pairs (3120, 3122, 3124, 3126) in each of the regions defined by the symmetric diamond-like geometry of the cable support-separator.

Figure 31B:
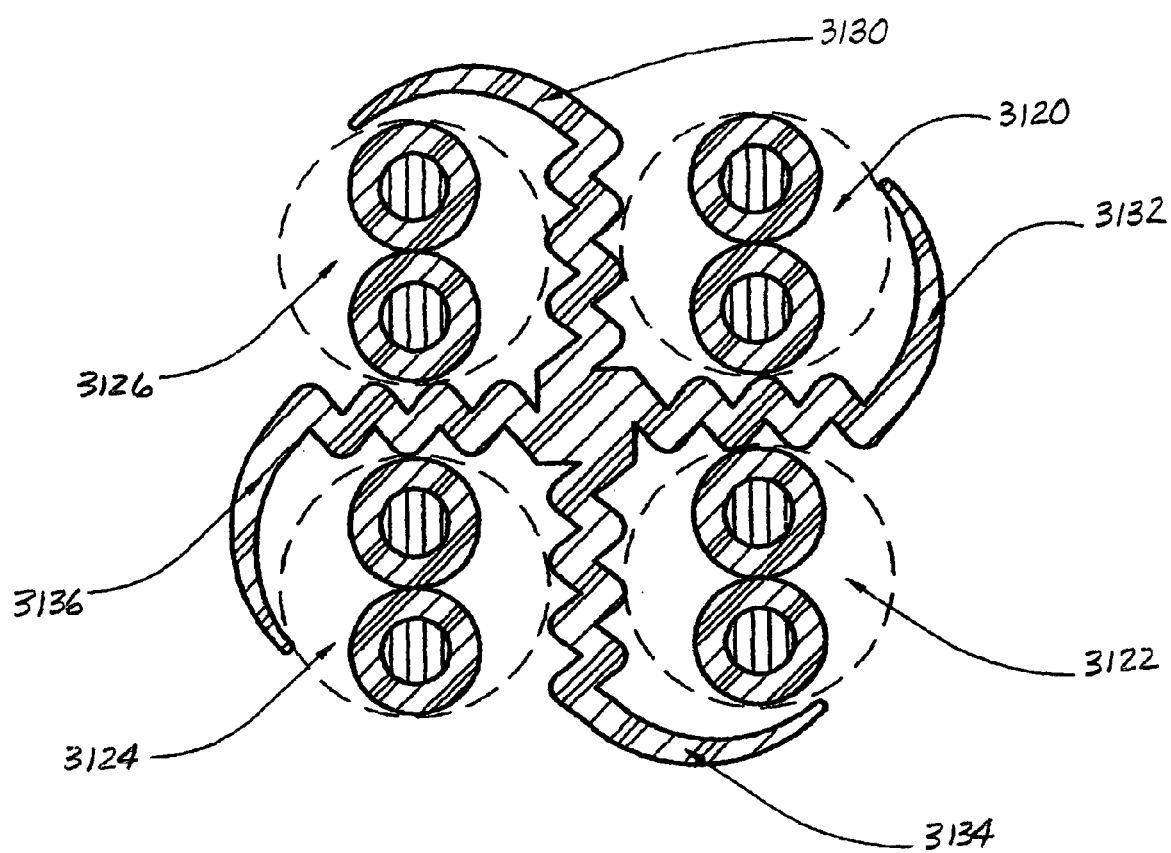
FIG. 31b is a cross-section view of another embodiment of the cable support-separator that includes providing variations on a cross-like arrangement by adding "sickle-like" extensions that extend away from the central region. Again the cross-like and sickle-like arrangement may be covered within an outer insulated layer which is itself shaped in an identical cross except that the dimensions of this outer cross are larger than the rifled inner cross and functions as a "skin".

FIG. 31b is a cross-section view of another embodiment of the cable support-separator that includes providing variations on a cross-like arrangement by adding "sickle-like" extensions (3130, 3132, 3134, 3136) that extend away from the central region. Again the cross-like and sickle-like sections arrangement may be covered within an outer insulated layer which is itself shaped in an identical cross except that the dimensions of this outer cross are larger than the rifled inner cross and functions as a "skin". This design optionally includes four separated conductor pairs (3120, 3122, 3124, 3126) in each of the regions defined by the symmetric diamond-like geometry of the cable support-separator.

Figure 32:
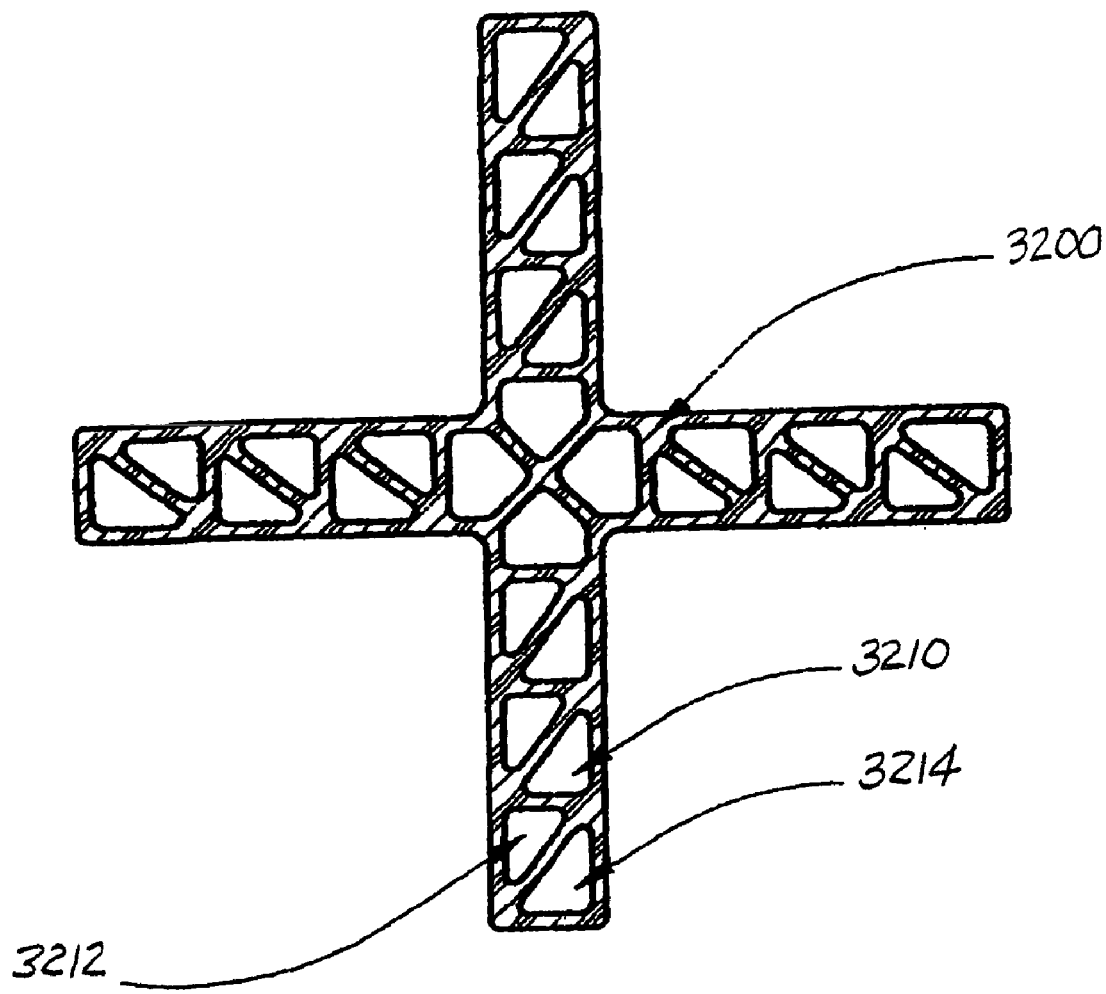
FIG. 32 is a cross-sectional view of another embodiment with several hollow regions for blown fiber or any transmission media for present, future, or concurrent installations using the support-separator alone or in combination with a cable.

FIG. 32 is a cross-sectional view of another embodiment (3200) with several hollow regions (3210, 3212, 3214, for example) for blown fiber or any transmission media for present, future, or concurrent installations using the support-separator alone or in combination with a cable.

Figure 33A:
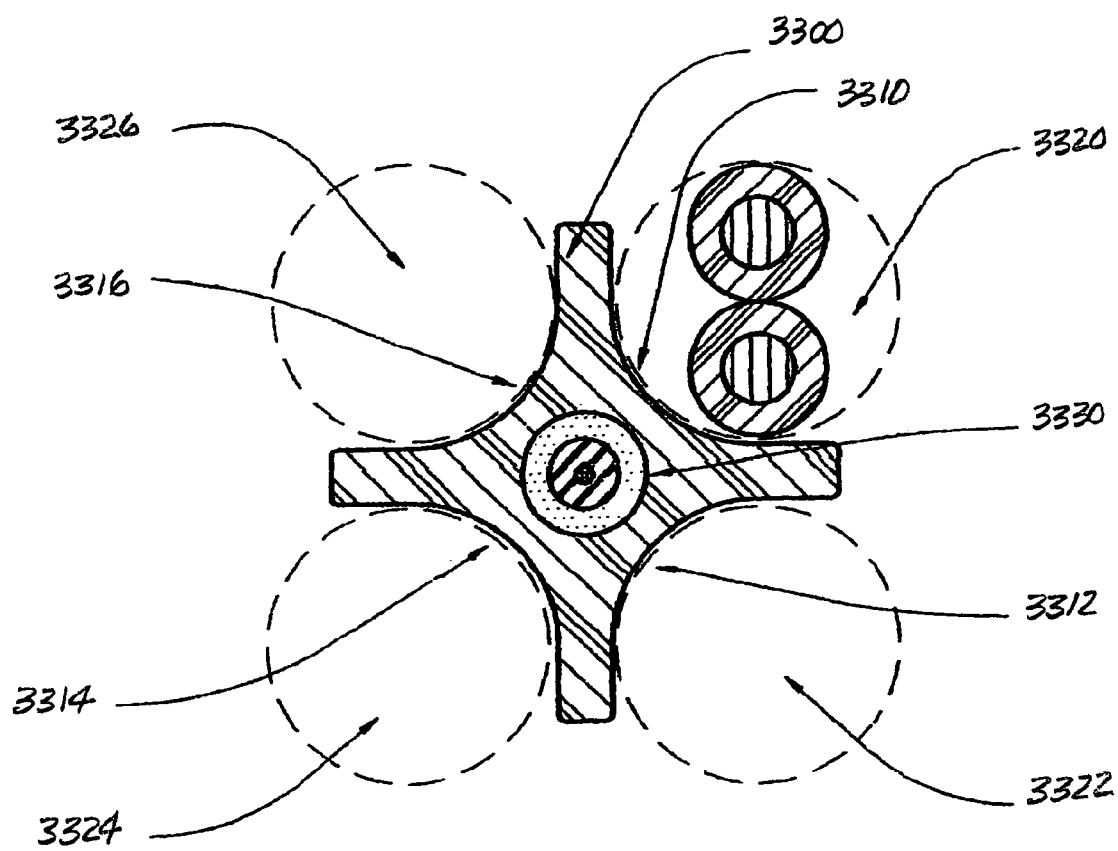
FIGS. 33a and 33b are cross-sectional views of another set of embodiments of the cable support-separator that includes a circular ring region which is surrounded by semi-rounded lobes in a symmetric star-like geometry that defines as many as four separate regions for pairs that are properly separated in the final (often jacketed) cable design. Again the central ring portion can optionally include a hollow region that may be used as an air blown fiber (ABF) duct which is available for filling with optical fiber which is comprised of solid, semi-solid, foamed or hollow polymeric smooth internal and external surfaces.
Figure 33B:
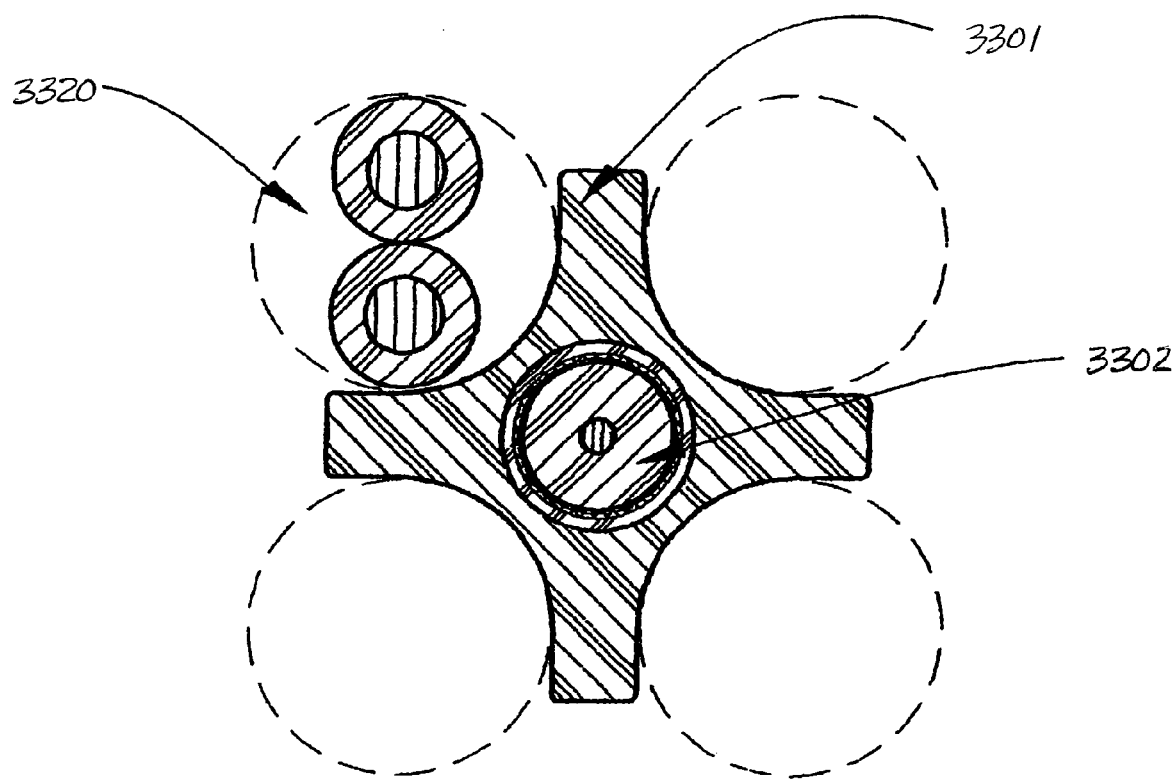

FIGS. 33a and 33b are cross-sectional views of another set of embodiments of the cable support-separator that includes a circular ring region (3300) which is surrounded by semi-rounded lobes (3310, 3312, 3314, 3316) in a symmetric star-like geometry that defines as many as four separate regions for pairs (3320, 3322, 3324, 3326) that are properly separated in the final (often jacketed) cable design. Again the central ring portion can optionally include a hollow region (3330) that may be used as an air blown fiber (ABF) duct which is available for filling with optical fiber which is comprised of solid, semi-solid, foamed or hollow polymeric smooth internal and external surfaces. FIGS. 33a and 33a include view of optionally filled inner hollow regions such that each can optionally be used for coax or twisted pair as well as for fiber optic conductors (in advance, during or after installation). FIG. 33a includes a view of this design including the optional addition of one or more conductors including optionally organic or inorganic fibers such as polyamide (for example Kevlar®) filling and an optional strength member within the second inner ring (that may or may not be rifled). FIG. 33b includes a view of this design that includes the optional addition of coaxial cable (3302) in the hollow center region. The central circular region (3301) is of a slightly larger size that that shown in FIG. 33a in order to allow for coaxial cable in the central hollow region of the separator.

It will, of course, be appreciated that the embodiment which has just been described has been given simply by the way of illustration, and the invention is not limited to the precise embodiments described herein, various changes and modifications may be effected by one skilled in the art without departing from the scope or spirit of the invention as defined in the appended claims.

What is claimed is:

1. A high performance communications cable comprising:
an interior support-separator with an external radial and axial surface, said interior support-separator extending along a longitudinal length of said communications cable, said interior support-separator also having a central region, said central region also extending along a longitudinal length of said interior support-separator of said communications cable;
said interior support-separator comprising one or more outwardly extended shaped protrusions and conduit tube disposed in said central region; wherein said central region, outwardly extended protrusions, and conduit tube are comprised of a composition of inorganic and organic polymer; said composition including: fluorinated ethylene propylene, fluorinated ethylene, chlorinated ethylene propylene, fluorochlorinated ethylene, perfluoroalkoxy, fluorochlorinated propylene, a copolymer of tetrafluoroethylene and perfluoromethylvinylether (MFA), or a copolymer of ethylene and chlorotrifluoroethylene (ECTFE); and homo or copolymers of ethylene or propylene with fluorinated ethylene or polyvinylidene fluoride (PVDF); and blends of polyvinyl chloride, polyvinylidene chloride, nylons, polyesters, polyurethanes; and nano-composites of clay including unsubstituted or substituted fullerenes primarily comprised of $C_{60}$ molecules; and nano-sized particles of ZnO or $TiO_2$.

2. The high performance communications cable or interior support-separator of claim 1, wherein said interior support-separator, said central region, said outwardly extended protrusions and said conduit tube are capable of shielding conductors that transmit data at 10 Gbit while substantially mitigating or eliminating all forms of crosstalk.

3. The high performance communications cable of claim 1 or interior support-separator, wherein said composition also comprises acid gas scavengers including hydrogen chloride or hydrogen fluoride or other halogenated gasses that scavenge gasses during combustion.

4. The high performance communications cable or interior support-separator of claim 1, wherein said composition includes the use of recycled or reground thermoplastics in an amount up to 100%.

5. The high performance communications cable or interior support-separator of claim 1, wherein a ratio of said fluorinated or otherwise halogenated polymers or copolymers to said ethylene or vinyl chloride polymers or copolymers is from 0.1% up to 99.9%.

6. The high performance communications cable of claim 5, wherein said composition is a foamed polymer and further includes a nucleating agent of polytetrafluoroethylene, carbon black, color concentrate, or boron nitride or other acceptable nucleating or blowing agent.

7. The high performance communications cable of claim 1, wherein said composition of said interior support-separator, said central region, said outwardly extended protrusions and conduit tube comprises solid, partially solid, or foamed material, or a solid skin surface over the foamed material.

8. The high performance communications cable or interior support-separator of claim 1, wherein said interior support-separator and said central region includes anvil shaped core support-separator sections.

9. The high performance communications cable or interior support-separator of claim 8, wherein each of said anvil-shaped core support-separator sections comprises channel walls defining said one or more clearance channels and where said clearance channels are defined by a semi-circular geometry such that there remains a 180 degree opening along an external radial and axial surface of said interior support.

10. The high performance communications cable or interior support-separator of claim 9, wherein each of said anvil-shaped core support-separator sections comprises clearance walls defined by a semi-closed semi-circular geometry such that there remains less than a 160 degree opening along said exterior radial and axial surface, but more than a 10 degree opening along said external surface of said interior support-separator of said clearance channels.

11. The high performance communications cable or interior support-separator of claim 8, wherein each of said anvil-shaped core support-separator sections comprises clearance walls defined by a fully closed circular geometry that remains closed and includes a flap-top allowing for opening or enclosing said exterior radial and axial surfaces of said channel walls of said clearance channels.

12. The high performance communications cable or interior support-separator of claim 11, wherein said flap-top is comprised of a press-fit arrangement that is hinged allowing for opening and enclosing said exterior radial and axial surfaces of said channel walls of said clearance channels.

13. The high performance communications cable or interior support-separator of claim 11, wherein said flap-top is sealed by use of heat, tape, interlocking, or by skin extrusion of said hinged press-fit arrangement.

14. The high performance communications cable or interior support-separator of claim 11, wherein each of said anvil-shaped core support-separator sections comprises said clearance walls defined by a fully closed circular geometry that remains closed including an interlocking double flap-top, where said double flap-top is adhered to or adjoined with a surface of each side of said clearance walls for opening or closing said exterior radial and axial surfaces of said channel walls of said clearance channels.

15. The high performance communications cable or interior support-separator of claim 14, wherein said double flap-top is comprised of a press-fit arrangement on each end that remains in an opened or closed position for said exterior radial and axial surfaces of said channel walls of said clearance channels.

16. The high performance communications cable or interior support-separator of claim 14, wherein said channel walls comprise interior surfaces that are corrugated including internal axial grooves separated by a sufficient distance such that individual conductors or conductor pairs maintain required electrical integrity and such that said conductor or conductor pairs are forced against an edge of said grooves or sections of said channel walls.

17. The high performance communications cable or interior support-separator of claim 16, wherein said channel walls comprise interior surfaces that are corrugated including internal axial grooves separated by a sufficient distance such that individual conductors or conductor pairs forced into said grooves maintain required electrical integrity.

18. The interior support-separator of claim 16, wherein said channel walls comprise interior surfaces that are corrugated including internal axial grooves separated by a sufficient distance such that individual conductors or conductor pairs maintain required electrical integrity and such that said conductors or conductor pairs are forced against an edge of said grooves or sections of said channel walls.

19. The interior support-separator of claim 18, wherein said channel walls comprise interior surfaces that are ribbed including internal radial grooves separated by a sufficient distance such that individual conductors or conductor pairs maintain required electrical integrity.

20. The interior support-separator of claim 16, wherein said interior support-separator comprises a convoluted external radial and axial surface extending along a longitudinal length such that external surfaces of said anvil shaped core support-separator section include external radial grooves also extending along 21. The interior support-separator of claim 14, wherein said double flap-top is sealed by use of heat, tape, or an interlocking press-fit arrangement. said longitudinal length of said interior support-separator such that said interior support-separator itself functions as a cable jacket.

22. The high performance communications cable or interior support-separator of claim 8, wherein said interior support-separator comprises a corrugated or convoluted external radial and axial surface extending along a longitudinally length of said communications cable, such that external surfaces of said anvil shaped core support-separator sections include external radial grooves also extending along said longitudinal length of said core support-separator such that said interior support-separator can itself function as a cable jacket for said communications cable.

23. The high performance communications cable or interior support-separator of claim 8, wherein each of said anvil shaped core support-separator sections are singularly filled with individual or paired metallic or coaxial electrical transmitting conductors or optical fiber conductors, or filled with a combination of said individually or paired metallic or optical fiber conductors along said longitudinal length of said support and said cable.

24. The high performance communications cable or interior support-separator of claim 8, wherein at least one anvil shaped support-separator section comprises a slotted section distinct from said anvil shaped support-separator sections that is sufficient to contain a grounding wire with a shielding tape.

25. The interior support-separator of claim 8, wherein at least one anvil shaped support-separator section comprises rounded edges of said anvil shaped support-separator sections at an outer radial end of said anvil shaped support-separator sections sufficient to reduce overall weight and size of said interior support-separator and subsequently said cable.

26. The interior support-separator of claim 8, wherein at least one anvil shaped support-separator sections comprises minimized dual lobes at an outer radial end of said anvil shaped support-separator sections sufficient to minimize and reduce overall weight and size of said anvil shaped support-separator and subsequently said cable.

27. The interior support of claim 8, wherein said anvil shaped core support-separator sections are twisted to a specified lay length.

28. The high performance communications cable or interior support-separator of claim 1, wherein said interior support-separator comprises a center portion, wherein said center portion of said interior support-separator is hollow or solid along a longitudinal length of said communications cable.

29. The high performance communications cable or interior support of claim 1, wherein said metal conductors are copper with or without metallic shielding.

30. The high performance communications cable or interior support-separator of claim 1, wherein said metal conductors are aluminum with or without metallic shielding.

31. The high performance communications cable or interior support-separator of claim 1, wherein said cable comprises a strength member wherein said strength member lies parallel to said interior support-separator inside a communications cable jacket or within said hollow portion of said interior support-separator along said longitudinal direction of said interior support-separator and said cable.

32. The interior support-separator for a communications cable as in claim 1, extending along a longitudinal length of said communications cable comprising a pendulum shaped separator configuration with a circular disc pendant that comprises a circular central region of said pendulum shaped separator and a hollow orifice in a central region of a central portion of said interior support-separator.

33. The interior support-separator of claim 32, wherein said circular disc pendant is skewed to one end of said central region of said pendulum shaped separator.

34. The interior support-separator of claim 32, extending along a longitudinal length of said communications cable wherein said support-separator comprises a pendulum shaped configuration with pendant shaped sections being an elliptical disc like shaped pendant that comprises a central region of said pendulum shaped separator and a hollow orifice in a center region of said central portion of said interior support-separator.

35. The interior support-separator of claim 34, where said elliptical disc like pendant is skewed to one end of said central region of said pendulum shaped separator.

36. The interior support-separator for a communications cable as in claim 32, extending along a longitudinal length of said communications cable comprising a pendulum shaped configuration with two ends with a pendant shaped section comprising a diamond-like shape and a hollow orifice in a central region of said central portion of said interior support-separator.

37. The interior support-separator of claim 36, where said diamond-like shape may be nearer either end of said central region of said pendulum shaped configuration than near said central region.

38. The interior support-separator for a communications cable as in claim 32, extending along a longitudinal length of said communications cable comprising, a dual-lobed shaped pendulum-like configuration with curved elongated lobed end portions along a top portion and a bottom portion of said pendulum-like configuration creating at least two clearance channels for conductors or conductor pairs and a hollow orifice in a central region of said central portion of said interior support-separator.

39. The interior support-separator for a communications cable as in claim 1, comprising at least two symmetrical or asymmetrical intersecting arms that intersect in a cross-like manner along an essentially horizontal and vertical axis;

said intersecting arms provided with ladder-like steps evenly spaced along each arm and along a complete length of said arm whereby each arm with said ladder-like steps forms a rifle-like pattern along said horizontal and vertical axis said intersecting arms providing four or more separate clearance channels and wherein said arms are comprised of solid or foamed material.

40. The interior support-separator for a communications cable as in claim 39, extending along a longitudinal length of a said communications cable, comprising at least two intersecting arms that intersect in a cross-like manner along an essentially horizontal and vertical axis;

said intersecting arms providing ladder-like steps evenly spaced along each arm and along a complete length of said intersecting arm whereby each arm with said ladder-like steps forms a rifle-like saw-tooth pattern along said horizontal and vertical axis and;

a central portion at an intersection of said each arm, said central portion comprising a central solid member that includes step-like portions cut away from said central solid member and a hollow orifice in a central region of said central portion of said interior support-separator and where said central region is void of a saw-tooth pattern along at least one or more of said horizontal and vertical axis.

41. The interior support-separator for a communications cable as in claim 39, extending along a longitudinal length of said communications cable comprising instead at least two spatial quadrants defined by a horizontal arm member of said support-separator including a two sided drill-bit like shaped central member with geometrically symmetric sections in opposite quadrants and; each having a drill-bit like shape that is a mirror image of the other drill-bit-like shape in the other quadrant and said support-separator in sum appears to be shaped as a mirrored battleship and a hollow orifice in a center region of said central portion of said interior support-separator.

42. The interior support-separator for a communications cable as in claim 39, extending along a longitudinal length of said communications cable comprising at least two intersecting arms that intersect in a cross-like manner comprising: a cross like support-separator along an essentially horizontal and vertical axis;

said intersecting arms providing ladder-like steps evenly spaced along each arm and along a complete length of each arm with said ladder-like steps forming a rifle-like saw-tooth pattern along said horizontal and vertical axis and;

a central portion of said two intersecting arms, said central portion comprising a hollow center wherein said vertical and horizontal intersecting arms are initially wide or narrow along a horizontal or vertical axis and become finally narrow or wide along same said horizontal or vertical axis such that said cross like support-separator comprises an asymmetric pattern.

43. The interior support-separator for a communications cable as in claim 39, extending along a longitudinal length of said communications cable comprising at least two spatial quadrants defined by a horizontal member of said support-separator comprising rifle-like saw-blade tooth sections along either a top or bottom portion of said horizontal member.

44. The interior support-separator for a communications cable of claim 43, wherein said horizontal member is comprised of a semi-flexible material, a semi-flexible thermoplastic material, or a semi-rigid thermoset material.

45. The interior support-separator of claim 43, wherein said support-separator is void of any rifle-like saw-blade sections and is simply a film.

46. The interior support-separator for a communications cable as in claim 1, extending along a longitudinal length of said communications cable comprising at least two spatial quadrants defined by two horizontal members connected by a vertical member with two sides such that said support-separator appears as a symmetric or skewed angle iron with a z-like shape and where each of said horizontal members is longer, shorter or the same length as said vertical member.

47. The interior support-separator of claim 46, wherein said support-separator includes rifle-like saw-blade tooth sections along any or all members of said support-separator and along either side of each member of said support-separator.

48. The interior support-separator of claim 1, providing a specified lay length by implementing a twisting thereby providing a lay length twist into said support-separator prior to manufacturing said final communications cable assembly.

49. The interior support-separator of claim 1, wherein said support-separator comprises 24 pair of electrical conductors and a twenty fifth pair of electrical conductors wherein said twenty fifth pair is placed within an orifice within said central region of said interior support-separator.

50. The high performance communications cable of claim 1 comprising:
an interior support-separator with an external radial and axial surface, extending along a longitudinal length of said communications cable, said interior support-separator also having a central ring region, said central ring region also extending along a longitudinal length of said interior support-separator and said communications cable; said interior support-separator comprising at least one symmetrical core with either a diamond-shaped or circular outer hollow ring region with an inner diamond-shaped or hollow ring region with extending protrusions each extending in a preferred separation from each of said other extending protrusions extending from said outer ring region.

51. The high performance communications cable of claim 50, wherein said central ring region includes a hollow ring region acting as a duct for an air blown fiber (ABF) which is available for filling with optical fiber(s) or other conductor (s) with no extending protrusions.

52. The high performance communications cable of claim 51, wherein said interior support-separator, and said central ring region shaped core support-separator sections comprising solid, partially solid, or foamed thermoplastic or thermosetting dielectric materials.

53. The high performance communications cable of claim 50, wherein said interior support-separator, and said central ring region shaped core support-separator sections comprising solid, partially solid, or hollow, foamed organic or inorganic dielectric materials.

54. The high performance communications cable of claim 50, wherein channel walls of said central ring region with extending protrusions are corrugated including internal axial grooves separated by a sufficient distance such that individual conductors or conductor pairs maintain required electrical integrity and such that said conductor or conductor pairs are forced against an edge of said grooves or sections of said channel walls.

55. The high performance communications cable of claim 50, wherein said interior support-separator comprises a corrugated or convoluted external radial and axial surface extending along a longitudinal length of said communications cable, such that external surfaces of said symmetrical core with a central ring region include external radial grooves also extending along said longitudinal length of said interior support-separator such that said interior support-separator can itself function as a cable jacket for said communications cable.

56. The high performance communications cable of claim 50, wherein said at least one symmetrical core with a central ring region with said extending protrusions are singularly filled with individual or paired metal or coaxial electrical transmitting conductors or optical fiber light transmitting conductors, or filled with a combination of said individual or paired metal or optical conductors along said longitudinal length of said interior support-separator and said communications cable.

57. The high performance communications cable of 56, wherein said metal conductors are copper with or without metallic shielding.

58. The high performance communications cable of claim 56, wherein said metal conductors are aluminum with or without metallic shielding.

59. The high performance communications cable of claim 50, wherein said communications cable comprises one or more axial strength members wherein said axial strength members lie parallel to said interior support-separator inside a communications cable jacket or within said hollow ring region of said interior support-separator along said longitudinal length of said interior support-separator and said communications cable.

60. The high performance communications cable of claim 1 comprising; an interior support-separator with an external radial and axial surface, extending along a longitudinal length of said communications cable, said interior support-separator also having a central region, said central region also extending along a longitudinal length of said interior support-separator and said communications cable; said interior support-separator comprising a hollow four-petal daisy shaped arrangement with a central region, each hollow petal separated by 90 degrees along an axial plane that extends along a complete length of said communications cable allowing for individual or paired conductors to be placed within said hollow petal.

61. The high performance communications cable of claim 60, wherein said central region of said four-petal daisy shaped arrangement includes at least one hollow region acting as a duct for an air blown fiber (ABF) which are available for filling with optical fiber(s) or other conductor (s).

62. The high performance communications cable of claim 60, wherein said interior support-separator comprises a hollow four-petal daisy shaped arrangement with a central region, each said hollow petal separated by 90 degrees along an axial plane that extends along a longitudinal length of said communications cable allowing for individual or paired conductors to be placed within each said hollow petal or within hollow sections of otherwise solid petals.

63. The high performance communications cable of claim 62, wherein said interior support-separator and said central region of said four-petal daisy shaped arrangement include a hollow region acting as a duct for an air blown fiber (ABF) which is available for filling with optical fiber(s) or other conductor(s).

64. The high performance communications cable of claim 1 comprising:
an interior support-separator and an inner cross-like separator section with rifled sections extending outward into four quadrants away from said central region, said quadrants defined by 90 degree right angles formed by an intersection of extended cross-like rifled separator sections encased within an outer insulated layer which is shaped in an identical cross-like pattern as said extended cross-like rifled separator sections so that dimensions of said outer insulated layer forms a cross-like pattern larger than said inner cross-like separator section with rifled sections and functions as a skin for said inner cross-like separator section with rifled sections.

65. The high performance communications cable of claim 64, wherein said central region of an inner cross-like separator with said outer insulated layer includeing a hollow central region acting as a duct for an air blown fiber (ABF) which is available for filling with optical fiber or other conductors.

66. The high performance communications able of claim 1 comprising:
an interior support-separator with a cross-like separator section with zig-zag sections extending outward onto four quadrants away from said central region, said quadrants defined by 90 degree right angles formed by an intersection of said cross-like separator sections.

67. The high performance communications cable of claim 66, wherein said central region of said cross-like separator section with said zig-zag sections includeing a hollow central region acting as a duct for an air blown fiber (ABF) which is available for filling with optical fiber or other conductors.

68. The high performance communications cable of claim 66, comprising; a cross-like separator section with zig-zag sections that have sickle-like ends at each of said zig-zag sections extending outward into four quadrants away from said central region, said quadrants defined by 90 degree right angles formed by an intersection of extended cross-like zig-zag separator sections with said sickle-like ends.

69. The high performance communications cable of claim 66, wherein said central region of said cross-like separator sections with said zig-sag sections extended having said sickle-like ends including a hollow central region acting as a duct for an air blown fiber (ABF) which is available for filling with optical fiber(s) or other conductors.

70. The high performance communications cable as in claim 69, also providing a specified lay length by implementing a twisting of said hollow central region thereby providing a lay length twist into said interior support-separator prior to manufacturing a final communications cable assembly.

* * * * *